United States Patent
Mochizuki et al.

(10) Patent No.: US 10,051,642 B2
(45) Date of Patent: Aug. 14, 2018

(54) MOBILE COMMUNICATION SYSTEM

(71) Applicant: Mitsubishi Electric Corporation, Chiyoda-ku (JP)

(72) Inventors: Mitsuru Mochizuki, Tokyo (JP); Miho Maeda, Tokyo (JP); Yasushi Iwane, Tokyo (JP); Yuji Kakehi, Tokyo (JP); Masayuki Nakazawa, Tokyo (JP); Taisei Suemitsu, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/133,684

(22) Filed: Apr. 20, 2016

(65) Prior Publication Data

US 2016/0234854 A1 Aug. 11, 2016

Related U.S. Application Data

(62) Division of application No. 13/578,694, filed as application No. PCT/JP2011/052729 on Feb. 9, 2011, now Pat. No. 9,350,496.

(30) Foreign Application Priority Data

Feb. 12, 2010 (JP) .................................. 2010-028637

(51) Int. Cl.
*H04W 4/00* (2018.01)
*H04W 72/08* (2009.01)
(Continued)

(52) U.S. Cl.
CPC ......... *H04W 72/082* (2013.01); *H04L 1/1812* (2013.01); *H04W 28/0236* (2013.01);
(Continued)

(58) Field of Classification Search
CPC ... H04L 1/0002; H04L 1/0026; H04L 1/1812; H04W 28/0236; H04W 28/06;
(Continued)

(56) References Cited

U.S. PATENT DOCUMENTS 8,175,596 B1 5/2012 Mansour et al.
2009/0227263 A1 9/2009 Agrawal et al.
(Continued)

FOREIGN PATENT DOCUMENTS

JP 2012-531128 12/2012
WO WO 2009/035983 A1 3/2009
(Continued)

OTHER PUBLICATIONS

International Preliminary Report on Patentability dated Aug. 23, 2012, in PCT/JP2011/052729.
(Continued)

*Primary Examiner* — Kan Yuen
(74) *Attorney, Agent, or Firm* — Oblon, McClelland, Maier & Neustadt, L.L.P.

(57) ABSTRACT

A mobile communication system capable of easily notifying the interference-related information and avoiding interference in a situation in which a macro cell and local nodes are deployed to coexist. In the system, a macro cell (eNB) notifies, via user equipments (UEs) present in a coverage, HeNBs present in the coverage of the interference-related information related to the interference to a physical resource to be used, for example, a high interference indication (HII) and an overload indicator (OI).

4 Claims, 26 Drawing Sheets

(51) Int. Cl.
*H04L 1/18* (2006.01)
*H04W 28/02* (2009.01)
*H04W 84/04* (2009.01)
*H04W 92/20* (2009.01)
*H04W 28/06* (2009.01)
*H04W 72/12* (2009.01)
*H04L 1/00* (2006.01)

(52) U.S. Cl.
CPC .......... *H04L 1/0002* (2013.01); *H04L 1/0026* (2013.01); *H04W 28/06* (2013.01); *H04W 72/12* (2013.01); *H04W 84/045* (2013.01); *H04W 92/20* (2013.01)

(58) Field of Classification Search
CPC . H04W 72/082; H04W 72/12; H04W 84/045; H04W 92/20
See application file for complete search history.

(56) References Cited

U.S. PATENT DOCUMENTS

| | | | |
|---|---|---|---|
| 2010/0035647 A1 | 2/2010 | Gholmieh et al. | |
| 2010/0041393 A1 | 2/2010 | Kwon et al. | |
| 2010/0273448 A1 | 10/2010 | Iwamura et al. | |
| 2011/0003560 A1 | 1/2011 | Futaki | |
| 2011/0105135 A1* | 5/2011 | Krishnamurthy | H04W 16/10 455/450 |
| 2012/0087276 A1* | 4/2012 | Huang | H04B 7/155 370/253 |
| 2012/0127954 A1 | 5/2012 | Lim et al. | |

FOREIGN PATENT DOCUMENTS

| | | |
|---|---|---|
| WO | WO 2009/057602 A1 | 5/2009 |
| WO | WO 2009/110551 A1 | 9/2009 |
| WO | WO 2009/151296 A2 | 12/2009 |
| WO | WO 2010/148532 A1 | 12/2010 |

OTHER PUBLICATIONS

International Preliminary Report on Patentability dated Sep. 27, 2012, in PCT/JP2011/052729.
Written Opinion of the International Searching Authority and International Search Report dated Mar. 8, 2011, in PCT/JP2011/052729 (with English-language translation).
"Considerations on interference coordination in heterogeneous networks", LG Electronics, 3GPP TSG RAN WG1 Meeting #59BIS, R1-100236, Jan. 18-22, 2010, pp. 1-5.
"HeNB Interference Coordination", Motorola, 3GPP TSG-RAN WG1 Meeting #59, R1-094839, Nov. 8-14, 2009, 4 pages.
"Techniques to Cope with High Interference in Heterogeneous Networks", Qualcomm Incorporated, 3GPP TSG-RAN WG1 #59BIS, R1-100702, Jan. 18-22, 2009, pp. 1-5.
"UL Interference Control in the Absence of X2 for Rel 9", Qualcomm Europe, 3GPP TSG-RAN WG1 #56BIS, Mar. 23-27, 2009, pp. 1-5.
"Evolved Universal Terrestrial Radio Access (E-UTRA) and Evolved Universal Terrestrial Radio Access Network", 3GPP TS 36.300 vol. 9.1.0, Stage 2, Release 9, Sep. 2009, 165 pages.
"Signaling of MBSFN subframe allocation in D-BCH", Nokia Siemens Networks, Nokia, Huawei. 3GPP TSG-RAN WG1 Meeting #49BIS, R1-072963, Jun. 25-29, 2007, 5 pages.
"Evolved Universal Terrestrial Radio Access (E-UTRA); User Equipment (UE) procedures in idle mode", 3GPP TS 36.304 vol. 9.0.0, Release 9, Sep. 2009, 30 pages.
"LS on HNB/HeNB Open Access Mode", 3GPP TSG-SA1 #42, S1-083461, Oct. 13-17, 2008, 2 pages.
"LS on CSG cell identification", 3GPP TSG-RAN WG 2 Meeting #62, R2-082899, May 5-9, 2008, 2 pages.
"Further Advancements for E-UTRA Physical Layer Aspects", 3GPP TR 36.814, vol. 1.1.1, Release 9, Jun. 2009, 39 pages.
"Feasibility study for Further Advancements for E-UTRA (LTE-Advanced)", 3GPP TR 36.912, vol. 9.0.0, Release 9, Sep. 2009, 256 pages.
"Downlink Interference Coordination Between eNodeB and Home eNodeB", NTT DOCOMO, TSG-RAN Working Group 4 (Radio) Meeting #52, R4-093203, Aug. 24-28, 2009, pp. 1-5.
"Evolved Universal Terrestrial Radio Access (E-UTRA) Radio Resource Control (RRC)", 3GPP TS 36.331, vol. 9.0.0, Release 9, Sep. 2009, 213 pages.
"Evolved Universal Terrestrial Radio Access (E-UTRA); Physical layer procedures", 3GPP TS 36.213, vol. 9.0.1, Release 9, Dec. 2009, 79 pages.
"Evolved Universal Terrestrial Radio Access (E-UTRA) Medium Access Control (MAC) protocol specification", 3GPP TS 36.321, vol. 9.1.0, Release 9, Dec. 2009, 48 pages.
Office Action dated Dec. 9, 2014 to Japanese Patent Application No. 2011-553861 with partial English translation.
Office Action dated Dec. 8, 2015 in Japanese Patent Application No. 2015-090916 (with English Translation).
Qualcomm Europe, "Techniques to Cope with High Interference in HetNets", 3GPP TSG-RAN WG1 #59 R1-094883, Nov. 12-16, 2009, 4 Pages.
Extended European Search Report dated Oct. 20, 2016 in Patent Application No. 11742254.3.
Office Action dated May 30, 2017 in Japanese Patent Application No. 2016-140168 (with Partial English-language Translation).

* cited by examiner

F I G. 5   BACKGROUND ART
(A)
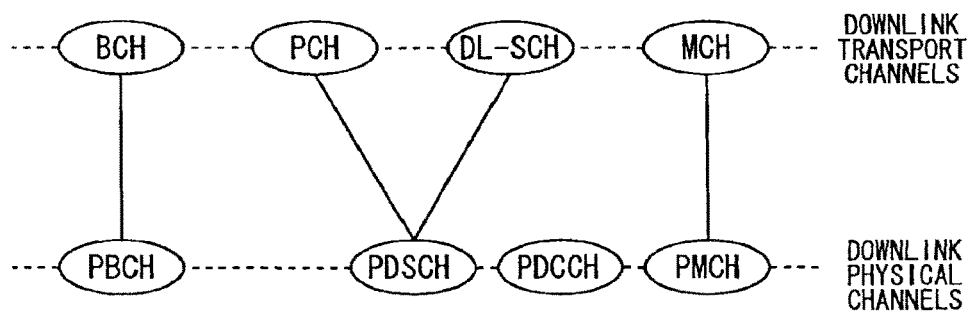
(B)
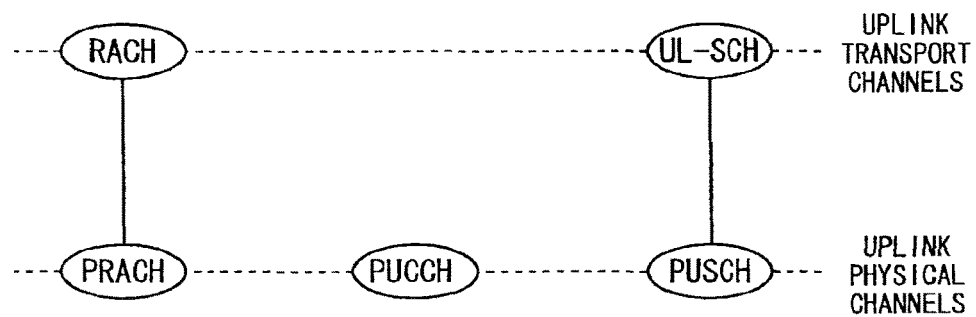

F I G. 6    BACKGROUND ART
(A)
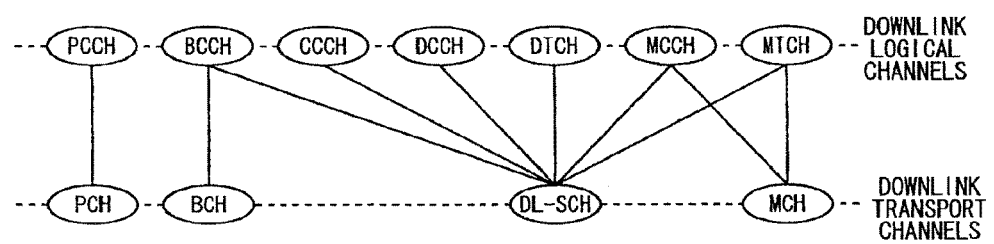
(B)
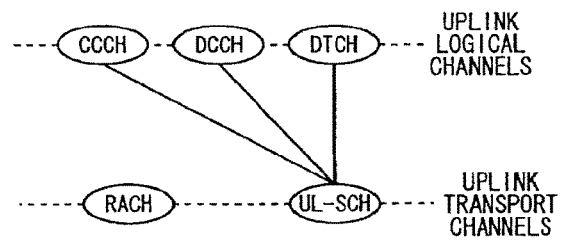

F I G. 7
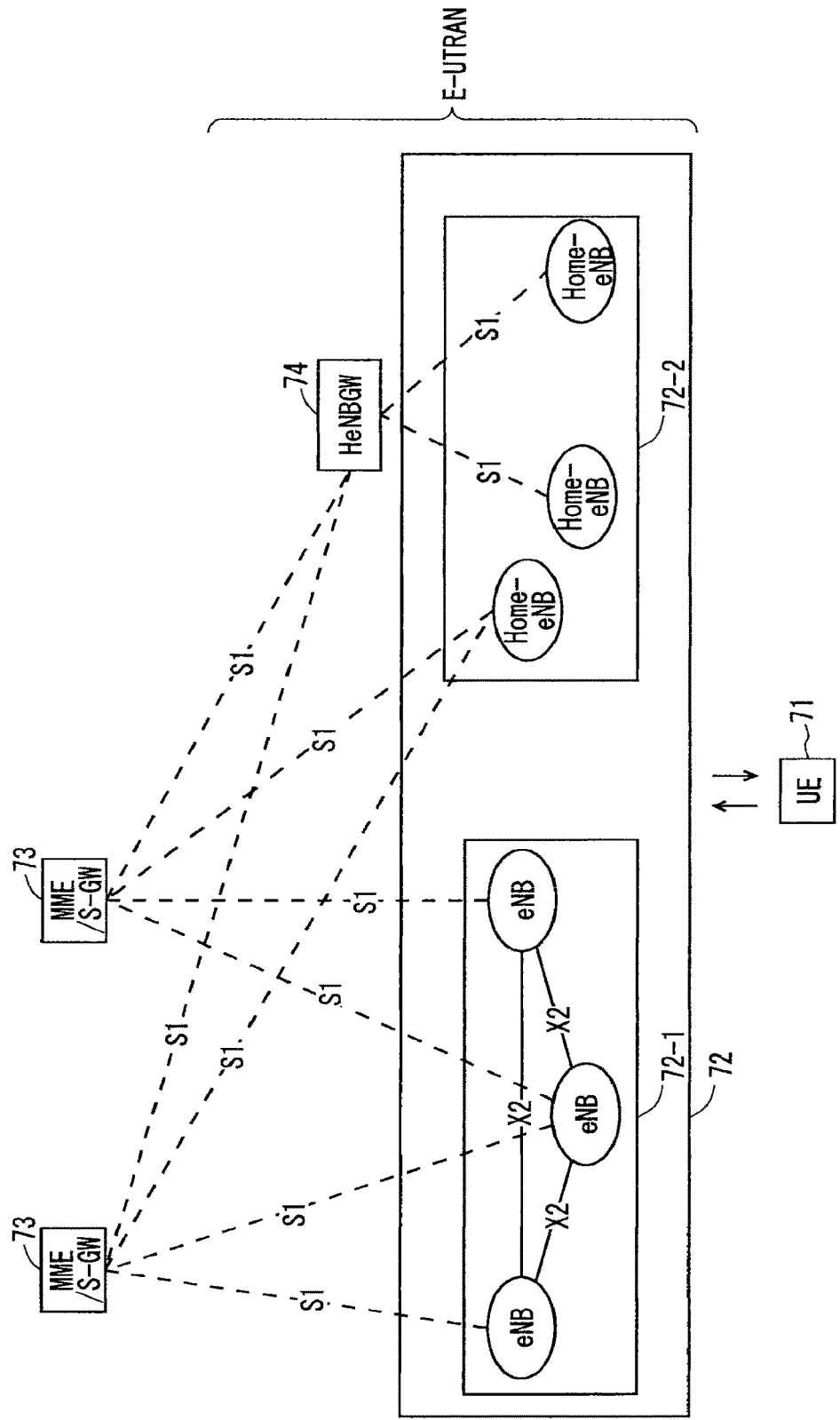

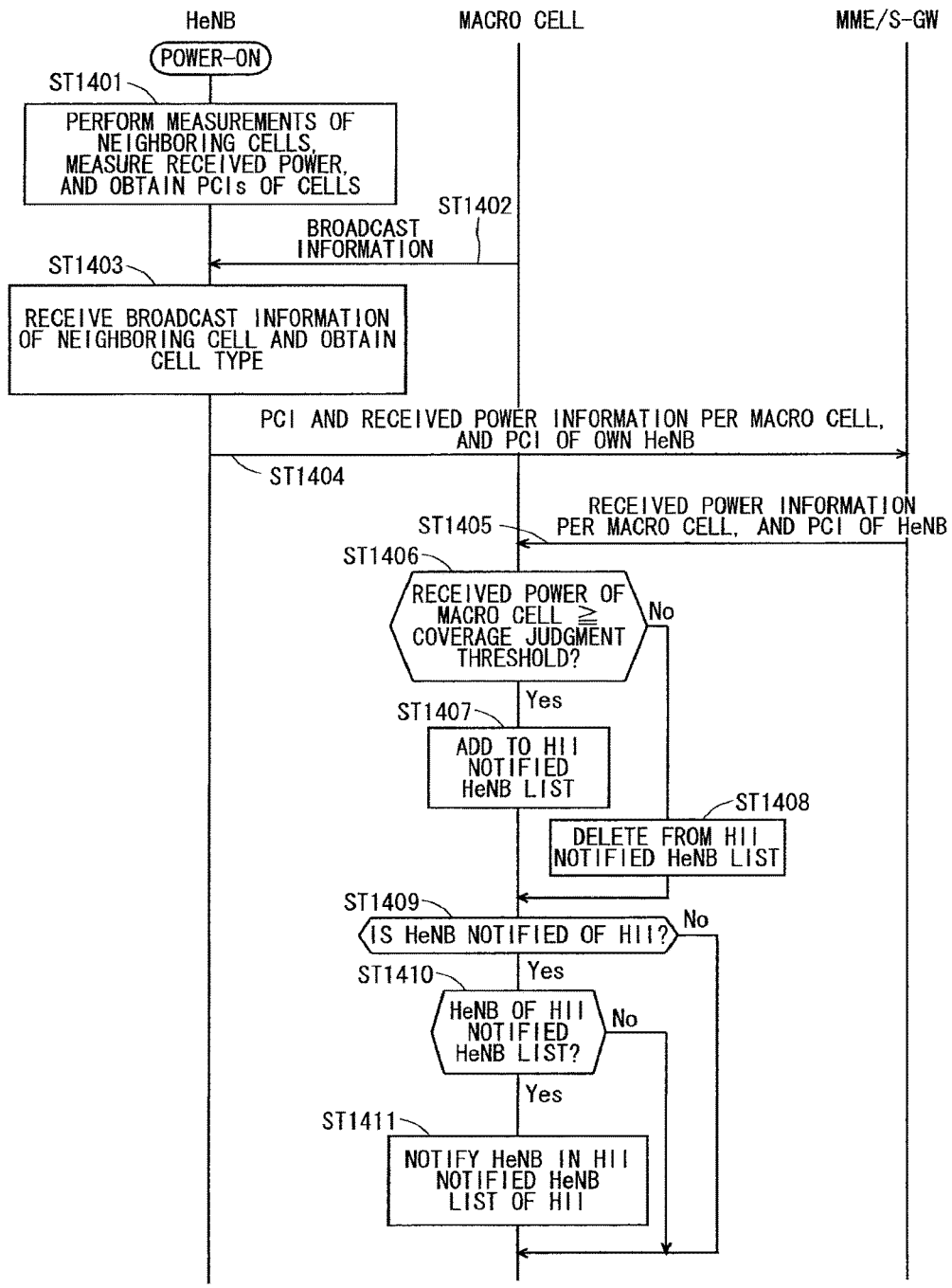

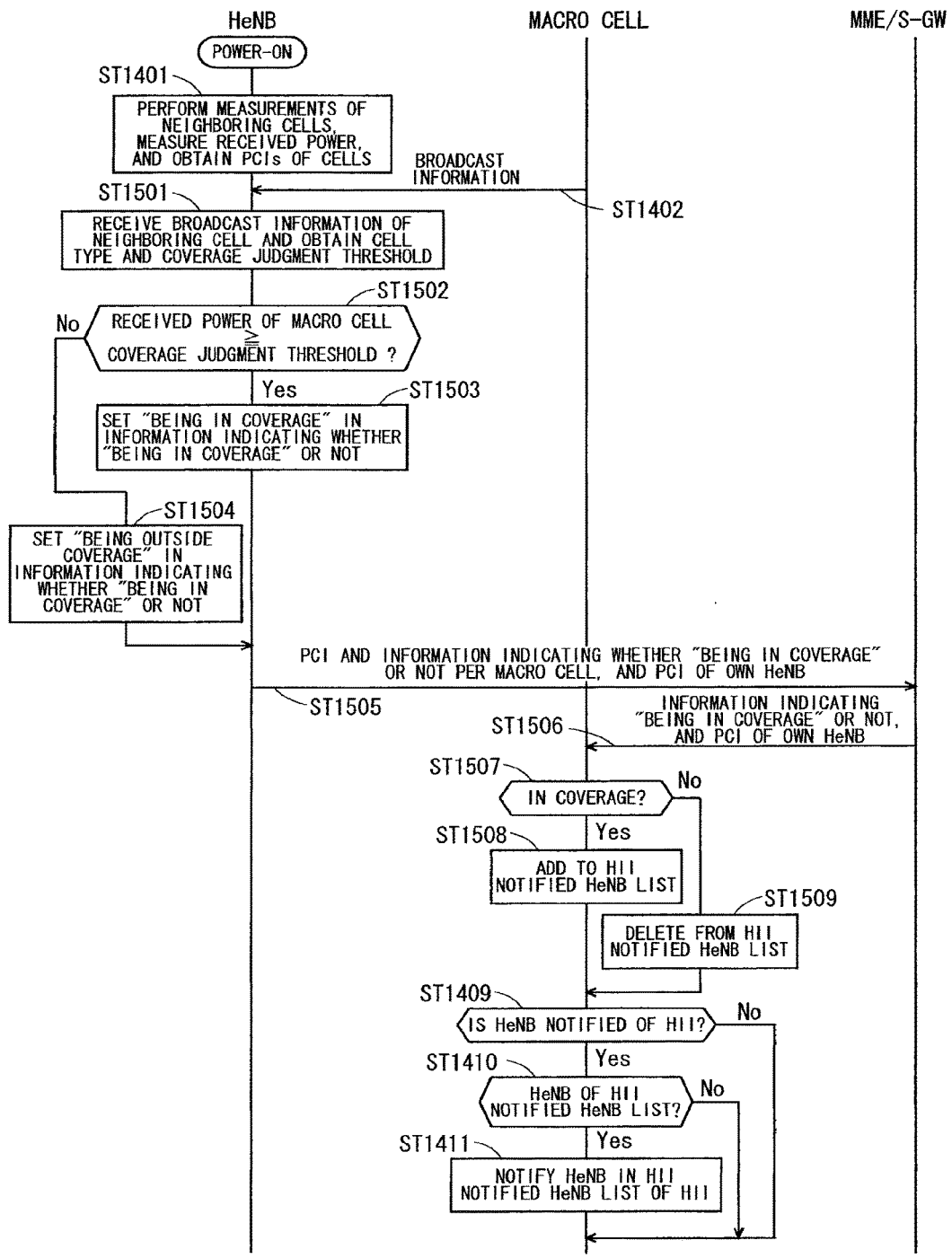

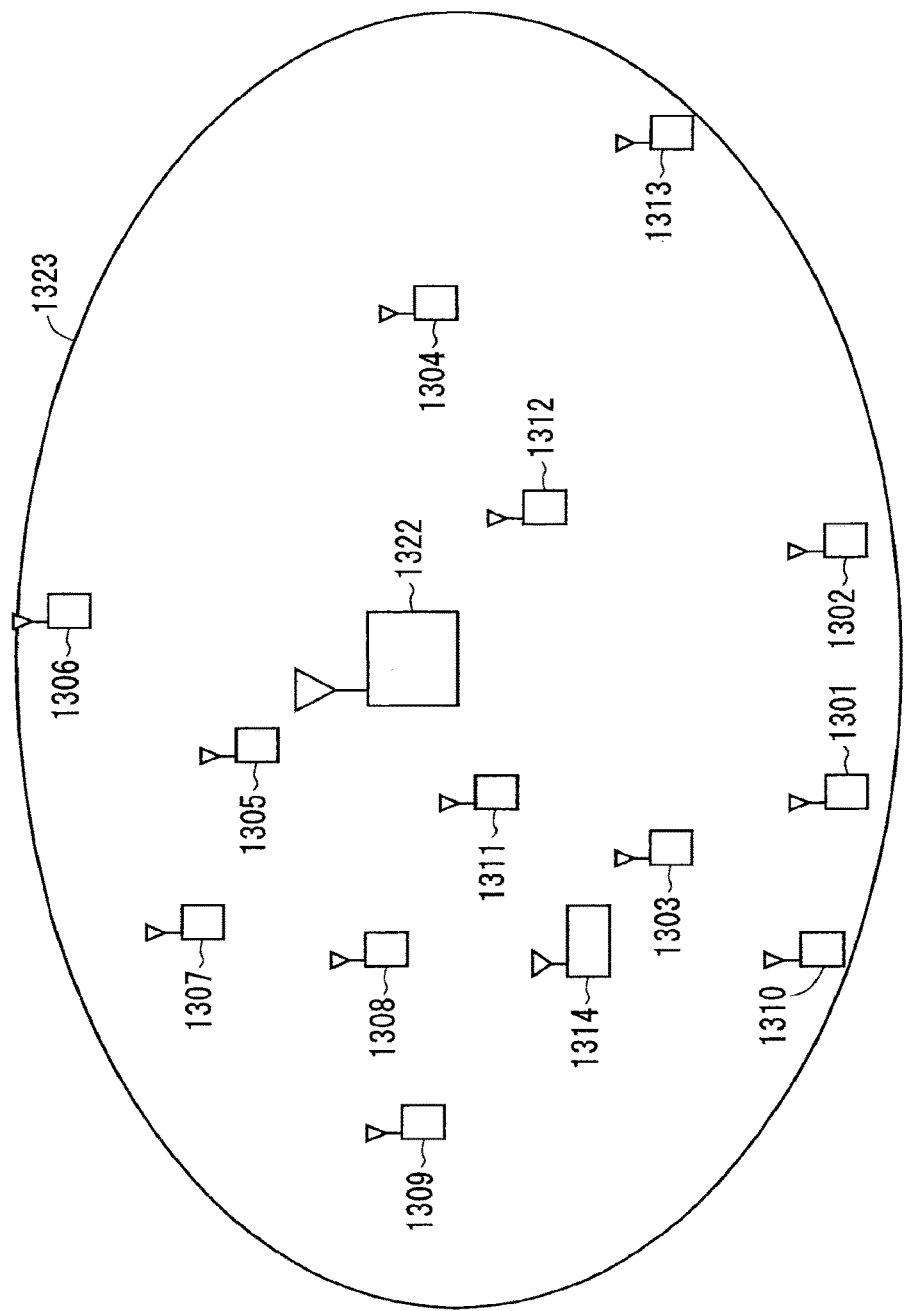

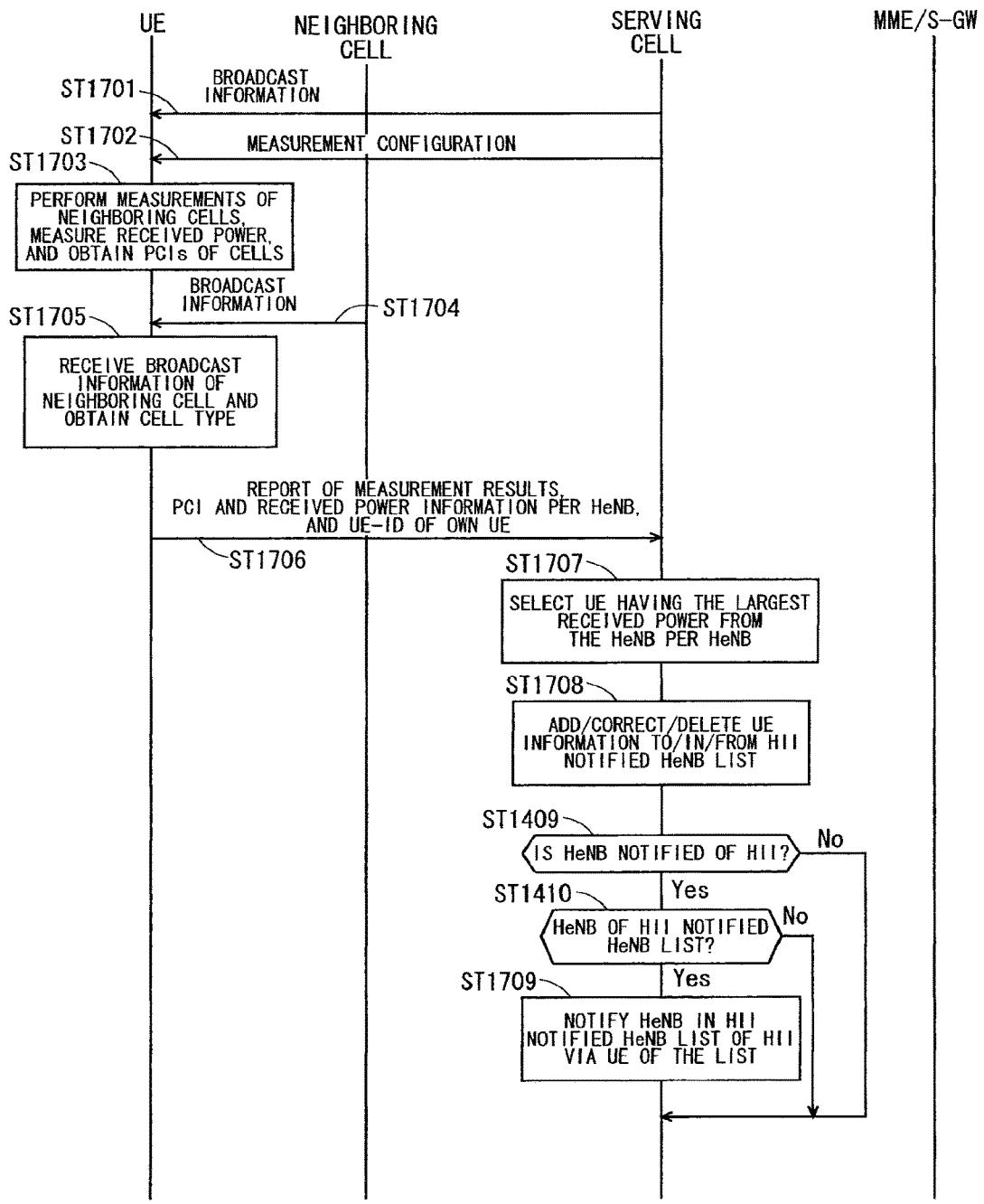
F I G . 1 7

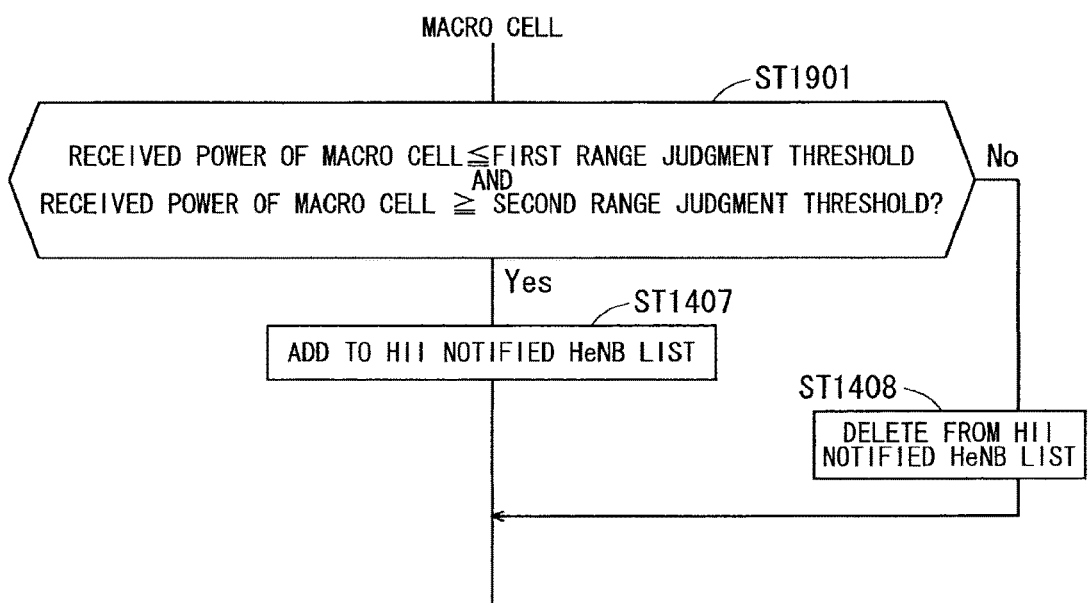
F I G . 1 9

F I G . 2 3
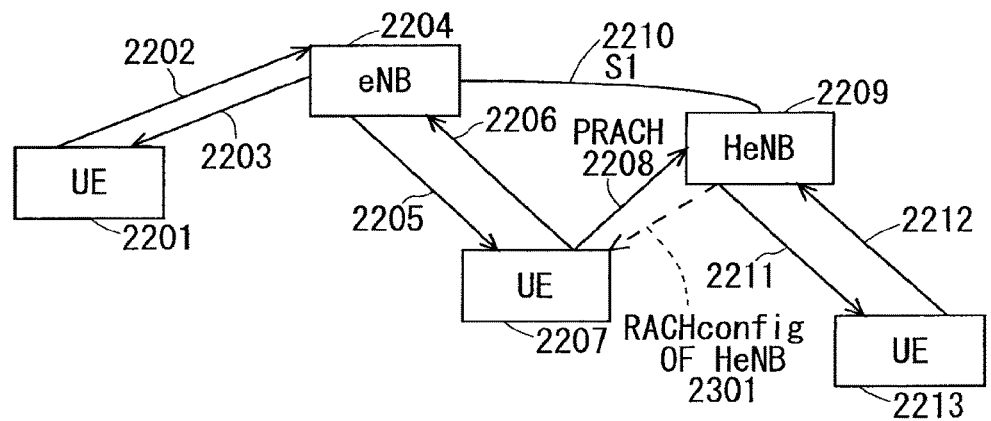
F I G . 2 4
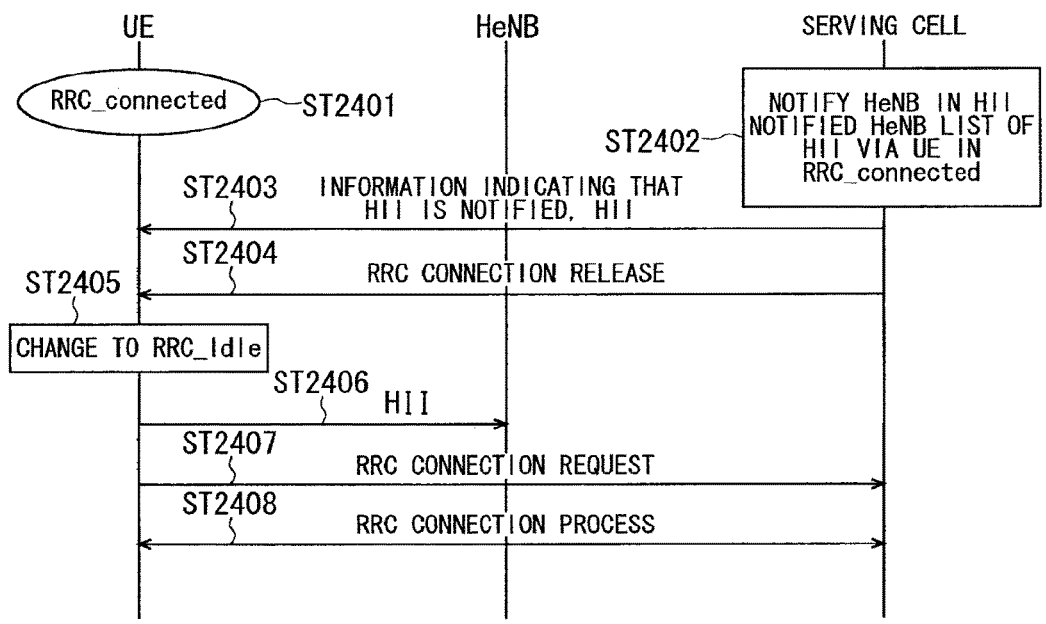

F I G. 2 5
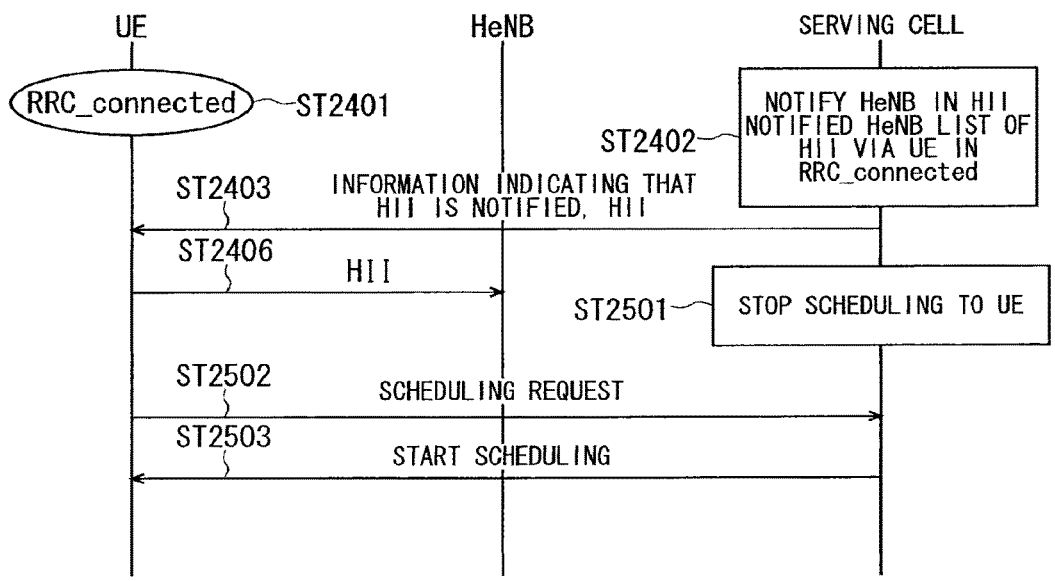

F I G. 2 6
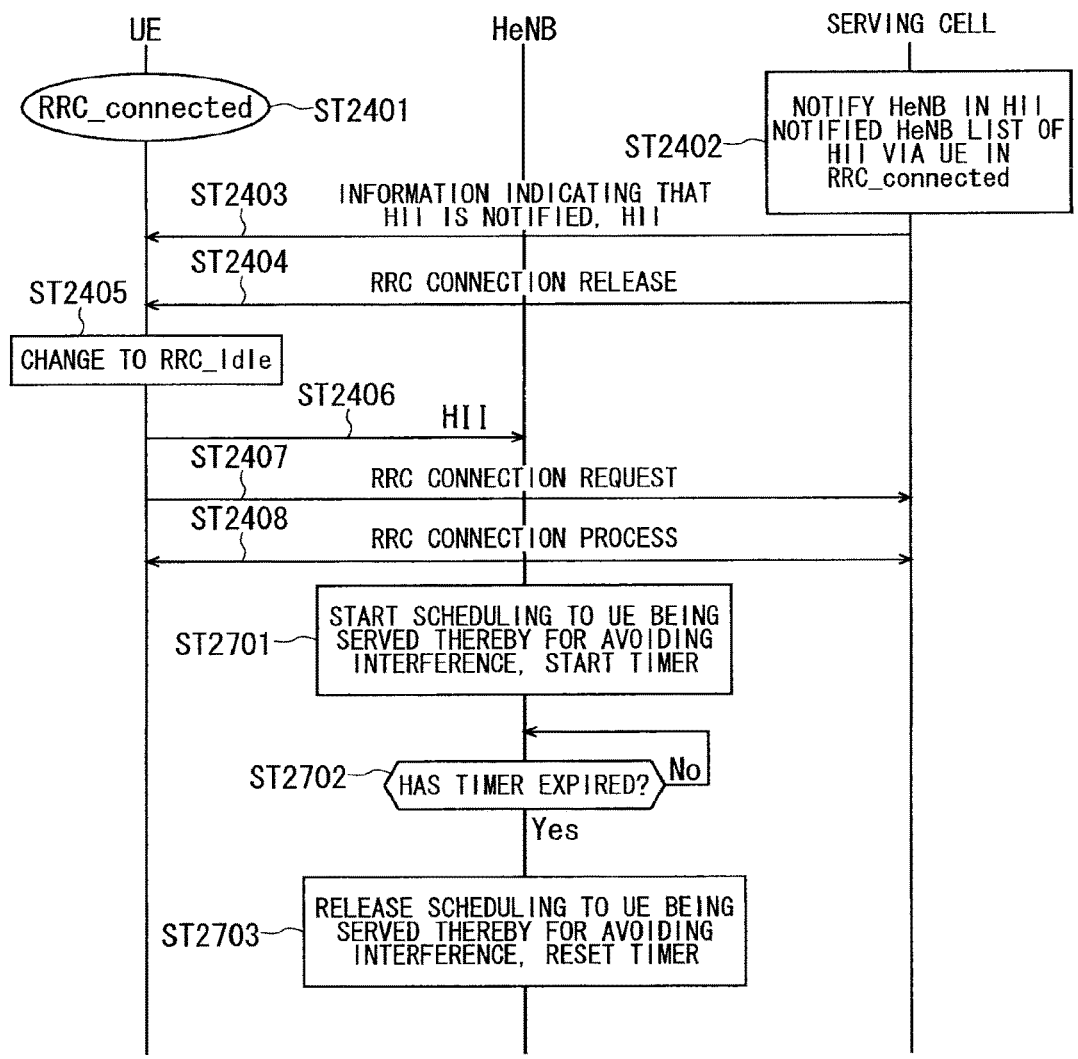

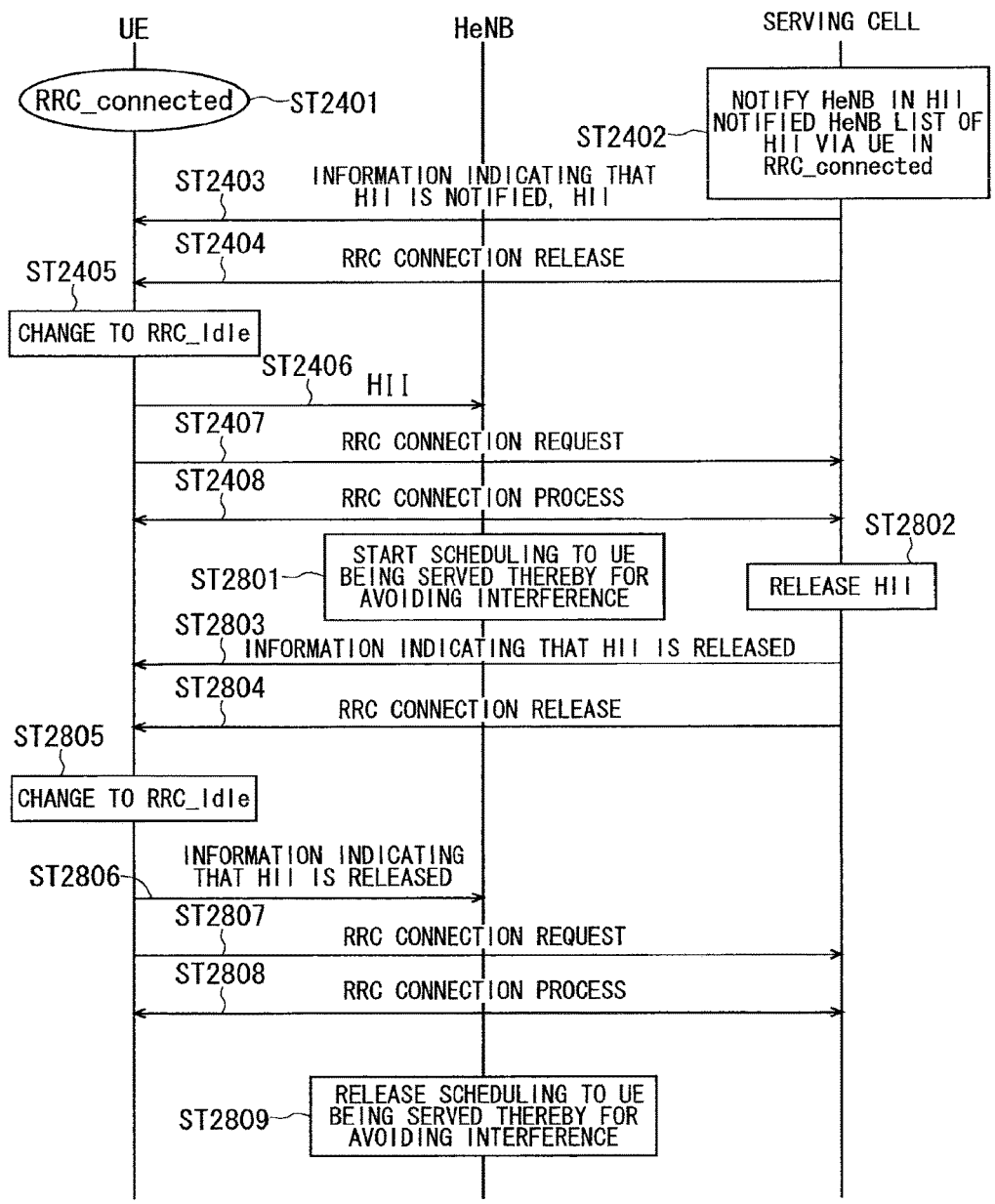
F I G . 2 7

MOBILE COMMUNICATION SYSTEM

CROSS REFERENCE TO RELATED APPLICATIONS

This application is a divisional of U.S. application Ser. No. 13/578,694 filed Aug. 13, 2012, which is a National Stage of PCT/JP2011/052729 filed Feb. 9, 2011, and claims priority to Japanese Patent Application No. 2010-028637 filed Feb. 12, 2010. The entire contents of each of which are incorporated herein by reference.

TECHNICAL FIELD

The present invention relates to a mobile communication system in which a base station performs radio communication with a plurality of user equipments.

BACKGROUND ART

Commercial service of a wideband code division multiple access (W-CDMA) system among so-called third-generation communication systems has been offered in Japan since 2001. In addition, high speed downlink packet access (HSDPA) service for achieving higher-speed data transmission using a downlink has been offered by adding a channel for packet transmission (high speed-downlink shared channel (HS-DSCH)) to the downlink (dedicated data channel, dedicated control channel). Further, in order to increase the speed of data transmission in an uplink direction, service of a high speed uplink packet access (HSUPA) system has been offered. W-CDMA is a communication system defined by the 3rd generation partnership project (3GPP) that is the standard organization regarding the mobile communication system, where the specifications of Release 8 version are produced.

Further, 3GPP is studying new communication systems referred to as long term evolution (LTE) regarding radio areas and system architecture evolution (SAE) regarding the overall system configuration including a core network (merely referred to as network as well) as communication systems independent of W-CDMA.

In the LTE, an access scheme, a radio channel configuration and a protocol are totally different from those of the current W-CDMA (HSDPA/HSUPA). For example, as to the access scheme, code division multiple access is used in the W-CDMA, whereas in the LTE, orthogonal frequency division multiplexing (OFDM) is used in a downlink direction and single career frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz and 20 MHz for each base station. Further, differently from the W-CDMA, circuit switching is not provided but a packet communication system is only provided in the LTE.

The LTE is defined as a radio access network independent of the W-CDMA network because its communication system is configured with a new core network different from a core network (general packet radio service: GPRS) of the W-CDMA. Therefore, for differentiation from the W-CDMA communication system, a base station that communicates with a user equipment (UE) and a radio network controller that transmits/receives control data and user data to/from a plurality of base stations are referred to as an E-UTRAN NodeB (eNB) and an evolved packet core (EPC) or access gateway (aGW), respectively, in the LTE communication system. Unicast service and evolved multimedia broadcast multicast service (E-MBMS service) are provided in this LTE communication system. The E-MBMS service is broadcast multimedia service, which is merely referred to as MBMS in some cases. Bulk broadcast contents such as news, weather forecast and mobile broadcast are transmitted to a plurality of user equipments. This is also referred to as point to multipoint service.

Non-Patent Document 1 (Chapter 4.6.1) describes the current decisions by 3GPP regarding an overall architecture in the LTE system. The overall architecture is described with reference to FIG. 1. FIG. 1 is a diagram illustrating the configuration of the LTE communication system. With reference to FIG. 1, the evolved universal terrestrial radio access (E-UTRAN) is composed of one or a plurality of base stations 102, provided that a control protocol for a user equipment 101 such as a radio resource control (RRC) and user planes such as a packet data convergence protocol (PDCP), radio link control (RLC), medium access control (MAC) and physical layer (PHY) are terminated in the base station 102.

The base stations 102 perform scheduling and transmission of paging signal (also referred to as paging messages) notified from a mobility management entity (MME) 103. The base stations 102 are connected to each other by means of an X2 interface. In addition, the base stations 102 are connected to an evolved packet core (EPC) by means of an S1 interface. More specifically, the base station 102 is connected to the mobility management entity (MME) 103 by means of an S1_MME interface and connected to a serving gateway (S-GW) 104 by means of an S1_U interface.

The MME 103 distributes the paging signal to a plurality of or a single base station 102. In addition, the MME 103 performs mobility control of an idle state. When the user equipment is in the idle state and an active state, the MME 103 manages a list of tracking areas.

The S-GW 104 transmits/receives user data to/from one or a plurality of base stations 102. The S-GW 104 serves as a local mobility anchor point in handover between base stations. Moreover, a PDN gateway (P-GW) is provided in the EPC, which performs per-user packet filtering and UE-ID address allocation.

The control protocol RRC between the user equipment 101 and the base station 102 performs broadcast, paging, RRC connection management and the like. The states of the base station and the user equipment in RRC are classified into RRC_Idle and RRC_CONNECTED. In RRC_IDLE, public land mobile network (PLMN) selection, system information (SI) broadcast, paging, cell reselection, mobility and the like are performed. In RRC_CONNECTED, the user equipment has RRC connection, is capable of transmitting/receiving data to/from a network, and performs, for example, handover (HO) and measurement of a neighbor cell.

The current decisions by 3GPP regarding the frame configuration in the LTE system described in Non-Patent Document 1 (Chapter 5) are described with reference to FIG. 2. FIG. 2 is a diagram illustrating the configuration of a radio frame used in the LTE communication system. With reference to FIG. 2, one radio frame is 10 ms. The radio frame is divided into ten equally sized subframes. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS). Multiplexing of channels for multimedia broadcast multicast service single frequency network (MBSFN) and for non-MBSFN is performed on a per-subframe basis. Hereinafter, a subframe for MBSFN transmission is referred to as an MBSFN subframe.

Non-Patent Document 2 describes a signaling example when MBSFN subframes are allocated. FIG. 3 is a diagram illustrating the configuration of the MBSFN frame. With reference to FIG. 3, the MBSFN subframes are allocated for each MBSFN frame. An MBSFN frame cluster is scheduled. A repetition period of the MBSFN frame cluster is allocated.

Non-Patent Document 1 (Chapter 5) describes the current decisions by 3GPP regarding the channel configuration in the LTE system. It is assumed that the same channel configuration is used in a closed subscriber group cell (CSG cell) as that of a non-CSG cell. A physical channel is described with reference to FIG. 4. FIG. 4 is a diagram illustrating physical channels used in the LTE communication system. With reference to FIG. 4, a physical broadcast channel (PBCH) 401 is a downlink channel transmitted from the base station 102 to the user equipment 101. A BCH transport block is mapped to four subframes within a 40 ms interval. There is no explicit signaling indicating 40 ms timing. A physical control format indicator channel (PCFICH) 402 is transmitted from the base station 102 to the user equipment 101. The PCFICH notifies the number of OFDM symbols used for PDCCHs from the base station 102 to the user equipment 101. The PCFICH is transmitted in each subframe.

A physical downlink control channel (PDCCH) 403 is a downlink channel transmitted from the base station 102 to the user equipment 101. The PDCCH notifies the resource allocation, HARQ information related to DL-SCH (downlink shared channel that is one of the transport channels shown in FIG. 5 described below) and the PCH (paging channel that is one of the transport channels shown in FIG. 5). The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) 404 is a downlink channel transmitted from the base station 102 to the user equipment 101. A DL-SCH (downlink shared channel) that is a transport channel and a PCH that is a transport channel are mapped to the PDSCH. A physical multicast channel (PMCH) 405 is a downlink channel transmitted from the base station 102 to the user equipment 101. A multicast channel (MCH) that is a transport channel is mapped to the PMCH.

A physical uplink control channel (PUCCH) 406 is an uplink channel transmitted from the user equipment 101 to the base station 102. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR). A physical uplink shared channel (PUSCH) 407 is an uplink channel transmitted from the user equipment 101 to the base station 102. A UL-SCH (uplink shared channel that is one of the transport channels shown in FIG. 5) is mapped to the PUSCH.

A physical hybrid ARQ indicator channel (PHICH) 408 is a downlink channel transmitted from the base station 102 to the user equipment 101. The PHICH carries Ack/Nack that is a response to uplink transmission. A physical random access channel (PRACH) 409 is an uplink channel transmitted from the user equipment 101 to the base station 102. The PRACH carries a random access preamble.

A downlink reference signal which is a known symbol in a mobile communication system is inserted in the first, third and last OFDM symbols of each slot. The physical layer measurement objects of a user equipment include reference symbol received power (RSRP).

The transport channel described in Non-Patent Document 1 (Chapter 5) is described with reference to FIG. 5. FIG. 5 is a diagram illustrating transport channels used in the LTE communication system. Part (A) of FIG. 5 shows mapping between a downlink transport channel and a downlink physical channel. Part (B) of FIG. 5 shows mapping between an uplink transport channel and an uplink physical channel. A broadcast channel (BCH) is broadcast to the entire base station (cell) regarding the downlink transport channel. The BCH is mapped to the physical broadcast channel (PBCH).

Retransmission control according to a hybrid ARQ (HARD) is applied to a downlink shared channel (DL-SCH). The DL-SCH enables broadcast to the entire base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power. Broadcast to the entire base station (cell) is required for the PCH. The PCH is mapped to physical resources such as the physical downlink shared channel (PDSCH) that can be used dynamically for traffic or physical resources such as the physical downlink control channel (PDCCH) of the other control channel. The multicast channel (MCH) is used for broadcast to the entire base station (cell). The MCH supports SFN combining of MBMS service (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH). The UL-SCH supports dynamic or semi-static resource allocation. The UL-SCH is mapped to the physical uplink shared channel (PUSCH). A random access channel (RACH) shown in part (B) of FIG. 5 is limited to control information. The RACH involves a collision risk. The RACH is mapped to the physical random access channel (PRACH).

The HARQ is described. The HARQ is the technique for improving the communication quality of a channel by combination of automatic repeat request and forward error correction. The HARQ has an advantage that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. In a case where the receiver fails to successfully decode the received data, in other words, in a case where a cyclic redundancy check (CRC) error occurs (CRC=NG), the receiver transmits "Nack" to the transmitter. The transmitter that has received "Nack" retransmits the data. In a case where the receiver successfully decodes the received data, in other words, in a case where a CRC error does not occur (CRC=OK), the receiver transmits "AcK" to the transmitter. The transmitter that has received "Ack" transmits the next data.

Examples of the HARQ system include chase combining. In chase combining, the same data sequence is transmitted in the first transmission and retransmission, which is the system for improving gains by combining the data sequence of the first transmission and the data sequence of the retransmission in retransmission. This is based on the idea that correct data is partially included even if the data of the first transmission contains an error, and highly accurate data transmission is enabled by combining the correct portions of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

A logical channel (hereinafter, referred to as "logical channel" in some cases) described in Non-Patent Document 1 (Chapter 6) is described with reference to FIG. 6. FIG. 6 is a diagram illustrating logical channels used in an LTE communication system. Part (A) of FIG. 6 shows mapping between a downlink logical channel and a downlink transport channel. Part (B) of FIG. 6 shows mapping between an uplink logical channel and an uplink transport channel. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging signals. The PCCH is used when the network does not know the cell location of a user equipment. The PCCH that is a logical channel is mapped to the paging channel (PCH) that is a transport channel. A common control channel (CCCH) is a channel for transmission control information between user equipments and a base station. The CCCH is used in a case where the user equipments have no RRC connection with the network. In a downlink direction, the CCCH is mapped to the downlink shared channel (DL-SCH) that is a transport channel. In an uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a user equipment. The MCCH is used only by a user equipment during reception of the MBMS. The MCCH is mapped to the downlink shared channel (DL-SCH) or multicast channel (MCH) that is a transport channel.

A dedicated control channel (DCCH) is a channel that transmits dedicated control information between a user equipment and a network. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the downlink shared channel (DL-SCH) or multicast channel (MCH).

GCI represents a global cell identity. A closed subscriber group cell (CSG cell) is introduced in the LTE and universal mobile telecommunication system (UMTS). The CSG is described below (see Chapter 3.1 of Non-Patent Document 3). The closed subscriber group (CSG) is a cell (cell for specific subscribers) in which subscribers who are allowed to use are specified by an operator. The specified subscribers are allowed to access one or more E-UTRAN cells of a public land mobile network (PLMN). One or more E-UTRAN cells in which the specified subscribers are allowed access are referred to as "CSG cell(s)". Note that access is limited in the PLMN. The CSG cell is part of the PLMN that broadcasts a specific CSG identity (CSG ID; CSG-ID). The authorized members of the subscriber group who have registered in advance access the CSG cells using the CSG-ID that is the access permission information.

The CSG-ID is broadcast by the CSG cell or cells. A plurality of CSG-IDs exist in a mobile communication system. The CSG-IDs are used by user equipments (UEs) for making access from CSG-related members easier. The locations of user equipments are traced based on an area composed of one or more cells. The locations are traced for enabling tracing of the locations of user equipments and calling (calling of user equipments) even in an idle state. An area for tracing locations of user equipments is referred to as a tracking area. A CSG whitelist is a list stored in a universal subscriber identity module (USIM) in which all CSG IDs of the CSG cells to which the subscribers belong are recorded. The CSG whitelist is also referred to as an allowed CSG ID list in some cases.

A "suitable cell" is described below (see Chapter 4. 3 of Non-Patent Document 3). The "suitable cell" is a cell on which a UE camps to obtain normal service. Such a cell shall fulfill the following conditions.

(1) The cell is part of the selected PLMN or the registered PLMN, or part of the PLMN of an "equivalent PLMN list".

(2) According to the latest information provided by a non-access stratum (NAS), the cell shall further fulfill the following conditions:

(a) the cell is not a barred cell;

(b) the cell is part of at least one tracking area (TA), not part of the list of "forbidden LAs for roaming", where the cell needs to fulfill (1) above;

(c) the cell shall fulfill the cell selection criteria; and (d) for a cell specified as CSG cell by system information (SI), the CSG-ID is part of a "CSG whitelist" of the UE (contained in the CSG whitelist of the UE).

An "acceptable cell" is described below (see Chapter 4.3 of Non-Patent Document 3). This is the cell on which a UE camps to obtain limited service (emergency calls). Such a cell shall fulfill all the following requirements. That is, the minimum required set for initiating an emergency call in an E-UTRAN network are as follows: (1) the cell is not a barred cell; and (2) the cell fulfills the cell selection criteria.

Camping on a cell represents the state where a UE has completed the cell selection/reselection process and the UE has selected a cell for monitoring the system information and paging information.

3GPP is studying base stations referred to as Home-NodeB (Home-NB; HNB) and Home-eNodeB (Home-eNB; HeNB). HNB/HeNB is a base station for, for example, household, corporation or commercial access service in UTRAN/E-UTRAN. Non-Patent Document 4 discloses three different modes of the access to the HeNB and HNB. Specifically, those are an open access mode, a closed access mode and a hybrid access mode.

The respective modes have the following characteristics. In the open access mode, the HeNB and HNB are operated as a normal cell of a normal operator. In the closed access mode, the HeNB and HNB are operated as a CSG cell. The CSG cell is a cell where only CSG members are allowed access. In the hybrid access mode, non-CSG members are allowed access at the same time. In other words, a cell in the hybrid access mode (also referred to as hybrid cell) is the cell that supports both the open access mode and the closed access mode.

3GPP discusses that all physical cell identities (PCIs) are split (referred to as PCI-split) into ones reserved for CSG cells and the others reserved for non-CSG cells (see Non-Patent Document 5). Further, 3GPP discusses that the PCI split information is broadcast in the system information from the base station to the user equipments being served thereby. Non-Patent Document 5 discloses the basic operation of a user equipment using PCI split. The user equipment that does not have the PCI split information needs to perform cell search using all PCIs (for example, using all 504 codes). On the other hand, the user equipment that has the PCI split information is capable of performing cell search using the PCI split information.

Further, 3GPP is pursuing specifications standard of long term evolution advanced (LTE-A) as Release 10 (see Non-Patent Document 6 and Non-Patent Document 7).

As to the LTE-A system, it is studied that a relay (relay node (RN)) is supported for achieving a high data rate, high cell-edge throughput, new coverage area or the like. The relay node is wirelessly connected to the radio-access network via a donor cell (Donor eNB; DeNB). The network (NW)-to-relay node link shares the same frequency band with the network-to-UE link within the range of the donor cell. In this case, the UE in the specifications of Release 8 can also be connected to the donor cell. The link between a donor cell and a relay node is referred to as a backhaul link, and the link between the relay node and the UE is referred to as an access link.

As the method of multiplexing backhaul links in frequency division duplex (FDD), the transmission from DeNB to RN is done in the downlink (DL) frequency band, whereas the transmission from RN to DeNB is done in the uplink (UL) frequency band. As the method of partitioning resources at the relay, the link from DeNB to RN and the link from RN to UE are time division multiplexed in a single frequency band, and the link from RN to DeNB and the link from UE to RN are time division multiplexed in a single frequency band as well. This prevents, in the relay node, the transmission of the relay node from causing interference to the reception of its own relay node.

3GPP studies not only normal eNBs (macro cells) but also so-called local nodes such as pico eNB (pico cell), HeNB/HNB/CSG cell, node for hotzone cells, relay node and remote radio head (RRH).

Those local nodes are deployed for implementing macro cells upon requests for various types of service such as high-speed and high-capacity communication. For example, it is required to deploy a large number of HeNBs in shopping malls, apartment buildings, schools, and companies. This leads to a case where the HeNB is deployed in the coverage of a macro cell. In the case where the HeNB is deployed in the coverage of a macro cell, interference occurs between the macro cell or HeNB and a user equipment (UE). Such interference hinders the communication between the user equipment (UE) and the macro cell or HeNB, which decreases the communication rate. If the interference power becomes larger, communication cannot be made. This requires the method for avoiding the interference occurring in a situation in which a macro cell and a local node are deployed to coexist, to thereby optimize the communication quality.

As a method of reducing the interference between a macro cell and a HeNB, there is a method of notifying a HeNB of the information related to the interference to a physical resource used by a macro cell (hereinafter, referred to as "interference-related information in some cases). Non-Patent Document 8 discloses the method of notifying, by a macro cell, a HeNB of the high interference indication (HII) and overload indicator (OI) as the interference-related information. In addition, Non-Patent Document 9 discloses that a macro cell notifies a HeNB of the HII via a UE being served by the macro cell.

PRIOR ART DOCUMENTS

Non-Patent Documents

Non-Patent Document 1: 3GPP TS36.300 V9.1.0 Chapter 4.6.1, Chapter 4.6.2, Chapter 5, Chapter 6, Chapter 10.1.2 and Chapter 10.7
Non-Patent Document 2: 3GPP R1-072963
Non-Patent Document 3: 3GPP TS36.304 V9.0.0 Chapter 3.1, Chapter 4.3 and Chapter 5.2.4
Non-Patent Document 4: 3GPP S1-083461
Non-Patent Document 5: 3GPP R2-082899
Non-Patent Document 6: 3GPP TR36.814 V1.1.1
Non-Patent Document 7: 3GPP TR36.912 V9.0.0
Non-Patent Document 8: 3GPP R4-093203
Non-Patent Document 9: 3GPP R1-094839

SUMMARY OF INVENTION

Problem to be Solved by the Invention

Non-Patent Document 8 describes that an X2 interface is provided between a macro cell and a HeNB, between a macro cell and a HeNBGW, and between a HeNBGW and a HeNB, and the macro cell notifies the HeNB of the HII and OI by means of the X2 interface. However, the HeNB is also assumed to be used at home, and further, it is studied to deploy the HeNB so as to be managed by a general user not by an operator. When a HeNB is deployed so as not to be managed by an operator as described above, a problem that the configuration becomes complicated occurs if the HeNBs and the macro cell and the HeNB are connected to each other by means of the X2 interface.

Non-Patent Document 9 describes the channel on which notification is made from a UE to a HeNB but does not describe anything else, and the mechanism in which a macro cell notifies a HeNB of the HII is unclear.

An object of the present invention is to provide a mobile communication system capable of easily notifying the interference-related information and avoiding interference in a situation in which a base station device having a relatively large coverage such as a macro cell and a base station device having a relatively small coverage such as a local node are deployed to coexist.

Means to Solve the Problem

A mobile communication system according to the present invention includes a plurality of base station devices and a user equipment device configured to perform radio communication with each of the base station devices, wherein: the plurality of base station devices include a large-scale base station device having a large-scale coverage that is relatively large and a small-scale base station device having a small-scale coverage that is relatively small, as a coverage in a range in which communication with the user equipment device is made; and the large-scale base station device notifies, via the user equipment device present in the large-scale coverage, the small-scale base station device present in the large-scale coverage of interference-related information related to interference to a physical resource to be used.

Effects of the Invention

According to the mobile communication system of the present invention, the mobile communication system includes a large-scale base station device having a large-scale coverage, a small-scale base station device having a small-scale coverage, and a user equipment device. The large-scale base station device notifies, via the user equipment device present in the large-scale coverage, the small-scale base station device present in the large-scale coverage of the interference-related information. This enables to easily notify the small-scale base station device of the interference-related information, which avoids interference in the mobile communication system and enables to prevent a decrease in communication rate and interruption of communication. Therefore, it is possible to avoid interference and achieve good communication quality even in a situation in which a large number of large-scale base station devices and small-scale base station devices are deployed in a complicated manner.

These and other objects, features, aspects and advantages of the present invention will become more apparent from the following detailed description of the present invention when taken in conjunction with the accompanying drawings.

BRIEF DESCRIPTION OF DRAWINGS

FIG. 5 is a diagram illustrating transport channels used in the LTE communication system.

FIG. 6 is a diagram illustrating logical channels used in the LTE communication system.

FIG. 7 is a block diagram showing the overall configuration of an LTE mobile communication system currently under discussion of 3GPP.

FIG. 14 is a diagram showing a sequence example of a mobile communication system in a case where a macro cell judges a HeNB deployed in the coverage.

FIG. 15 is a diagram showing a sequence example of a mobile communication system in a case of judging whether or not a HeNB is deployed in the coverage of the macro cell.

FIG. 16 is a conceptual diagram in a case where only one HeNB is deployed in the coverage of the macro cell and a plurality of UEs are present in the coverage of the macro cell.

FIG. 17 is a diagram showing a sequence example of a mobile communication system in a case where the HII is notified via a UE having the largest received power from a HeNB.

FIG. 19 is a diagram showing a sequence example of a part of a mobile communication system in a case of judging a HeNB deployed in a specific received power range.

FIG. 23 is a conceptual diagram in a case where a UE obtains a RACH configuration parameter from a HeNB present in its vicinity.

FIG. 24 is a diagram showing a sequence example of a mobile communication system in a case where the UE changes to RRC_Idle and then notifies a HeNB of the HII.

FIG. 25 is a diagram showing a sequence example of a mobile communication system in a case where a UE notifies a HeNB of the HII while remaining in an RRC_connected state.

FIG. 26 is a diagram showing a sequence example of a mobile communication system in a case where a timer is provided for releasing scheduling for avoiding interference by a HeNB.

FIG. 27 is a diagram showing a sequence example of a mobile communication system in a case where scheduling for avoiding interference is released by a HeNB upon reception of an HII release signal.

EMBODIMENTS FOR CARRYING OUT THE INVENTION

First Embodiment

Figure 1:
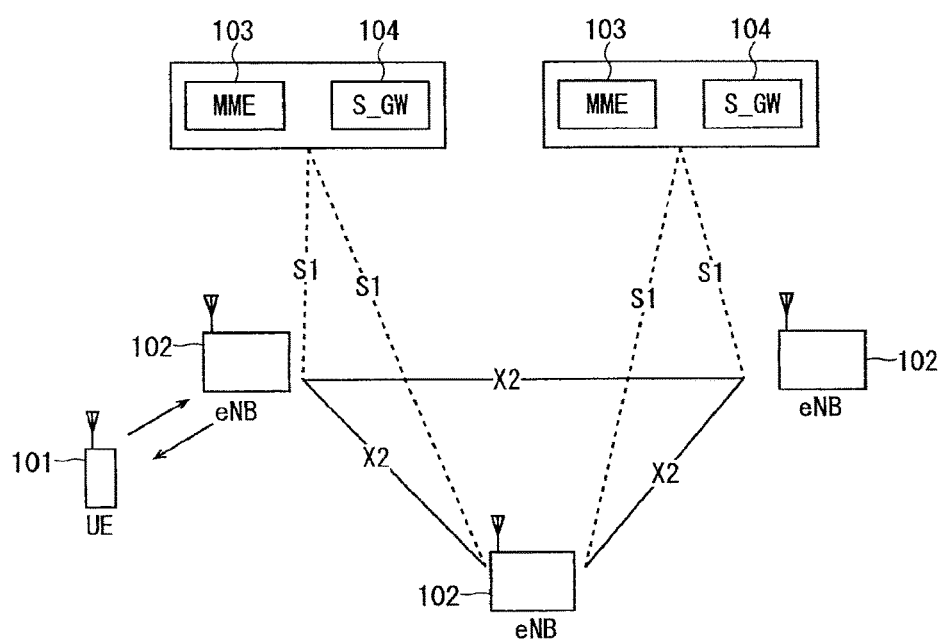
FIG. 1 is a diagram illustrating the configuration of an LTE communication system.
Figure 2:
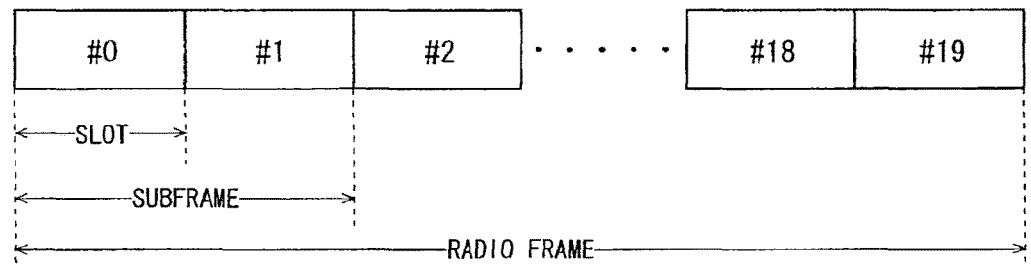
FIG. 2 is a diagram illustrating the configuration of a radio frame used in the LTE communication system.
Figure 3:
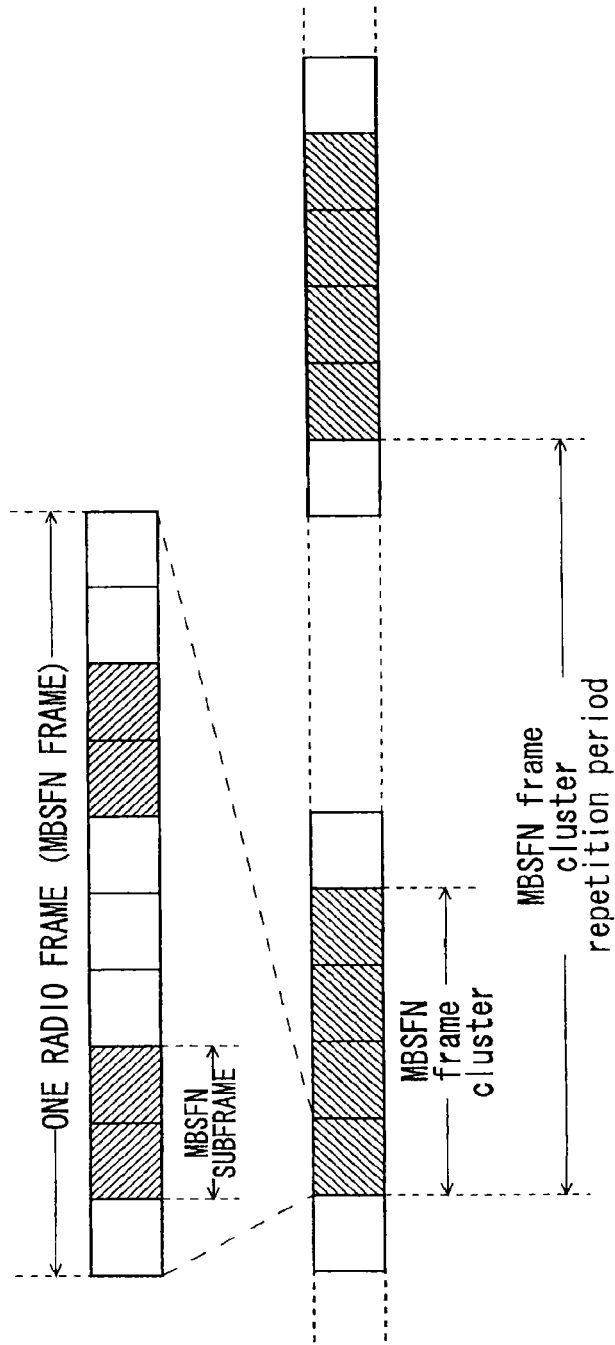
FIG. 3 is a diagram illustrating the configuration of an MBSFN frame.
Figure 4:
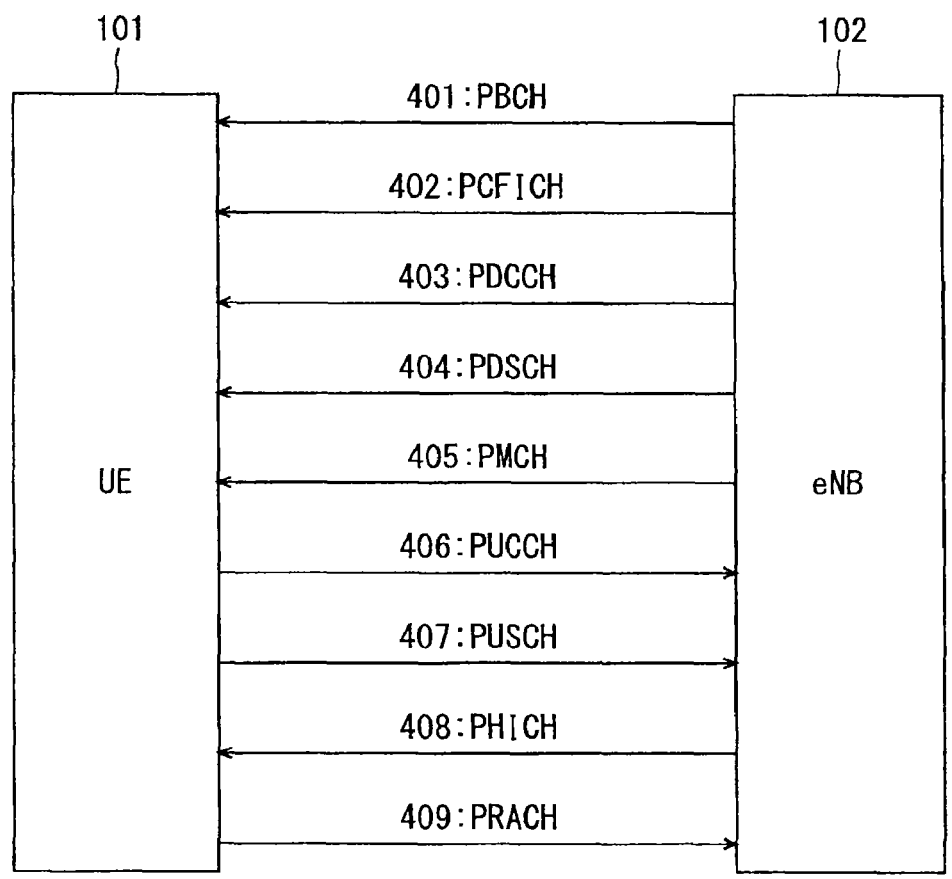
FIG. 4 is a diagram illustrating physical channels used in the LTE communication system.

FIG. 7 is a block diagram showing an overall configuration of an LTE mobile communication system, which is currently under discussion of 3GPP. Currently, 3GPP is studying an overall system configuration including closed subscriber group (CSG) cells (Home-eNodeBs (Home-eNB; HeNB) of E-UTRAN, Home-NB (HNB) of UTRAN) and non-CSG cells (eNodeB (eNB) of E-UTRAN, NodeB (NB)

of UTRAN, and BSS of GERAN) and, as to E-UTRAN, is proposing the configuration as shown in FIG. 7 (see Chapter 4.6.1 of Non-Patent Document 1).

FIG. 7 is described. A user equipment device (hereinafter, referred to as "user equipment" or "UE") 71 is capable of performing radio communication with a base station device (hereinafter, referred to as "base station") 72 and transmits/receives signals through radio communication. The base stations 72 are classified into an eNB 72-1 that is a macro cell and a Home-eNB 72-2 that is a local node. The eNB 72-1 corresponds to a large-scale base station device and has a relatively large-scale coverage as the coverage in a range in which communication is allowed with the user equipment UE 71. The Home-eNB 72-2 corresponds to a small-scale base station device and has a relatively small-scale coverage as the coverage.

The eNB 72-1 is connected to an MME/S-GW unit (hereinafter, referred to as an "MME unit" in some cases) 73 including an MME, S-GW or MME and S-GW through an S1 interface, and control information is communicated between the eNB 72-1 and the MME unit 73. A plurality of MME units 73 may be connected to one eNB 72-1. The eNBs 72-1 are connected to each other by means of an X2 interface, and control information is communicated between the eNBs 72-1.

The Home-eNB 72-2 is connected to the MME unit 73 by means of an S1 interface, and control information is communicated between the Home-eNB 72-2 and the MME unit 73. A plurality of Home-eNBs 72-2 are connected to one MME unit 73. While, the Home-eNBs 72-2 are connected to the MME units 73 through a Home-eNB Gateway (HeNBGW) 74. The Home-eNBs 72-2 are connected to the HeNBGW 74 by means of the S1 interface, and the HeNBGW 74 is connected to the MME units 73 through an S1 interface. One or a plurality of Home-eNBs 72-2 are connected to one HeNBGW 74, and information is communicated therebetween through an S1 interface. The HeNBGW 74 is connected to one or a plurality of MME units 73, and information is communicated therebetween through an S1 interface.

Further, 3GPP is currently studying the configuration below. The X2 interface between the Home-eNBs 72-2 is not supported. The HeNBGW 74 appears to the MME unit 73 as the eNB 72-1. The HeNBGW 74 appears to the Home-eNB 72-2 as the MME unit 73. The interfaces between the Home-eNBs 72-2 and the MME units 73 are the same, which are the S1 interfaces, irrespective of whether or not the Home-eNB 72-2 is connected to the MME unit 73 through the HeNBGW 74. The mobility to the Home-eNB 72-2 or the mobility from the Home-eNB 72-2 that spans the plurality of MME units 73 is not supported. The Home-eNB 72-2 supports a single cell.

Figure 8:
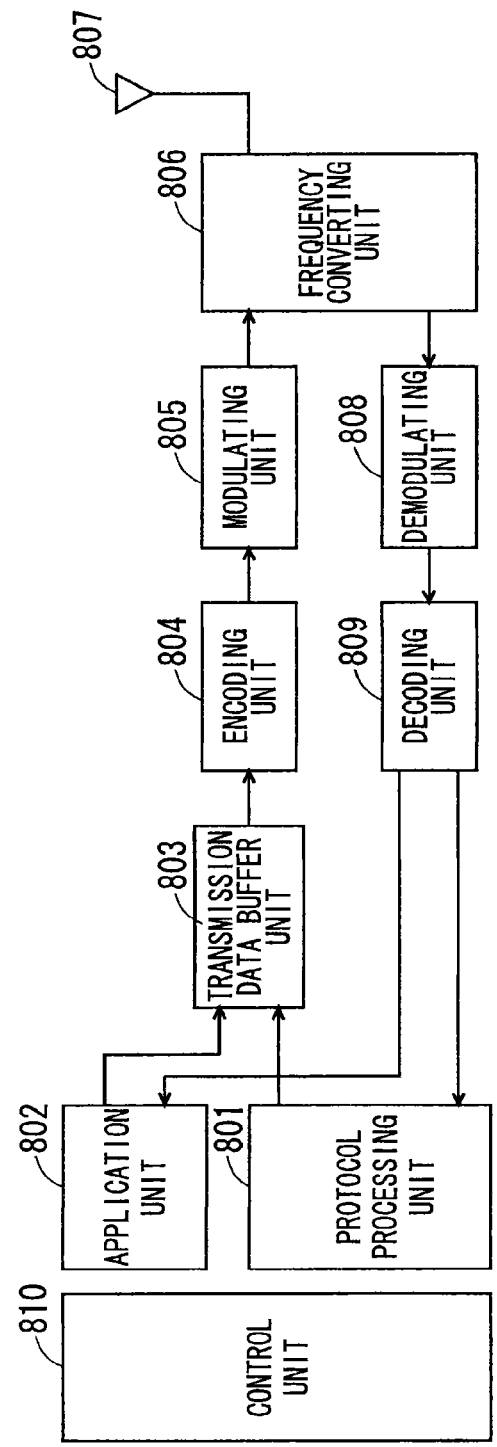
FIG. 8 is a block diagram showing the configuration of a user equipment (user equipment 71 of FIG. 7) according to the present invention.

FIG. 8 is a block diagram showing the configuration of the user equipment (user equipment 71 of FIG. 7) according to the present invention. The transmission process of the user equipment 71 shown in FIG. 8 is described. First, a transmission data buffer unit 803 stores the control data from a protocol processing unit 801 and the user data from an application unit 802. The data stored in the transmission data buffer unit 803 is transmitted to an encoding unit 804 and is subjected to encoding process such as error correction. There may exist the data output from the transmission data buffer unit 803 directly to a modulating unit 805 without encoding process. The data encoded by the encoding unit 804 is modulated by the modulating unit 805. The modulated data is output to a frequency converting unit 806 after being converted into a baseband signal, and then is converted into a radio transmission frequency. After that, a transmission signal is transmitted from an antenna 807 to the base station 72.

The user equipment 71 executes the reception process as follows. The antenna 807 receives the radio signal from the base station 72. The received signal is converted from a radio reception frequency to a baseband signal by the frequency converting unit 806 and is then demodulated by a demodulating unit 808. The demodulated data is transmitted to a decoding unit 809 and is subjected to decoding process such as error correction. Among the pieces of decoded data, the control data is transmitted to the protocol processing unit 801, while the user data is transmitted to the application unit 802. A series of processes of the user equipment 71 is controlled by a control unit 810. This means that, though not shown in FIG. 8, the control unit 810 is connected to the respective units 801 to 809.

Figure 9:
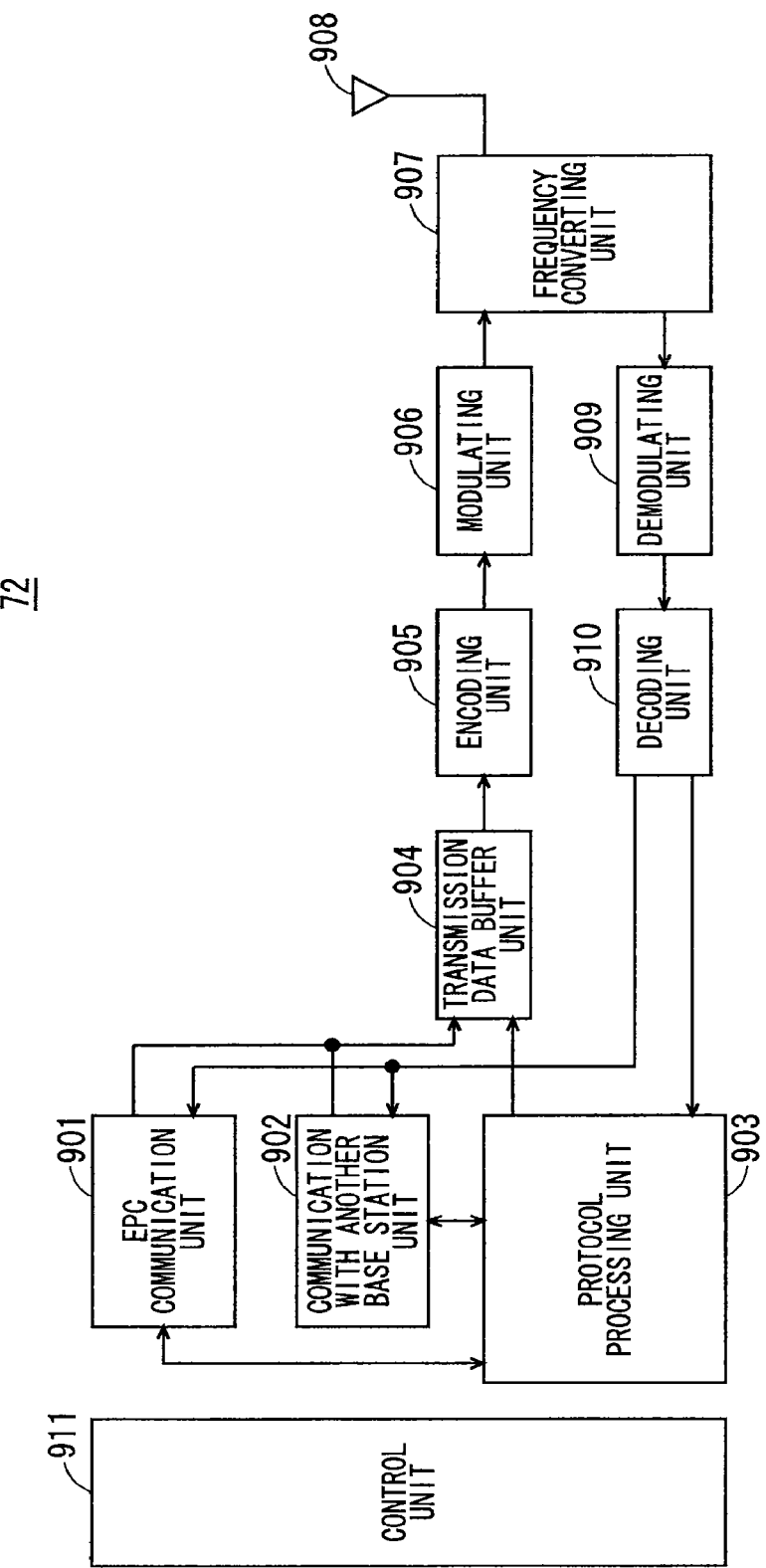
FIG. 9 is a block diagram showing the configuration of a base station (base station 72 of FIG. 7) according to the present invention.

FIG. 9 is a block diagram showing the configuration of the base station (base station 72 of FIG. 7) according to the present invention. The transmission process of the base station 72 shown in FIG. 9 is described. An EPC communication unit 901 performs data transmission/reception between the base station 72 and the EPCs (such as MME unit 73 and HeNBGW 74). A communication with another base station unit 902 performs data transmission/reception to/from another base station. The X2 interface between the Home-eNBs 72-2 is not intended to be supported, and accordingly, it is conceivable that the communication with another base station unit 902 may not exist in the Home-eNB 72-2. The EPC communication unit 901 and the communication with another base station unit 902 respectively transmit/receive information to/from a protocol processing unit 903. The control data from the protocol processing unit 903, and the user data and control data from the EPC communication unit 901 and the communication with another base station unit 902 are stored in a transmission data buffer unit 904.

The data stored in the transmission data buffer unit 904 is transmitted to an encoding unit 905 and is then subjected to encoding process such as error correction. There may exist the data output from the transmission data buffer unit 904 directly to a modulating unit 906 without encoding process. The encoded data is modulated by the modulating unit 906. The modulated data is output to a frequency converting unit 907 after being converted into a baseband signal, and is then converted into a radio transmission frequency. After that, a transmission signal is transmitted from an antenna 908 to one or a plurality of user equipments 71.

While, the reception process of the base station 72 is executed as follows. A radio signal from one or a plurality of user equipments 71 is received by the antenna 908. The received signal is converted from a radio reception frequency into a baseband signal by the frequency converting unit 907, and is then demodulated by a demodulating unit 909. The demodulated data is transmitted to a decoding unit 910 and is then subjected to decoding process such as error correction. Among the pieces of decoded data, the control data is transmitted to the protocol processing unit 903, EPC communication unit 901, or communication with another base station unit 902, while the user data is transmitted to the EPC communication unit 901 and communication with another base station unit 902. A series of processes by the base station 72 is controlled by a control unit 911. This means that, though not shown in FIG. 9, the control unit 911 is connected to the respective units 901 to 910.

The functions of the Home-eNB 72-2 currently under discussion of 3GPP are described below (see Chapter 4.6.2 of Non-Patent Document 1). The Home-eNB 72-2 has the same function as that of the eNB 72-1. In addition, the Home-eNB 72-2 has the function of discovering a suitable serving HeNBGW 74 in a case of connection to the HeN-BGW 74. The Home-eNB 72-2 is connected only to one HeNBGW 74. That is, in a case of the connection to the HeNBGW 74, the Home-eNB 72-2 does not use the Flex function in the S1 interface. When the Home-eNB 72-2 is connected to one HeNBGW 74, it is not simultaneously connected to another HeNBGW 74 or another MME unit 73.

The TAC and PLMN ID of the Home-eNB 72-2 are supported by the HeNBGW 74. When the Home-eNB 72-2 is connected to the HeNBGW 74, selection of the MME unit 73 at "UE attachment" is performed by the HeNBGW 74 instead of the Home-eNB 72-2. The Home-eNB 72-2 may be deployed without network planning. In this case, the Home-eNB 72-2 is moved from one geographical area to another geographical area. Accordingly, the Home-eNB 72-2 in this case is required to be connected to a different HeNBGW 74 depending on its location.

Figure 10:
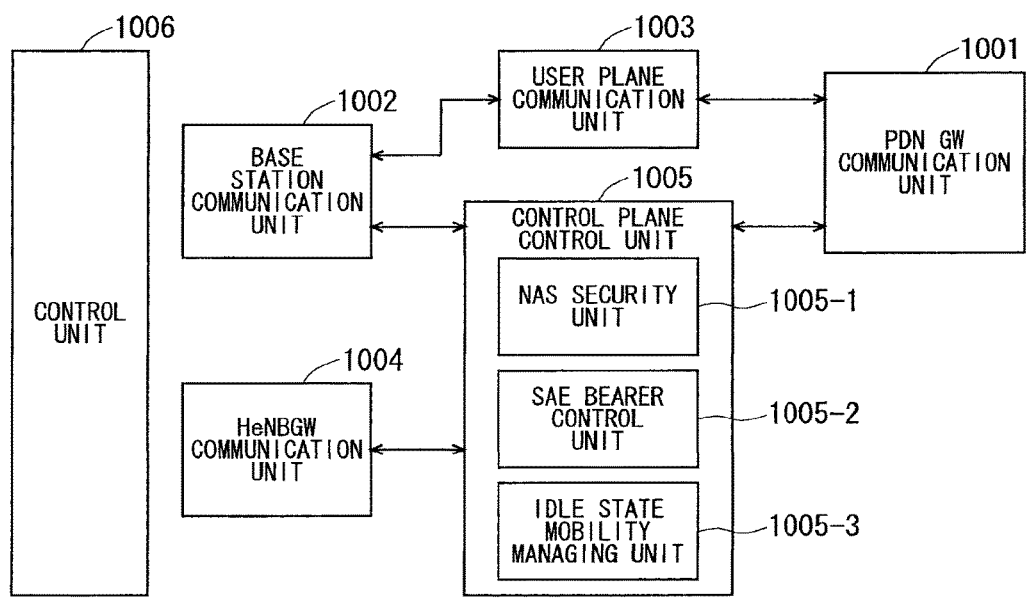
FIG. 10 is a block diagram showing the configuration of an MME (MME unit 73 of FIG. 7) according to the present invention.

FIG. 10 is a block diagram showing the configuration of the MME (MME unit 73 of FIG. 7) according to the present invention. A PDN GW communication unit 1001 performs data transmission/reception between the MME unit 73 and a PDN GW. A base station communication unit 1002 performs data transmission/reception between the MME unit 73 and the base station 72 by means of the S1 interface. In the case where the data received from the PDN GW is user data, the user data is transmitted from the PDN GW communication unit 1001 to the base station communication unit 1002 through a user plane communication unit 1003 and is then transmitted to one or a plurality of base stations 72. In the case where the data received from the base station 72 is user data, the user data is transmitted from the base station communication unit 1002 to the PDN GW communication unit 1001 through the user plane communication unit 1003 and is then transmitted to the PDN GW.

In the case where the data received from the PDN GW is control data, the control data is transmitted from the PDN GW communication unit 1001 to a control plane control unit 1005. In the case where the data received from the base station 72 is control data, the control data is transmitted from the base station communication unit 1002 to the control plane control unit 1005.

A HeNBGW communication unit 1004 is provided in the case where the HeNBGW 74 is provided, which performs data transmission/reception by means of the interface (IF) between the MME unit 73 and the HeNBGW 74 according to an information type. The control data received from the HeNBGW communication unit 1004 is transmitted from the HeNBGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by means of the S1 interface through the base station communication unit 1002, and are transmitted to one or a plurality of HeNBGWs 74 through the HeNBGW communication unit 1004.

The control plane control unit 1005 includes a NAS security unit 1005-1, an SAE bearer control unit 1005-2 and an idle state mobility managing unit 1005-3, and performs overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of paging signal in an idle state, addition, deletion, update and search of a tracking area (TA) of one or a plurality of user equipments 71 being served thereby, and TA list management.

The MME unit 73 begins a paging protocol by transmitting a paging message to the cell belonging to a tracking area (TA) in which the UE is registered. The idle state mobility managing unit 1005-3 may manage the CSG of the Home-eNBs 72-2 to be connected to the MME unit 73, CSG-IDs and a whitelist.

In the CSG-ID management, the relationship between a user equipment corresponding to the CSG-ID and the CSG cell is managed (added, deleted, updated or searched). For example, it may be the relationship between one or a plurality of user equipments whose user access registration has been performed with a CSG-ID and the CSG cells belonging to this CSG-ID. In the whitelist management, the relationship between the user equipment and the CSG-ID is managed (added, deleted, updated or searched). For example, one or a plurality of CSG-IDs with which user registration has been performed by a user equipment may be stored in the whitelist. The above-mentioned management related to the CSG may be performed by another part of the MME unit 73. A series of processes by the MME unit 73 is controlled by a control unit 1006. This means that, though not shown in FIG. 10, the control unit 1006 is connected to the respective units 1001 to 1005.

The function of the MME currently under discussion of 3GPP is described below (see Chapter 4.6.2 of Non-Patent Document 1). The MME performs access control for one or a plurality of user equipments being members of closed subscriber groups (CSGs). The MME recognizes the execution of paging optimization as an option.

Figure 11:
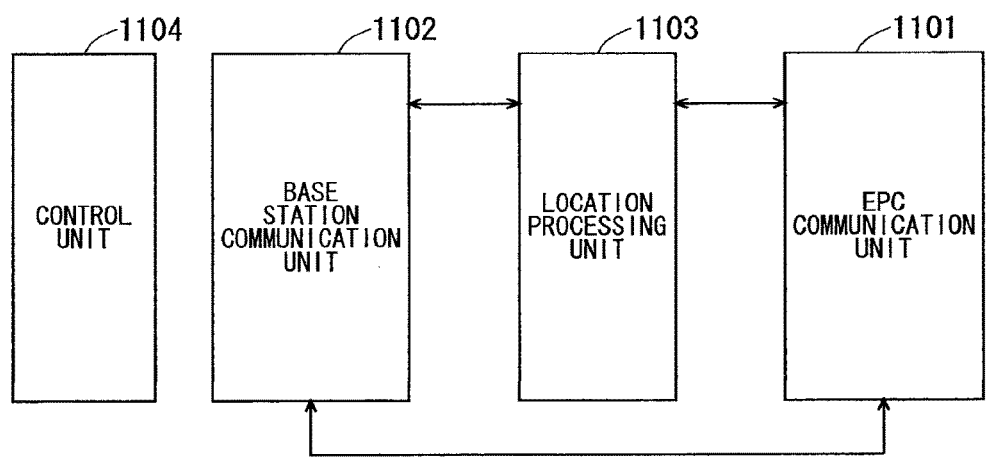
FIG. 11 is a block diagram showing the configuration of a HeNBGW 74 shown in FIG. 7 that is a HeNBGW according to the present invention.

FIG. 11 is a block diagram showing the configuration of the HeNBGW 74 shown in FIG. 7 that is a HeNBGW according to the present invention. An EPC communication unit 1101 performs data transmission/reception between the HeNBGW 74 and the MME unit 73 by means of the S1 interface. A base station communication unit 1102 performs data transmission/reception between the HeNBGW 74 and the Home-eNB 72-2 by means of the S1 interface. A location processing unit 1103 performs the process of transmitting, to a plurality of Home-eNBs 72-2, the registration information or the like among the data transmitted from the MME unit 73 through the EPC communication unit 1101. The data processed by the location processing unit 1103 is transmitted to the base station communication unit 1102 and is transmitted to one or a plurality of Home-eNBs 72-2 through the S1 interface.

The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of processes by the HeNBGW 74 is controlled by a control unit 1104. This means that, though not shown in FIG. 11, the control unit 1104 is connected to the respective units 1101 to 1103.

The function of the HeNBGW 74 currently under discussion of 3GPP is described below (see Chapter 4.6.2 of Non-Patent Document 1). The HeNBGW 74 relays an S1 application. The HeNBGW 74 terminates the S1 application that is not associated with the user equipment 71 though it is a part of the procedures toward the Home-eNB 72-2 and towards the MME unit 73. When the HeNBGW 74 is deployed, the procedure that is not associated with the user equipment 71 is communicated between the Home-eNB 72-2 and the HeNBGW 74 and between the HeNBGW 74 and the MME unit 73. The X2 interface is not set between the HeNBGW 74 and another node. The HeNBGW 74 recognizes the execution of paging optimization as an option.

Figure 12:
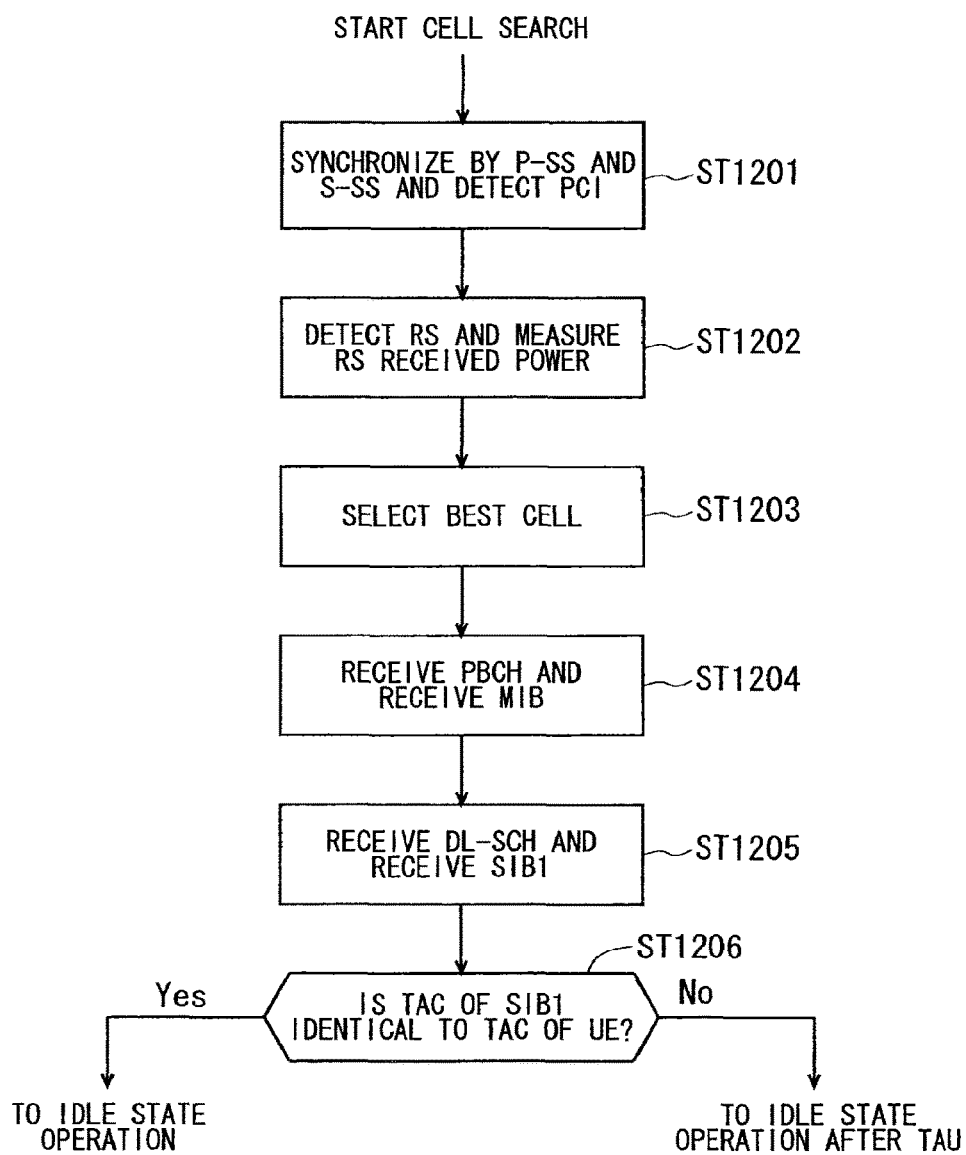
FIG. 12 is a flowchart showing an outline from a cell search to an idle state operation performed by a user equipment (UE) in the LTE communication system.

Next, an example of a typical cell search method in a mobile communication system is described. FIG. 12 is a flowchart showing an outline from cell search to idle state operation performed by a user equipment (UE) in the LTE communication system. When the cell search is started by the user equipment, in Step ST1201, the slot timing and frame timing are synchronized by a primary synchronization signal (P-SS) and a secondary synchronization signal (S-SS) transmitted from a nearby base station. Synchronization codes, which correspond to physical cell identities (PCIs) assigned per cell one by one, are assigned to the synchronization signals (SS) including the P-SS and S-SS. The number of PCIs is currently studied in 504 ways, and these 504 ways are used for synchronization, and the PCIs of the synchronized cells are detected (specified).

Next, in Step ST1202, a reference signal RS of the synchronized cells, which is transmitted from the base station per cell, is detected and the received power is measured. The code corresponding to the PCI one by one is used for the reference signal RS, and separation from the other cells is enabled by correlation using the code. The code for RS of the cell is derived from the PCI specified in Step ST1201, which makes it possible to detect the RS and measure the RS received power.

Next, in Step ST1203, the cell having the best RS reception quality (for example, cell having the highest RS received power; best cell) is selected from one or more cells that have been detected up to Step ST1202.

In Step ST1204, next, the PBCH of the best cell is received, and the BCCH that is the broadcast information is obtained. A master information block (MIB) containing the cell configuration information is mapped on the BCCH over the PBCH. Accordingly, the MIB is obtained by obtaining the BCCH through reception of the PBCH. Examples of the MIB information include the downlink (DL) system bandwidth (also referred to as transmission bandwidth configuration (dl-bandwidth)), transmission antenna number and system frame number (SFN).

In Step ST 1205, next, the DL-SCH of the cell is received based on the cell configuration information of the MIB, to thereby obtain a system information block (SIB) 1 of the broadcast information BCCH. The SIB1 contains the information regarding access to the cell, information related to cell selection and scheduling information of other SIB (SIBk; k is an integer equal to or larger than two). In addition, the SIB1 contains a tracking area code (TAC).

In Step ST1206, next, the user equipment compares the TAC of the SIB1 received in Step ST1205 with the TAC that has been already possessed by the user equipment. In a case where they are identical to each other as a result of comparison, the user equipment enters an idle state operation in the cell. In a case where they are different from each other as a result of comparison, the user equipment requires a core network (EPC) (including MME and the like) to change a TA through the cell for performing tracking area update (TAU). The core network updates the TA based on an identification number (such as a UE-ID) of the user equipment transmitted from the user equipment together with a TAU request signal. The core network updates the TA, and then transmits the TAU accepted signal to the user equipment. The user equipment rewrites (updates) the TAC (or TAC list) of the user equipment with the TAC of the cell. After that, the user equipment enters the idle state operation in the cell.

In the LTE and universal mobile telecommunication system (UMTS), the introduction of a closed subscriber group (CSG) cell is studied. As described above, access is allowed for only one or a plurality of user equipments registered with the CSG cell. The CSG cell and one or a plurality of user equipments that have been registered constitute one CSG. A specific identification number referred to as CSG-ID is added to the thus constituted CSG. Note that one CSG may contain a plurality of CSG cells. After being registered with any one of the CSG cells, the user equipment can access another CSG cell of the CSG to which the CSG cell with which the user equipment has been registered belongs.

Alternatively, the Home-eNB in the LTE or the Home-NB in the UMTS is used as the CSG cell in some cases. The user equipment registered with the CSG cell has a whitelist. Specifically, the whitelist is stored in the subscriber identity module (SIM)/USIM. The CSG information of the CSG cell with which the user equipment has been registered is stored in the whitelist. Specific examples of the CSG information include CSG-ID, tracking area identity (TAI) and TAC. Any one of the CSG-ID and TAC is adequate as long as they are associated with each other. Alternatively, GCI is adequate as long as the CSG-ID and TAC are associated with the global cell identity (GCI).

As can be seen from the above, the user equipment that does not have a whitelist (including a case where the whitelist is empty in the present invention) is not allowed to access the CSG cell but is allowed to access the non-CSG cell only. On the other hand, the user equipment which has a whitelist is allowed to access the CSG cell of the CSG-ID with which registration has been performed as well as the non-CSG cell.

3GPP discusses that all physical cell identities (PCIs) are split (referred to as PCI-split) into ones reserved for CSG cells and the others reserved for non-CSG cells (see Non-Patent Document 5). Further, 3GPP discusses that the PCI split information is broadcast in the system information from the base station to the user equipments being served thereby. Non-Patent Document 5 discloses the basic operation of a user equipment by PCI split. The user equipment that does not have the PCI split information needs to perform cell search using all PCIs (for example, using all 504 codes). On the other hand, the user equipment that has the PCI split information is capable of performing cell search using the PCI split information.

Further, 3GPP has determined that the PCIs for hybrid cells are not contained in the PCI range for CSG cells (see Chapter 10.7 of Non-Patent Document 1).

In 3GPP, there are two modes in the method of selecting or reselecting a CSG cell by a user equipment. One is an automatic mode. The feature of the automatic mode is described below. The user equipment performs selection or reselection with the use of an allowed CSG list (allowed CSG ID list) in the user equipment. After the completion of PLMN selection, the user equipment camps on one cell in the selected PLMN only in a case of a non-CSG cell or a CSG cell with a CSG ID present in the allowed CSG list. The user equipment disables an autonomous search function of the CSG cell if the allowed CSG list of the user equipment is empty (see Chapter 5.2.4.8.1 of Non-Patent Document 3).

The second is a manual mode. The feature of the manual mode is described below. The user equipment shows a list of available CSGs in the currently selected PLMN to the user.

The list of CSGs provided to the user by the user equipment is not limited to the CSGs included in the allowed CSG list stored in the user equipment. The user selects the CSG based on the list of CSGs, and then the user equipment camps on the cell with the selected CSG ID, to thereby attempt registration (see Chapter 5.2.4.8.1 of Non-Patent Document 3).

The HeNB and HNB are required to support various types of service. For example, an operator causes the predetermined HeNB and HNB to register user equipments therein and allows only the registered user equipments to access the cells of the HeNB and HNB, so that the radio resources that can be used by the user equipments are increased for performing high-speed communication. In such service, the operator correspondingly sets a higher accounting fee compared with normal service.

In order to achieve the above-mentioned service, the closed subscriber group (CSG) cell that can be accessed only by the registered (subscribed or member) user equipments is introduced. It is required to deploy a large number of closed subscriber group (CSG) cells in shopping malls, apartment buildings, schools, companies and the like. For example, the CSG cells are required to be deployed for each store in shopping malls, for each room in apartment buildings, for each classroom in schools, and for each section in companies in such a manner that only the users who have registered with the respective CSG cells are allowed to use those CSG cells. The HeNB/HNB is required not only to complement the communication outside the coverage of the macro cell but also to support various types of service as described above. This leads to a case where the HeNB/HNB is deployed within the coverage of the macro cell.

In a case where a HeNB/HNB is deployed in the coverage of a macro cell, interference occurs between the HeNB/HNB and the macro cell. The radio wave from the macro cell interferes with the communication of the user equipment (UE), which is communicating with the HeNB/HNB in the coverage of the HeNB/HNB. Increased interference power due to the radio wave from the macro cell prevents a user equipment from communicating with the HeNB/HNB. On the other hand, in a case where a user equipment communicating with a macro cell in the coverage of the macro cell moves into the coverage of the HeNB/HNB deployed in the coverage of the macro cell, the interference of the radio wave from the HeNB/HNB interferes with the communication with the macro cell. Increased interference power due to the radio wave from the HeNB/HNB prevents a user equipment from communicating with a macro cell.

As a method of reducing the interference between a normal eNB (macro cell; macro eNB (MeNB)) and a HeNB, Non-Patent Document 8 discloses the method of notifying a HeNB of the high interference indication (HII) and overload indicator (OI) by a macro cell.

The HII is a signal for notifying, by a cell, an appropriate cell of the physical resource that is apt to be interfered or desired not to be interfered. As an example, in a case where there is a physical resource desired to be scheduled to a UE, the cell notifies a cell nearby of the HII for eliminating the interference to the physical resource. The cell nearby that has received the HII avoids the scheduling of the physical resource to a UE being served thereby or lowers the power of the physical resource, to thereby avoid interference.

The OI is a signal for notifying, by a cell, an appropriate cell of the physical resource being influenced by the interference and its interference level or a fact that the level is higher than a threshold. As an example, in a case where there is a physical resource that is desired to be scheduled to a UE or is scheduled, the cell notifies a cell nearby of the OI for eliminating interference to the physical resource. The cell nearby that has received the OI avoids the scheduling of the physical resource to a UE being served thereby or lowers the power of the physical resource, to thereby avoid interference.

It is determined in the current 3GPP standards that the HII and OI may be transmitted/received between macro cells by means of an X2 interface. However, in the current 3GPP standards, as shown in FIG. 7, the X2 interface is not provided between the eNB 72-1 being a macro cell and the HeNB 72-2 and between the HeNBs 72-2.

Therefore, Non-Patent Document 8 describes that an X2 interface is provided between a macro cell and a HeNB, between a macro cell and a HeNBGW and between a HeNBGW and a HeNB, and the macro cell notifies the HeNB of the HII and OI by means of the X2 interface. However, a HeNB is assumed to be used at home, and is also studied to be deployed so as to be managed by a general user, not by an operator. The connection between HeNBs or between a macro cell and a HeNB by means of an X2 interface in the case where a HeNB is deployed so as not to be managed by an operator in this manner leads to a problem that the configuration becomes complicated.

Non-Patent Document 9 discloses that a macro cell notifies a HeNB of the HII via a UE being served by the macro cell. It is proposed that the PRACH or UL-SCH be used as a channel on which notification is made from a UE to a HeNB. While Non-Patent Document 9 describes the channel on which notification is made from a UE to a HeNB but does not describe anything else, and the mechanism in which a macro cell notifies a HeNB of the HII is unclear. For example, a UE being served by a macro cell normally does not know the RACH configuration of the HeNB. Accordingly, a UE being served by a macro cell cannot send the PRACH to a HeNB. Non-Patent Document 9 does not disclose the method of solving such a problem.

In order to solve such a problem, the present invention discloses the method of enabling a macro cell to notify a HeNB of the information related to the interference (hereinafter, referred to as "interference-related information in some cases) to a physical resource used at a macro cell, specifically, a signal for avoiding the interference such as the HII and OI via a UE.

Non-Patent Document 9 discloses that a macro cell notifies a HeNB of the HII via the UE being served by the macro cell but does not specifically disclose a HeNB is notified of the HII or a UE that notifies a HeNB of the HII. In a case where it is considered that a large number of HeNBs will be deployed, the system will become complicated and a signaling load will become enormous unless HeNBs to be notified are limited. In addition, unless the UEs to be notified are limited, a signaling load will become enormous, and uplink interference will increase, leading to the degradation of communication quality.

In order to solve such a problem, the present embodiment discloses the method of limiting HeNBs to be notified of the HII and the method of limiting the UEs to be notified of the HII. Disclosed here is the method of limiting the HeNBs to be notified of the HII to the HeNBs within the coverage of a macro cell.

Figure 13:
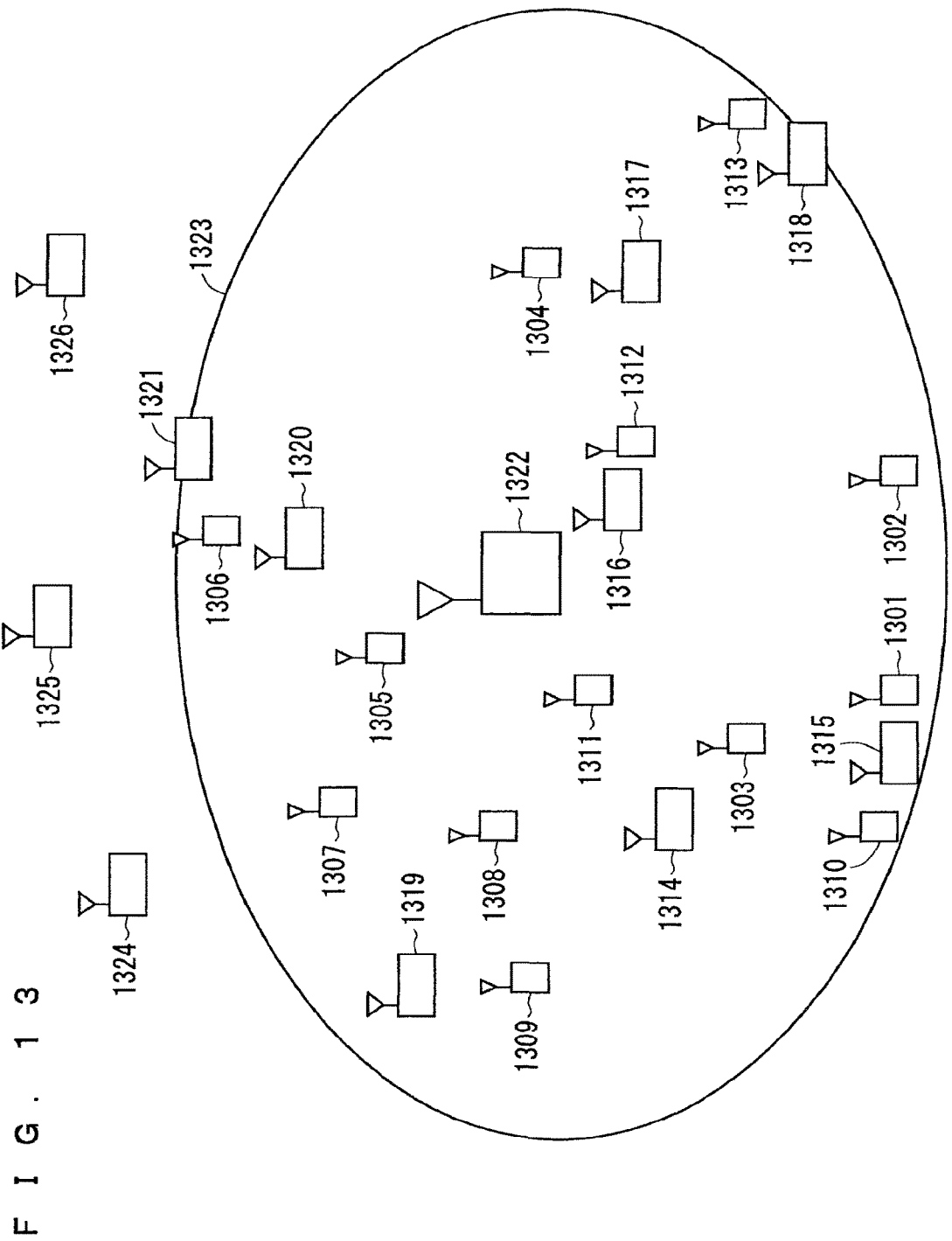
FIG. 13 is a conceptual diagram in a case where HeNBs are deployed in the coverage of a macro cell.

FIG. 13 is a conceptual diagram in a case where HeNBs are deployed in the coverage of a macro cell. In FIG. 13, reference numerals 1301 to 1313 denote UEs, reference numerals 1314 to 1321 and reference numerals 1324 to 1326 denote HeNBs, and a reference numeral 1322 denotes an eNB being a macro cell. A reference numeral 1323 denotes the coverage of the macro cell 1322. The coverage 1323 corresponds to a large-scale coverage. The HeNBs 1314 to 1321 are deployed within the coverage of the macro cell 1322, and the HeNBs 1324 to 1326 are deployed outside the coverage of the macro cell 1322. The UEs 1301 to 1313 correspond to the UEs 71 of FIG. 7 described above, the HeNBs 1314 to 1321 and 1324 to 1326 correspond to the Home-eNBs 72-2 of FIG. 7 that are small-scale base station devices, and the macro cell 1322 corresponds to the eNB 72-1 of FIG. 7 that is a large-scale base station device.

It is no use to notify HeNBs deployed outside the coverage 1323 of the HII by the macro cell 1322. This is because the UE being served by the macro cell 1322 is little influenced by the interference from the HeNB deployed outside the coverage 1323 of the macro cell 1322 and, on the other hand, the UE being served by the HeNB deployed outside the coverage 1323 of the macro cell 1322 is little influenced by the interference from the macro cell 1322.

Accordingly, in the present embodiment, the HeNBs notified of the HII are HeNBs deployed within the coverage 1323 of the macro cell 1322. For example, in the case of FIG. 13, the HeNBs notified of the HII by the macro cell 1322 are the HeNBs 1314 to 1321 deployed in the coverage 1323 of the macro cell 1322. The macro cell 1322 notifies the HeNBs 1314 to 1321 of the HII via the UEs being served thereby. This limits the number of HeNBs to be notified of the HII, which enables to reduce the signaling load necessary for notification of the HII.

The macro cell is required to recognize HeNBs deployed in the coverage of the own cell. Disclosed here is the method of judging a HeNB deployed in the coverage of a macro cell. FIG. 14 is a diagram showing a sequence example of a mobile communication system in a case where a macro cell judges HeNBs deployed in the coverage. In Step ST1401, the HeNB measures a surrounding radio wave environment, that is, performs measurements in power-on or initialization, or while transmission is stopped. In addition, the HeNB measures the received power of cells present in its vicinity and obtains the cell identities (PCIs) of the cells, to thereby detect the cells. In this case, a cell having the received power equal to or larger than a certain received power threshold may be detected. The received power threshold for cell detection may be preliminarily determined in a static manner.

In Step ST1402, the HeNB receives the broadcast information of the cell from the detected cell. This may be performed in the measurements. In Step ST1403, the HeNB that has received the broadcast information from each cell judges whether or not that cell is a macro cell. In order to enable this judgment, each cell may broadcast an indicator as to whether or not the own cell is a macro cell or the information indicating a cell type. In this case, by obtaining the type of the detected cell from the received broadcast information in Step ST1403, the HeNB judges whether or not that cell is a macro cell. Examples of the cell types include a macro cell, pico eNB (pico cell), node for hotzone cells, HeNB/HNB/CSG cell, relay node, and remote radio head (RRH).

In the case where it is possible to judge whether or not the cell is a macro cell from the identity (PCI) of the cell, the HeNB may omit to obtain the cell type in Step ST1403. In this case, the HeNB may judge as to whether the cell is a macro cell based on the PCI of the cell obtained in Step ST1401.

In Step ST1404, the HeNB associates the received power information measured for each of the macro cells detected in the measurements with the PCI of that macro cell, and notifies the MME/S-GW. On that occasion, the HeNB also notifies the cell identity (PCI) of the own HeNB. The MME/S-GW corresponds to the MME/S-GW unit 73 shown in FIG. 7 described above.

The MME/S-GW may be notified in power-off operation. The information indicating that power is turned off or the information indicating that the deletion from the HII notified HeNB list is requested may be notified in addition to the above-mentioned information. This enables to take, for example, the case where power is turned off when a HeNB is moved by a user into account in the judgment as to whether a macro cell needs to notify the HII.

In Step ST1405, the MME/S-GW notifies each macro cell of the PCI of the HeNB and the received power information of the macro cell measured by the HeNB, based on the PCI of the macro cell received from each HeNB. An S1 interface may be used in the notification to the macro cell. In a case where an X2 interface that directly connects the macro cell and the HeNB is provided, it suffices that the HeNB directly notifies the macro cell of the information on the received power measurement results and the PCI of the own HeNB per macro cell.

Each macro cell that has received the measurement results by the HeNB and the PCI of the HeNB judges whether or not the HeNB is deployed in the coverage of the own cell. The macro cell makes judgment using, for example, the received power measurement results of the macro cell by the HeNB.

In this case, the macro cell sets the threshold indicating whether or not a HeNB is in the coverage of the own cell (hereinafter, referred to as coverage judgment threshold) in advance and, in Step ST1406, compares the received power measurement value showing the received power measurement results per HeNB with the coverage judgment threshold. The macro cell judges that the HeNB is in the coverage of the own cell if the received power measurement value is equal to or larger than the coverage judgment threshold or judges that the HeNB is outside the coverage of the own cell if the received power measurement value is smaller than the coverage judgment threshold. The macro cell moves to Step ST1407 in the case of judging that the HeNB is in the coverage or moves to Step ST1408 in the case of judging that the HeNB is outside the coverage.

In the case of judging that the HeNB is in the coverage in Step ST1406 and moving to Step ST1407, in Step ST1407, the macro cell stores that the HeNB is in the coverage of the own cell. Accordingly, it suffices that a list (hereinafter, referred to as HII notified HeNB list) is provided and the HeNB is added to the list. The HII notified HeNB list includes the cell identity (PCI) of the HeNB. Further, the HII notified HeNB list may include the received power value of the own cell that has been measured by the HeNB together with the PCI of the HeNB. The HII notified HeNB list may be stored in the EPC communication unit 901, protocol processing unit 903 or control unit 911 shown in FIG. 9.

In the case of judging that the HeNB is outside the coverage in Step ST1406 and moving to Step ST1408, in Step ST1408, the macro cell deletes the HeNB from the HII notified HeNB list. In a case where the HeNB has not been found in the HII notified HeNB list, the macro cell performs nothing and moves to the next Step ST1409.

The processes described above allow the macro cell to judge the HeNB deployed in the coverage of the own cell among the HeNBs notified of the received power measurement value of the own cell and store that HeNB in the HII notified HeNB list.

In Step ST1409, the macro cell judges whether or not to notify the HeNB of the HII. The macro cell moves to Step ST1410 in a case of judging to notify the HII, or in a case of judging not to notify the HII, does not notify the HII and moves to the next process.

In Step ST1410, the macro cell judges whether or not a HeNB is the HeNB included in the HII notified HeNB list for judging as to which HeNB is the HeNB to be notified of the HII. The macro cell moves to Step ST1411 in a case of judging that a HeNB is the HeNB included in the HII notified HeNB list, or in a case of judging that a HeNB is not the HeNB included in the HII notified HeNB list, in other words, a HeNB that is not included in the HII notified HeNB list, performs nothing and moves to the next process. In Step ST1411, the macro cell notifies the HeNB included in the HII notified HeNB list of the HII.

The processes described above allow the macro cell to judge the HeNB deployed in the coverage of the own cell among the HeNBs notified of the received power measurement value of the own cell and notify the HeNB of the HII as required.

In a case where a HeNB is moved by a user or the like, power may be turned on after being turned off once, or initialization may be performed. The above-mentioned operation is performed upon this, whereby a macro cell is allowed to judge whether the HeNB is deployed in the coverage of the own cell. This enables to add or delete the HeNB to or from the HII notified HeNB list. Therefore, it is possible to notify the HeNB of the HII as required.

While a macro cell is configured to judge which HeNB is deployed in the coverage of the own cell and which HeNB is not deployed in the coverage of the own cell in the method described above, as another method, a HeNB may be configured to judge whether or not it is deployed in the coverage of the macro cell. In this case, the measurement results of the HeNB may be used.

FIG. 15 is a diagram showing a sequence example of a mobile communication system in a case where a HeNB judges whether or not it is deployed in the coverage of a macro cell. The portions of FIG. 15 corresponding to those of FIG. 14 are denoted by the same step numbers, and the processes thereof are not described in detail.

In Step ST1401, in the measurements in power-on or initialization, or while transmission is stopped, the HeNB measures the received power of the cells present in its vicinity and obtains the cell identities (PCIs) of the cells, to thereby detect the cells. In Step ST1402, the macro cell broadcast, to the HeNB, the coverage judgment threshold being the threshold indicating whether or not the HeNB is within the coverage thereof as the broadcast information. In Step ST 1402, the HeNB receives the broadcast information of the detected cell.

In Step ST1501, the HeNB that has received the broadcast information from each cell obtains the coverage judgment threshold in addition to the cell type information shown in FIG. 14.

In Step ST1502, the HeNB compares the received power measured for each macro cell of the macro cells detected in the measurements and the coverage judgment threshold broadcast from the macro cell. The HeNB judges whether or not the received power of each macro cell is equal to or larger than the coverage judgment threshold of the macro cell. In the case where the received power of the macro cell that has been measured is equal to or larger than the coverage judgment threshold, the HeNB judges that it is in the coverage of the macro cell and moves to Step ST1503. Meanwhile, in the case where the received power of the macro cell that has been measured is smaller than the coverage judgment threshold, the HeNB judges that it is outside the coverage of the macro cell and moves to Step ST1504. The HeNB provides the information (which may be a parameter) indicating whether or not it is in the coverage of the macro cell.

In Step ST1503, the HeNB sets "being in the coverage" in the information indicating whether or not the HeNB is in the coverage of the macro cell. Specifically, the cell identity of the macro cell may be associated with the information, or the cell identity of the macro cell may be included in the information.

In Step ST1504, the HeNB sets "being outside the coverage" in the information indicating whether or not the HeNB is in the coverage of the macro cell.

In Step ST1505, each HeNB notifies the MME/S-GW of the PCI and the information indicating "being in the coverage" or not per macro cell of the detected macro cells. On that occasion, the HeNB notifies the cell identity (PCI) of the own HeNB as well.

In Step ST1506, the MME/S-GW notifies each macro cell of the PCI of the HeNB and the information indicating "being in the coverage" or not, based on the PCI of the macro cell that has been received from each HeNB.

In Step ST1507, each macro cell that has received the information indicating whether "being in the coverage" or not and the PCI of the HeNB judges whether or not the HeNB is deployed in the coverage of the own cell. In this judgment, the information indicating whether or not the HeNB is in the coverage that has been notified from each HeNB. The macro cell moves to Step ST1508 in the case of judging that the HeNB is deployed in the coverage of the own cell, or moves to Step ST1509 in the case of judging that the HeNB is not deployed in the coverage of the own cell, that is, in the case of judging that the HeNB is deployed outside the coverage.

In Step ST1508, the macro cell adds the HeNB whose information indicating "being in the coverage" or not has been set as "being in the coverage" to the HII notified HeNB list.

In Step ST1509, the macro cell deletes the HeNB whose information indicating "being in the coverage" or not has been set as "being outside the coverage" from the HII notified HeNB list. After performing the processes of Step ST1508 and Step ST1509, the macro cell performs the respective processes of Step ST1409, Step ST1410 and Step ST1411.

Execution of the above-mentioned processes allows the macro cell to store the HeNB deployed in the coverage of the own cell in the HII notified HeNB list. In addition, the judgment as to whether or not the HeNB is in the coverage of the macro cell is substantially performed by the HeNB and, also in that case, the macro cell is allowed to notify the HeNB deployed in the coverage of the own cell of the HII as required.

The macro cell may broadcast the coverage judgment threshold by including it in the MIB or SIB1. The transmission timing of the MIB or SIB1 has been determined, whereby it is possible to receive the MIB or SIB1 with fewer processes in a case where the HeNB performs measurements. The coverage judgment threshold may be determined in advance as a static value or may be determined by being associated with the transmission power of the macro cell. The correspondence therebetween may be determined in advance as a table or may be derived by a function.

Alternatively, the coverage judgment threshold disclosed in FIG. 14 and FIG. 15 may be identical to a received power threshold which is allowed to be used in the cell detection in Step ST1401. This enables to reduce parameters.

In the method described above, the HeNB judges whether or not it is deployed in the coverage of a macro cell, and notifies the macro cell of the information indicating whether or not the HeNB is deployed in the coverage, which is the judgment results. The information indicating whether "being in the coverage" or not requires only a smaller amount of information compared with the received power measurement value of the macro cell, which enables to reduce the signaling amount from the HeNB to the macro cell. Further, the information indicating whether "being in the coverage" or not may be one bit. This minimizes the amount of information. It suffices that each macro cell is notified of this information and the cell identity of the own HeNB.

While description has been given that the HeNB notifies the cells detected in the measurements of the information indicating whether or not it is in the coverage of the macro cell, the HeNB may notify only the macro cell, in the coverage of which the HeNB has judged that it is deployed, of the information indicating whether or not it is in the coverage. In this case, the information indicating whether "being in the coverage" or not may be the information indicating whether "being deployed in the coverage" or not. This enables to limit the macro cells notified of the information indicating whether "being in the coverage" or not, whereby it is possible to further reduce the signaling amount from the HeNB to the macro cell.

Different HeNBs use the same PCI in some cases. This is because the number of PCIs is limited. In this case, the macro cell cannot judge as to which of the HeNBs having the same PCI should be notified of the HII. In such a case, it suffices that the HeNB notifies each macro cell of the GCI as the cell identity of the own HeNB. It suffices that the GCI is used in place of the PCI of the HeNB in Step ST1404 and Step ST1405 of FIG. 14 or Step ST1505 and Step ST1506 of FIG. 15. It suffices that the macro cell manages the HII notified HeNB list according to the GCI of the HeNB. The GCIs are the identities specific to cells, which do not overlap each other. This enables a macro cell to specify a HeNB.

Disclosed here is via which UE, the HeNB is notified of the HII. The UEs present in the coverage of a macro cell are taken as UEs that are notified of the HII for limiting the number of UEs to be notified of the HII.

In FIG. 13, the macro cell 1322 notifies the HeNBs of the HII via the UEs 1301 to 1313 present in the coverage 1323 of the own macro cell. The macro cell 1322 notifies the UEs 1301 to 1313 present in the coverage 1323 of the information indicating that the HII is notified or the HII. This enables the macro cell 1322 to notify the HeNBs 1314 to 1321 deployed in the coverage 1323 of the macro cell 1322 of the HII via the UEs 1301 to 1313. The UEs being served by the macro cell 1322, that is, the UEs which have the macro cell 1322 as a serving cell may be taken as the UEs present in the coverage 1323 of the macro cell 1322. As a result, the macro cell 1322 is not required to notify the UEs present outside the coverage 1323 of the information indicating that the HII is notified or the HII.

The method disclosed in the present embodiment limits the number of HeNBs to be notified of the HII, which enables to reduce the signaling load required for the notification of the HII. In addition, the number of the UEs to be notified of the HII can be limited, which enables to reduce the signaling load, reduce the uplink interference and improve the communication quality.

Further, the macro cell 1322 is allowed to notify the HeNBs in the coverage 1323 of the HII. Accordingly, the macro cell 1322 is allowed to schedule, to the UEs being served thereby, the physical resources notified of the HeNBs in the coverage 1323 by the HII. This enables to avoid interference in the physical resources. The macro cell 1322 is allowed to flexibly schedule the physical resources to UEs being served thereby, which enables to improve the scheduling efficiency and improve the throughput as a cell.

The method above has disclosed that the HeNBs deployed in the coverage of the macro cell are notified of the HII. Meanwhile, it has been disclosed that the HII is notified via the UE present in the coverage of the macro cell. However, as to the coverage of the macro cell described above, the coverage for a HeNB may be identical to or different from the coverage for a UE. Typically, the range in which a UE can obtain the received power required for a UE to take a macro cell as a serving cell, that is, the received power required for satisfying the criteria in cell selection (Non-Patent Document 3), is referred to as the coverage of the macro cell. The received power may be identical to or different from the received power (coverage judgment threshold) for judging "being in the coverage" by the HeNB.

In the case where the received power required for taking a macro cell as a serving cell is identical to the coverage judgment threshold, a UE is allowed to use the same criteria as the criteria of the received power required for taking the macro cell as a serving cell by a UE. Accordingly, it is not required to separately provide the coverage judgment threshold, which makes control easier.

Meanwhile, in the case where the received power required for taking a macro cell as a serving cell differs from the coverage judgment threshold, it is possible to flexibly set the relationship between the HeNB to be notified of the HII and the UE notified of the HII. For example, the coverage judgment threshold is set to be smaller than the received power required for taking a macro cell as a serving cell by a UE. This enables to notify the HeNBs deployed in a larger range than the coverage for normal UEs of the HII. As a result of the HeNBs deployed in a range slightly larger than the coverage for UEs being notified of the HII, it is possible to further reduce the interference to the UE that takes the macro cell as a serving cell.

It has been described that interference is small between the UE being served by a macro cell and the HeNB deployed outside the coverage of the macro cell, where the interference with the HeNB in the range slightly larger than the coverage of the macro cell, which is the main interference, can be reduced. In particular, it is possible to further reduce the interference with a UE being served by a macro cell present at the edge of the coverage of the macro cell. This further improves the scheduling efficiency of the UE present at the edge of the coverage, which enables to improve the communication rate. Therefore, it is possible to further improve the throughput as a cell.

Meanwhile, in the case where the received power required for taking the macro cell as a serving cell by a UE differs from the received power for judging that the HeNB is in the coverage (that is, coverage judging threshold), an offset parameter indicating a difference value therebetween may be provided. The offset parameter may be preliminarily determined in a static manner or may be broadcast from the macro cell as the broadcast information. This enables to set the offset parameter in synchronization with the coverage for UEs. Alternatively, the offset parameter may be determined per HeNB. In this case, the offset parameter may be notified from a HeNB to a macro cell, which may be notified together with the PCI of the own HeNB. This enables to set the offset parameter per HeNB and enables a flexible operation such as setting in accordance with the output power of a HeNB.

First Modification of First Embodiment

In the first embodiment, the UEs notified of the HII are the UEs being served by a macro cell for limiting the number of UEs to be notified of the HII. However, it is not determined as to which UE notifies the HII to which HeNB. This leads to a case where one HeNB is notified of the HII from a plurality of UEs. FIG. 16 is a conceptual diagram in a case where only one HeNB is deployed in the coverage of a macro cell, and a plurality of UEs are present in the coverage of the macro cell. The portions of FIG. 16 corresponding to those of FIG. 13 are denoted by the same reference numerals, which are not described.

The plurality of UEs 1301 to 1313 are present and one HeNB 1314 is deployed in the coverage 1323 of the macro cell 1322. In such a case, the plurality of UEs 1301 to 1313 being served by the macro cell 1322 notify the one HeNB 1314 of the HII. This increases the signaling amount and interference in the macro cell 1322.

In order to solve the above-mentioned problem, the present modification discloses the method of determining as to which UE notifies which HeNB of the HII. The present modification discloses the method of notifying the HII via the UE having the largest received power from the HeNB.

FIG. 17 is a diagram showing a sequence example of a mobile communication system in a case where the HII is notified via a UE having the largest received power from a HeNB. The portions of FIG. 17 corresponding to those of FIG. 14 are denoted by the same step numbers, and the processes thereof are not described in detail. In FIG. 17, a macro cell selects a UE having the largest received power from a HeNB. In addition, a serving cell is the macro cell.

In Step ST1701, the UE receives the broadcast information from a serving cell in advance. In Step ST1703, the UE measures a surrounding radio wave environment regularly or upon an instruction from a serving cell. In addition, the UE measures the received power of cells present in its vicinity and obtains the cell identities (PCIs) of cells, to thereby detect cells. On this occasion, a cell having received power equal to or larger than a certain received power threshold may be detected. The received power threshold for cell detection may be preliminarily determined in a static manner or may be broadcast from a serving cell. The UE can receive the broadcast information and obtain the reception power threshold. In a case of performing measurements upon instruction from a serving cell, in Step ST1702, the serving cell may notify the UE of a measurement instruction message in advance. The measurement instruction message may include a measurement configuration being the setting contents of measurements.

In Step ST1704, the UE receives the broadcast information of the detected cell. This may be performed in the measurements. In Step ST1705, the UE that has received the broadcast information from each cell judges whether or not the cell is a HeNB. It suffices that for enabling this judgment, each cell broadcasts the indicator as to whether or not the own cell is a HeNB or the information indicating a cell type. Meanwhile, in a case where the PCI of the HeNB is preliminarily determined so as to differ from that of the serving cell, in Step ST1703, the UE may obtain the PCI of a cell to judge whether or not the cell is a HeNB.

In Step ST1706, the UE notifies the serving cell of the received power information measured for each HeNB in association with the cell identity (PCI) of the HeNB that has been detected in the measurements. On that occasion, the UE notifies the identity (UE-ID) of the own UE as well. The measurements results are reported regularly or upon instruction from a serving cell. Alternatively, the measurement results may be reported in a case where, for example, a cell larger than a certain threshold is detected, or the UE may notify the serving cell of the report at an appropriate timing.

In Step ST1707, the serving cell that has received the received power measurement results of a HeNB detected in the measurements by each UE and the PCI of the HeNB selects the UE having the largest received power from the HeNB per HeNB.

In Step ST1708, the serving cell adds the information of the UE to the HII notified HeNB list. The HII notified HeNB list is a list that stores the HeNBs to be notified of the HII, as disclosed in the first embodiment, which may be created using the method disclosed in the first embodiment. The list is not particularly required, and it suffices that the HeNB to be notified of the HII is associated with the selected UE. The UE information may be the UE-ID. In a case where the UE information has already been included in the HII notified HeNB list and the existing UE information differs from the newly selected UE information, the UE information may be corrected to the new UE information. Alternatively, in a case where the HeNB that has the existing UE information loses the new UE information, the UE information may be deleted. Those may be performed in a case where the notification of Step ST1706 is received or may be regularly performed.

After the completion of the process of Step ST1708, the serving cell performs each of the above-mentioned processes in Step ST1409 and ST1410, and moves to Step ST1709. In Step ST1709, the serving cell notifies the HeNB in the HII notified HeNB list of the HII via the UE in the list.

Through execution of the processes above, the serving cell is allowed to recognize via which UE, it notifies the HeNB to be notified of the HII of the HII. In the case of FIG. 17, it is possible to notify the HeNB to be notified of the HII of the HII via the UE having the largest received power from the HeNB.

To describe the example of FIG. 16, the macro cell 1322 is allowed to notify the HeNB 1314 of the HII via the UE (in this case, UE 1303) having the largest received power from the HeNB 1314 among a plurality of UEs present in the coverage 1323.

In a case where different HeNBs can use the same PCI, the GCI may be used as the cell identity of the HeNB. The HeNB broadcasts the GCI of the own HeNB. The UE receives the broadcast information of the HeNB and obtains the GCI of the HeNB in the measurements of a cell nearby. The UE may notify the serving cell of the GCI as the cell identity of the HeNB. The serving cell may refer to the GCI of the HeNB in the HII notified HeNB list, to thereby add, correct or delete the UE-ID of the UE having the largest received power from the HeNB to, in or from the list. The GCIs are the identities specific to cells, which do not overlap each other. Therefore, the macro cell is allowed to specify the HeNB.

The method disclosed in the present modification enables the macro cell to notify each HeNB, which is to be notified of the HII, of the HII via one UE. However, the UE is not necessarily selected for all HeNBs deployed in the coverage of a macro cell. There is conceivable a case where there is a HeNB that is not included in the report on the measurement results from UEs being served by the macro cell. In this case, however, the UEs being served by the macro cell include no UE that receives the transmission wave from the HeNB or receives the power equal to or larger than a specific received power threshold. This means that there is no UE influenced by the interference from the HeNB. Accordingly, it is not necessarily required to select a UE for the HeNB and notify the HeNB of the HII.

The HeNBs stored in the HII notified HeNB list in Step ST1708 of FIG. 17 may be all HeNBs reported from the UE in Step ST1706. As a result, a UE is selected for the HeNB included in the HII notified HeNB list.

The method disclosed in the present modification enables to notify each HeNB, which is to be notified of the HII, of the HII via one UE. This allows the macro cell to limit the UE to be notified of the information indicating that the HII is notified or the HII, to the UE. Further, the UE that notifies the HeNB of the HII can also be limited to the UE, which enables to further limit the number of UEs. Therefore, it is possible to reduce the signaling load, reduce uplink interference, and improve the communication quality.

The UE present at the edge of the coverage area of the macro cell detects, in measurements, the cell deployed outside the coverage for the HeNBs of the serving cell at times. In this case, the serving cell may limit only the HeNB deployed in the coverage for the HeNB from the HeNBs notified in the report on the measurement results from a UE by the method of judging a HeNB deployed in the coverage for a HeNB, which is disclosed in the first embodiment. This enables to further reduce the signaling load, reduce uplink interference and improve communication quality.

In the method disclosed above, there is a conceivable case where one UE notifies a plurality of HeNBs of the HII. For example, the UE 1306 shown in FIG. 13 has the largest received power from the HeNB 1320 and the HeNB 1321 compared with other UEs. Therefore, the UE 1306 is selected as the UE that notifies the HeNB 1320 and the HeNB 1321 of the HII. The UE that has to notify a plurality of HeNBs of the HII consumes an increased amount of power. In order to solve this problem, the HeNB notified of the HII by a UE may be limited to one. An example of that method is disclosed below.

The macro cell selects a UE having the highest received power for all HeNBs notified in the report on the measurement results from UEs being served thereby. If a plurality of HeNBs select the same UE, the UE is selected for a HeNB having the highest received power by the UE. In the case where a plurality of HeNBs select the same UE, a UE having the second-highest received power is selected for HeNBs that do not have the highest received power. In the case where there is the UE that has not been selected among the UEs having the second-highest received power, that UE is selected. If the UE having the second-highest received power has been selected for another HeNB, a UE having the third-highest received power is selected. Similarly, if a UE having the n-th highest received power has been selected for another HeNB, a UE having the (n+1)th highest received power is selected.

The use of the procedure above causes one UE to limit a HeNB to be notified of the HII to one. For example, in the case described above, the UE 1306 is selected for the HeNB 1321, and the UE 1305 is selected for the HeNB 1320. The method disclosed here enables to prevent an increase in power consumption of a specific UE.

Second Modification of First Embodiment

In the first modification of the first embodiment, a macro cell selects a UE, through which the HII is notified, and notifies a HeNB of the HII via that UE. The present modification discloses the method of selecting, by a UE, a HeNB to be notified of the HII. As an example, a macro cell notifies a UE being served thereby of the interference-related information, for example, the information indicating that the HII is notified (hereinafter, referred to as "notification information" in some cases) or the HII, and the UE that has received the information judges a HeNB to be notified of the HII. Then, the UE notifies the HeNB judged to be notified of the HII of the HII.

The macro cell broadcasts the notification information indicating that the HII is notified or the HII being the interference-related information to UEs being served thereby. Alternatively, the macro cell notifies UEs being served thereby of the notification information indicating that the HII is notified or the HII by a dedicated signal.

The UE that has received the information determines whether or not to notify the HeNB of the HII or determines a HeNB to be notified of the HII, using the measurement results. As disclosed in the first modification of the first embodiment, in the measurements of cells nearby, the UE measures the received power of a cell present in its vicinity and obtains the cell identity (PCI) of the cell, to thereby detect a cell. In addition, the UE receives the broadcast information of the detected cell and judges whether or not the cell is a HeNB.

Accordingly, the UE recognizes the received power measurement value of the detected cell. Then, the UE compares the measurement result with the threshold indicating whether or not to notify the HII, and stores the PCI of a HeNB whose received power measurement result is larger than the threshold. The UE notifies the HeNB that has been stored among the detected cells of the HII. The UE may store the PCI of the HeNB in the protocol processing unit 801, application unit 802 or control unit 810 shown in FIG. 8, which may be stored as a list.

The threshold as to whether or not to notify the HII is broadcast by a macro cell to UEs being served thereby as the broadcast information together with the notification information indicating that the HII is notified or the HII being the interference-related information. Alternatively, the macro cell notifies a UE being served thereby as a dedicated signal. Accordingly, the UE receives the broadcast information or dedicated signal in advance, to thereby obtain the threshold.

In a case where the macro cell broadcasts the threshold, the threshold may be broadcast by being included in the SIB1 or SIB4. The transmission timing of the SIB1 has been determined, which enables the reception with few processes at an early stage in the case where the HeNB performs measurements. The SIB4 includes the neighbor cell information, and if the threshold is included in the same block as the neighbor cell information, it is only required to obtain the SIB4 when a UE obtains the information related to the neighbor cell. This makes control simpler and reduces malfunctions in control.

Alternatively, the threshold may be preliminarily determined in a static manner. In this case, the macro cell is not required to broadcast the threshold, which makes control simpler. Still alternatively, a plurality of such thresholds may be provided, and the thresholds as to whether or not to notify a plurality of HIIs may be listed in a table where those are respectively numbered, so that those numbers are broadcast. This enables the UE to determine whether or not to notify a HeNB of the HII or determines a HeNB to be notified of the HII using the measurement results of the cell nearby by the UE.

In the above-mentioned method, the UE stores the cell identity (PCI) of a HeNB to be notified of the HII. The cell identity may be a GCI. Alternatively, in a case of, for example, performing measurements upon instruction from a macro cell, a measurement ID may be stored in place of the cell identity. The cell identity of the HeNB can be specified by the measurement ID.

The method disclosed in the present modification limits the number of UEs to be notified of the HII and eliminates the need for notifying, by a UE, a macro cell of the report on the received power measurement results of the HeNB for HII notification. In addition, the macro cell is not required to provide an instruction as to a HeNB to which notification is made. Therefore, the HeNB is not required to perform measurements or notify the macro cell of the measurement results. In addition, the macro cell is not required to notify the UE of the information indicating a HeNB to be notified. Accordingly, the signaling load can be reduced.

Third Modification of First Embodiment

Figure 18:
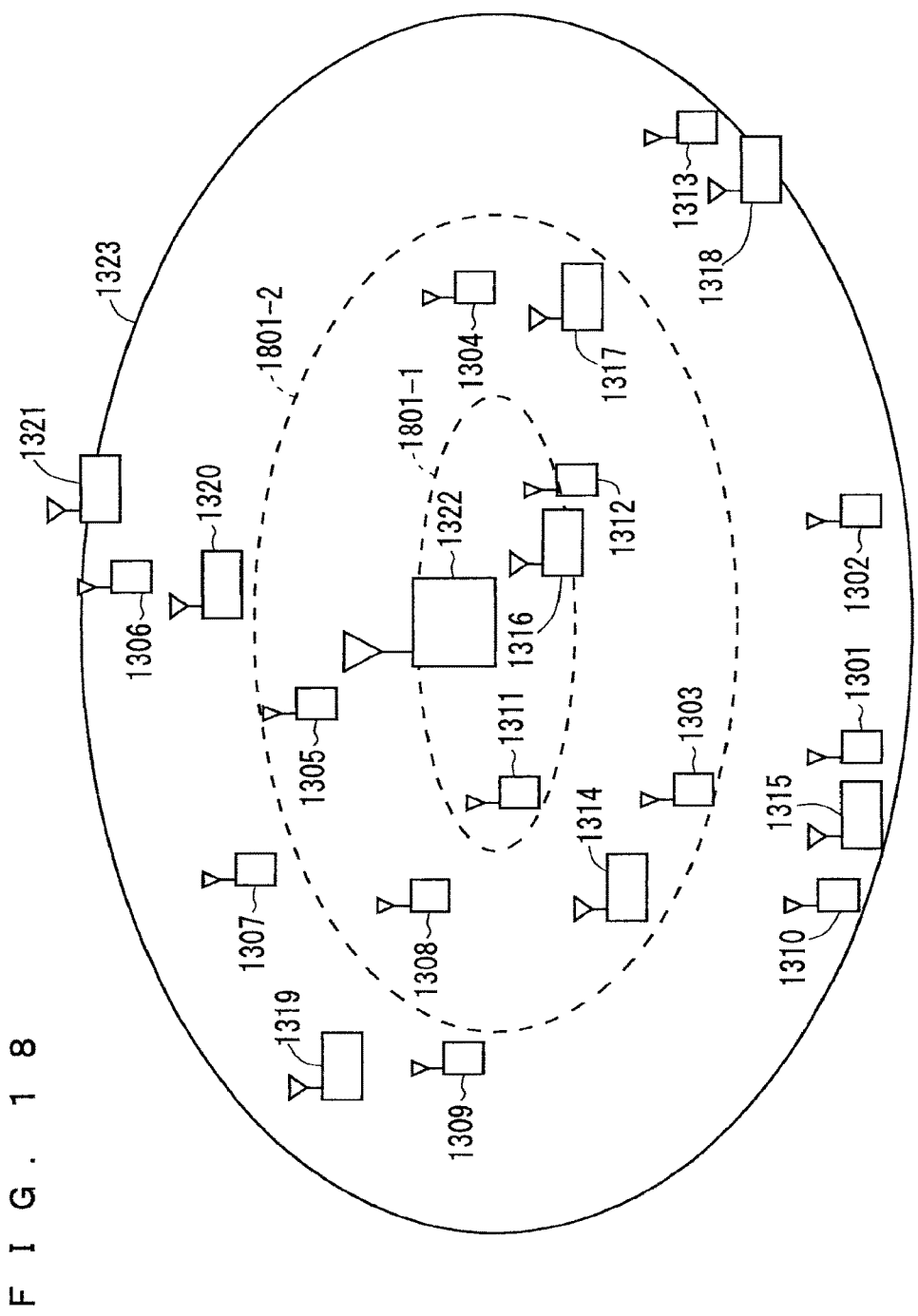
FIG. 18 is a conceptual diagram showing a case where HeNBs are deployed in the coverage of the macro cell.

The present modification discloses another method for limiting HeNBs to be notified of the HII. The HeNBs to be notified of the HII are HeNBs present in a specific received power range from a macro cell. FIG. 18 is a conceptual diagram in a case where HeNBs are deployed in the coverage of the macro cell. The portions of FIG. 18 corresponding to those of FIG. 13 are denoted by the same reference numerals, which are not described. In FIG. 18, portions of broken lines which are shown by reference numerals 1801-1 and 1801-2 denote ranges of specific received power from the macro cell 1322. The reference numeral 1801-1 denotes a first received power range, and the reference numeral 1801-2 denotes a second received power range. For example, the HeNBs to be notified of the HII are the HeNBs deployed in the range between the first received power range 1801-1 and the second received power range 1801-2. In FIG. 18, the HeNBs to be notified of the HII are the HeNB 1314, HeNB 1317 and HeNB 1316. This enables to further reduce the number of HeNBs to be notified of the HII and reduce the signaling load required for the notification of the HII.

The macro cell needs to recognize HeNBs deployed in the first received power range 1801-1 and the second received power range 1801-2. The method of judging the HeNBs deployed in a specific received power range can be achieved by partly changing the method disclosed in the first embodiment.

FIG. 19 is a diagram showing a sequence example of a part of the mobile communication system in a case of judging HeNBs deployed in a specific received power range. In the first embodiment, in Step ST1406 of FIG. 14, the macro cell compares the received power per macro cell that has been reported from the HeNB with the coverage judgment threshold, to thereby judge whether or not the HeNB is deployed in the coverage. In the present modification, the macro cell performs the process of Step ST1901 of FIG. 19 in place of the process of Step ST1406 of FIG. 14.

In Step ST1901 of FIG. 19, two range judgment thresholds, specifically, a first range judgment threshold and a second range judgment threshold may be provided, so that a macro cell compares the received power per macro cell reported from the HeNB with the two range judgment thresholds to judge whether or not the HeNB is deployed in the coverage. The two range judgment thresholds each correspond to a specific received power range.

In Step ST1901, the macro cell judges that the HeNB is in the two corresponding received power ranges and moves to Step ST 1407 in the case where the received power of the macro cell is equal to or smaller than the first range judgment threshold and the received power of the macro cell is equal to or larger than the second range judgment threshold, or moves to Step ST1408 in the case where the received power of the macro cell is larger than the first range judgment threshold and the received power of the macro cell is smaller than the second range judgment threshold.

In Step ST1407, the macro cell adds the HeNB to the HII notified HeNB list. In Step ST1408, the macro cell deletes the HeNB from the HII notified HeNB list. In a case where the HeNB has not been included in the HII notified HeNB list, the macro cell performs nothing and moves to the next step.

The processes above enable to further reduce the number of HeNBs to be notified of the HII and reduce the signaling load required for the notification of the HII.

In a case where the physical resources are used depending on the received power from a macro cell, for example, in the case of a frequency resource reuse (FRR), it is possible to notify only a specific HeNB using the physical resource notified by the HII of the HII.

While FIG. 19 shows one specific received power range, the received power range may not be limited to one and a plurality of received power ranges maybe provided. This enables to flexibly select HeNBs to be notified of the HII.

This method is also applicable to the method of judging whether or not a HeNB is in the coverage that is disclosed in the first embodiment. In the case where a HeNB makes judgment, it suffices that the macro cell broadcasts the required number of range judgment thresholds. Accordingly, it is possible to obtain similar effects to those of the first embodiment.

This method is also applicable to the method of judging whether or not the serving cell is in the coverage using the report on the measurement results of UEs, similarly to the method disclosed in the first modification of the first embodiment. This enables the notification of the HII to the HeNB via the UE present in a specific received power range from a macro cell. Similarly, this method is also applicable to the method disclosed in the second modification of the first embodiment.

Similarly to the coverage for UEs and the coverage for HeNBs disclosed in the first embodiment, the received power range for HeNBs to be notified of the HII may be identical to or different from the received power range for UEs to be notified of the HII. For example, in a case where the received power range for HeNBs to be notified of the HII is larger than the received power range for UEs to be notified of the HII, it is possible to further limit the number of UEs to be notified of the HII. Meanwhile, in a case where the received power range for UEs to be notified of the HII is larger than the received power range for HeNBs to be notified of the HII, the number of UEs present in that range increases, so that the HeNBs to be notified of the HII can be notified of the HII with reliability. Accordingly, it is possible to avoid the interference according to the deployment of a macro cell and HeNBs.

Fourth Modification of First Embodiment

While the HeNBs to be notified of the HII are HeNBs present in a certain received power range from a macro cell in the first embodiment, in the present modification, the HeNBs to be notified of the HII are HeNBs present in the range with a specific distance or a path loss from the macro cell.

The method of judging HeNBs deployed in the range of a specific path loss from a macro cell is achieved by using the path loss in place of the received power disclosed in the first embodiment to the third modification of the first embodiment. For example, in the case of application to the first embodiment, in Step ST1401 of FIG. 14, the HeNB is only required to derive a path loss. The path loss may be derived using the received power measurement results of a cell nearby and the transmission power value of the cell that has been broadcast from the neighbor cell. In Step ST1404, Step ST1405 and Step ST1406 of FIG. 14, a path loss may be used in place of the received power per macro cell. Further, in Step ST1406, the threshold of a path loss may be used as the coverage judgment threshold so that the directions of inequality signs are reversed. This is because the inverse of path loss corresponds to the distance from a macro cell, and thus the magnitude relation of the inverse of path loss is identical to the magnitude relation of the received power.

The configuration described above enables to reduce the number of HeNBs to be notified of the HII and reduce the signaling load required for the notification of the HII. Further, it is possible to limit HeNBs to be notified of the HII in accordance with the situation of an uplink, and thus this is the method suitable for avoiding uplink interference. This method is applicable to the methods disclosed in the first embodiment to the third modification of the first embodiment. In any of the cases, it suffices that the method is performed as described above using a path loss in place of the received power, and it is possible to obtain similar effects to those of the first embodiment to the third modification of the first embodiment.

While the method involving the use of a path loss has been described, not a path loss but a distance may be used. In a case of application to the method of judging whether or not a HeNB is in a coverage by a macro cell, which has been disclosed in the first embodiment, it suffices that the HeNB measures the location of the own HeNB using the GPS or the like in Step ST1401 shown in FIG. 14 and notifies the macro cell of the location information in Step ST1404 and Step ST1405. The macro cell may measure the location of the own cell using the GPS or the like and derive, using the location information of the own cell and the location information notified from a HeNB, the distance between the own cell and the HeNB. The macro cell may judge whether or not a HeNB is in a coverage based on the distance derived in Step ST1406. The coverage judgment threshold may be expressed in distance as well.

Similarly, the application to the method of judging whether or not a HeNB is in the coverage by the HeNB is enabled as well. In this case, it suffices that the macro cell broadcasts the location information of the own cell in Step ST1402 of FIG. 15. Similarly, in the case of the method involving the use of the measurements of a UE disclosed in the first modification of the first embodiment, the UE may measure the location of the own UE using the GPS or the like and notify a macro cell of the location information. A HeNB may be notified of the HII via a UE present in a specific distance range. The same holds true for the second modification of the first embodiment, and the above-mentioned methods enable to obtain similar effects to those of the second modification of the first embodiment.

Similarly to the coverage for UEs and the coverage for HeNBs disclosed in the first embodiment, the path loss range or distance range for HeNBs to be notified of the HII may be identical to or different from the path loss range or distance range for UEs to be notified of the HII. Also in this case, effects similar to those of the first embodiment can be obtained.

Fifth Modification of First Embodiment

While the HeNBs notified of the HII are HeNBs present in a specific received power range from a macro cell in the first embodiment, in the present modification, HeNBs notified of the HII are HeNBs present in a specific direction range with respect to a macro cell.

The method of judging HeNBs deployed in a specific direction range with respect to a macro cell is achieved with the use of the location information disclosed in the fourth modification of the first embodiment. From the location information of the HeNB and the location information of the macro cell, it is possible to derive a direction in which the HeNB is deployed with respect to the macro cell. Therefore, it suffices that whether or not a HeNB is in a specific direction range is judged based on the information on the direction with respect to the macro cell, which has been derived from the location information.

Further, from the location information of a UE and the location information of a macro cell, it is possible to derive a direction in which the UE is deployed with respect to the macro cell. Therefore, it suffices that a HeNB is notified of the HII via a UE present in a specific direction range based on the information on the direction with respect to the macro cell that has been derived from the location information.

As another method of judging a specific direction range with respect to a macro cell, angle of arrival (AoA) information may be used. The AoA is obtained by deriving the arriving direction of a received wave received by a macro cell from an angle relative to a specific direction. The macro cell is capable of recognizing the direction in which each UE is present through reception of a transmitted wave from the UE being served thereby. Therefore, it suffices that a macro cell recognizes a UE present in a specific direction range and notifies a HeNB of the HII via the UE based on the AoA information method of the UE. This enables to specify HeNBs to be notified of the HII as the HeNBs in a specific direction range. The interference of physical resources notified by the HII can be reduced for the HeNBs present in a specific direction range, whereby it is possible to schedule the physical resources notified by the HII to the UEs present in its direction range. This is effective in a case where physical resources are used according to a direction.

Further, similarly to the coverage for UEs and the coverage for HeNBs disclosed in the first embodiment, the direction range for HeNBs to be notified of the HII may be identical to or different from the direction range for UEs to be notified of the HII. Also in this case, similar effects to those of the first embodiment can be obtained.

Sixth Modification of First Embodiment

The first modification of the first embodiment has disclosed the method of selecting, by a macro cell, a UE having the highest received power for all HeNBs notified in the report on the measurement results from UEs being served thereby, to thereby notify the HII via the UE. The present modification discloses the method of notifying the HII via a UE present in a specific received power range from a HeNB.

Figure 20:
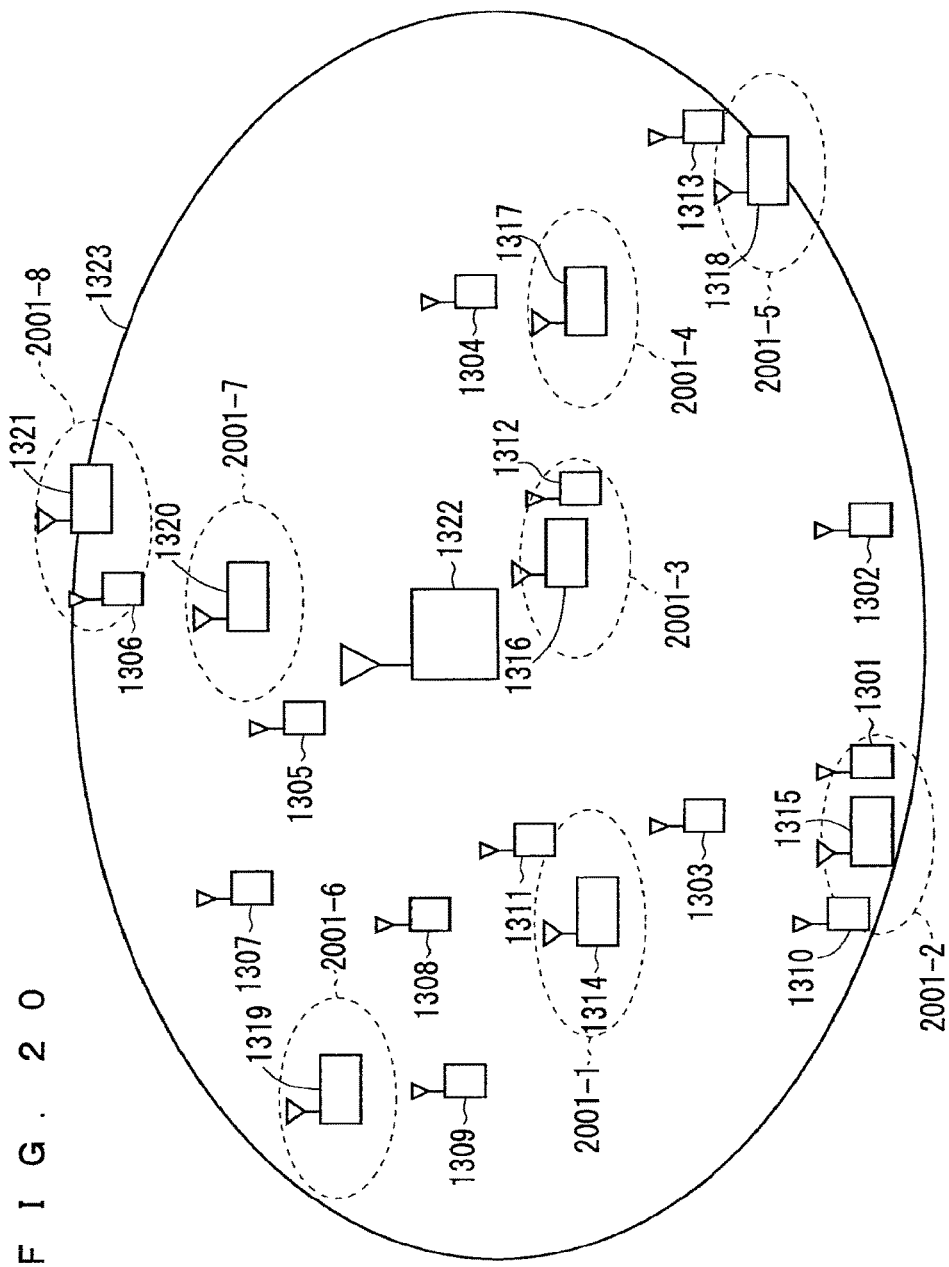
FIG. 20 is a conceptual diagram in a case where HeNBs are deployed in the coverage of the macro cell.

FIG. 20 is a conceptual diagram in a case where HeNBs are deployed in the coverage of a macro cell. The portions of FIG. 20 corresponding to those of FIG. 13 are denoted by the same reference numerals, which are not described. In FIG. 20, the portions of broken lines which are indicated by reference numerals 2001-1 to 2001-8 denote ranges of specific received power from the HeNBs 1314 to 1321, respectively.

For example, the HeNBs notified of the HII are HeNBs in the coverage of the macro cell, and the HeNBs are notified of the HII via UEs present in specific received power ranges from the respective HeNBs. In FIG. 20, the HeNB 1314, HeNB 1315, HeNB 1316, HeNB 1318, and HeNB 1321 are notified of the HII via the UE 1311, UE 1301 and UE 1310, UE 1312, UE 1313, and UE 1306, respectively. In a case where there is no UE present in a specific received power range from a HeNB, the HII is not notified. The HeNB 1317, HeNB 1319 and HeNB 1320 are not notified of the HII.

The macro cell needs to recognize a UE present in a specific received power range from the HeNB. This method is achieved by partly changing the method disclosed in the first modification of the first embodiment.

Figure 21:
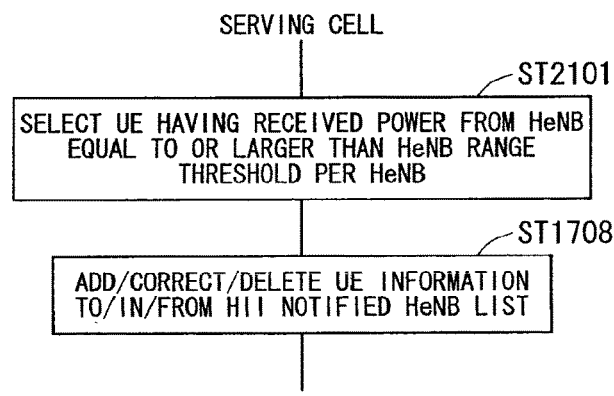
FIG. 21 is a diagram showing a sequence example of a part of a mobile communication system in a case where the HII is notified via a UE present in a specific received power range from a HeNB.

FIG. 21 is a diagram showing a sequence example of a part of a mobile communication system in a case where the HII is notified via a UE present in a specific received power range from a HeNB. In the first modification of the first embodiment, in Step ST1707 of FIG. 17, a macro cell selects a UE having the largest received power from the HeNB per HeNB based on the received power per HeNB reported from a UE. Then, in Step ST1708, the HeNB and the selected UE are associated with each other and stored in the HII notified HeNB list. In the present modification, the process of Step ST2101 of FIG. 21 is performed in place of Step ST1707 of FIG. 17.

The HeNB range threshold for judging whether or not a UE is in a specific received power range from a HeNB has been provided and, in Step ST2101 of FIG. 21, the macro cell selects a UE having the received power from the HeNB that is equal to or larger than the threshold per HeNB.

Next, in Step ST1708, the macro cell associates the HeNB with the selected UE and stores those in the HII notified HeNB list. A plurality of UEs may be selected. In this case, a plurality of UEs may be associated with the HeNB and stored in the list as well. The processes above enable to notify the HeNB of the HII via a UE present in a specific range of the received power from a HeNB. This enables to exclude UEs present outside the specific range, whereby it is possible to reduce a signaling load, reduce uplink interference, and improve communication quality.

The HeNB range threshold is set by a macro cell, which may be individually set by each HeNB. In this case, it suffices that each HeNB notifies a macro cell nearby of the HeNB range threshold by means of the S1 interface. It suffices that in Step ST2101, the macro cell makes judgment with the use of an individual HeNB range threshold notified from the HeNB. This enables to select a UE present in specific received power in accordance with a situation per HeNB, for example, the output power of the HeNB. The application to a case where various HeNBs will be deployed enables to flexibly deploy the HeNBs.

In the description above, the macro cell selects a UE present in a specific received power range from a HeNB. As another method, a UE may judge whether or not it is in a specific received power range from a HeNB. This method is achieved by partly changing the method disclosed in the first modification of the first embodiment. For allowing judgment by a UE, the method of judging whether or not a HeNB is in the coverage of a macro cell by a HeNB, which has been disclosed in the first embodiment, may be applied to the UE.

For example, a UE performs the processes of Step ST1502 to Step ST1504 of FIG. 15 after the process of Step ST1705 of FIG. 17. On this occasion, in Step ST1502, judgment is made using the received power of a HeNB in place of the received power of a macro cell and using the above-mentioned HeNB range threshold in place of the coverage judgment threshold. Based on the results thereof, in Step ST1706 of FIG. 17, the UE may notify the serving cell being a macro cell of each of the HeNBs present in the HeNB range threshold and the UE-ID of the own UE. After receiving the notified information, the serving cell being a macro cell does not perform the process of Step ST1707 and moves to Step ST1708 and, in Step ST1706, adds, corrects or deletes the UE information of the HII notified HeNB list based on each of pieces of the notified HeNB information and the UE information corresponding thereto.

The HeNB range threshold may be preliminarily determined in a static manner, or may be set by each HeNB and broadcast by each HeNB. The UE is allowed to obtain the HeNB range threshold by receiving the broadcast information of the HeNB detected in the measurements of neighbor cells. Then, with the use of this, the UE is allowed to judge whether or not it is in a specific range from the HeNB.

The method of selecting a UE having the largest received power from a HeNB disclosed in the first modification of the first embodiment may be combined with the method disclosed in the present modification. It is possible to further limit the UEs to be notified of the HII by selecting a UE being in a specific received power range and having the largest received power from a HeNB. This enables to further reduce a signaling load, reduce uplink interference, and improve communication quality.

Seventh Modification of First Embodiment

The present modification discloses another method of making, via which UE, notification by a macro cell. The macro cell notifies the HeNB of the HII via a UE in a connected state, specifically, in the RRC_Connected state.

The macro cell notifies the UE in the RRC_Connected state among UEs being served thereby of the indication that the HII is notified or the HII, and the UE in the RRC_Connected state that has received that information notifies a HeNB of the HII. This limits the number of UEs to be notified of the indication that the HII is notified or the HII from the macro cell. In addition, it is possible to limit the number of UEs that notify the HeNBs of the HII.

As the method of notifying the UE in the RRC_Connected state of the indication that the HII is notified or the HII from the macro cell, RRC signaling or MAC signaling may be used. The RRC connection has been established in the UE in the RRC_connected state, and accordingly it is not required to newly establish RRC connection for notifying the information. Accordingly, a complicated process is not required, whereby notification can be made with a small control delay.

In the case of using MAC signaling, notification may be made by newly providing a MAC control element for the notification, notification may be made using a MAC service data unit (SDU), or notification may be made using a padding bit that is an option in the current standard.

In the case of using MAC signaling, control can be made much easier. A scheduler of a macro cell manages the contents of the HII, such as a physical resource in which interference is avoided. The scheduler is provided in the protocol control unit 903 or control unit 911 of FIG. 9. In addition, the scheduler processes MAC signaling. Accordingly, the scheduler of the macro cell processes the indication that the HII is notified, and the notification contents setting of the HII and the notification thereof. Accordingly, it is possible to make control in a macro cell easier.

Eighth Modification of First Embodiment

The present modification discloses another method of making, via which UE, notification by a macro cell. The macro cell notifies the HeNB of the HII via the UE in an idle state, specifically, in the RRC_Idle state.

The macro cell notifies the UE in the RRC_Idle state among UEs being served thereby, and the UE in the RRC_Idle state that has received the information notifies the HeNB of the HII. This limits the number of UEs notified of the indication that the HII is notified or the HII from the macro cell. In addition, it is possible to limit the number of UEs that notify the HeNB of the HII. As the method of notifying the UE in the RRC_Idle state of the indication that the HII is notified or the HII from the macro cell, it suffices that the macro cell broadcasts it to the UE being served thereby. The UE in the RRC_Idle state being served by the macro cell is capable of receiving the broadcast information from the macro cell. In the case of broadcasting by a macro cell, the SIB1, SIB4 or new system information block (SIB) may be provided.

The broadcast timing of the SIB1 has been determined in advance, whereby the UE is allowed to receive the broadcast information at an early stage. The SIB4 includes the information of a neighbor cell. For example, in the case where, a macro cell determines a HeNB to be notified of the HII, the receiving operation of a UE can be simplified by including the indication that the HII is notified or the HII contents and the information of a HeNB notifying the above in the SIB and notifying those. As a result of providing a new SIB, similarly, the indication that the HII is notified or the HII contents and the information of a HeNB that notifies the above are included in the new SIB and notified. A UE is allowed to make judgment only from this SIB, whereby it is possible to simplify the receiving operation of the UE and reduce control malfunctions.

Further, in notifying the HeNB of the HII, notification is enabled using the PRACH without changing the state of a UE, via a UE in the RRC_Idle state. Accordingly, the UE does not need to perform a complicated process and is allowed to make notification with a small control delay.

The broadcast information is corrected per certain period. In the case of being notified of the information that the broadcast information has been corrected, the UE has to wait for the next period to receive the broadcast information. The macro cell may make notification using, not broadcast information but paging for reducing the latency. It suffices that notification is made by including the indication that the HII is notified or the HII in the PCH or PCCH.

In the case of notifying a UE being served thereby with the use of paging, the macro cell is capable of notification limited to a UE to be notified of the HII. Normally, paging is sent from the MME. In a case where the MME can judge a macro cell in which notification is necessary, a HeNB to be notified of the HII, or a UE via which notification is made, it suffices that paging is transmitted from the MME to the macro cell and the macro cell notifies the UE. In a case where the MME cannot judge a macro cell in which notification is necessary, a HeNB to be notified the HII, or a UE via which notification is made, it suffices that a macro cell managed by the MME is notified of the paging, and judgment is made as to whether or not the own cell should make notification per macro cell that has received the paging.

Alternatively, the macro cell may send the paging for HII. The macro cell recognizes the transmission timing of paging. Further, notification is only required within the coverage of the macro cell and, unlike a normal case, the MME does not need to send paging. The macro cell is allowed to send the paging for HII. This enables to reduce the signaling amount from the MME to the macro cell.

In order to reduce the latency for correcting the broadcast information, the macro cell may notify the UE of the information indicating that the HII is notified or the information indicating that the HII is transmitted in the broadcast information, using paging. The UE that has received the information may receive the information without waiting for the latency for correcting the broadcast information.

This method can be implemented in a similar manner to that of the earthquake and tsunami warning system (ETWS) standardized by 3GPP. The method of broadcasting from a macro cell, method involving the use of paging, and method involving the use of the method similar to the ETWS described above are applicable not only to a UE in the RRC_Idle state but also to a UE in the RRC_Connected state. As another method of notifying a UE in the RRC_Idle state of the indication that the HII is notified or the HII from a macro cell, the macro cell may establish the RRC connection with the UE using paging, and after the establishment of the RRC connection, may make notification using the RRC message or MAC message. The RRC connection is established once, and thus it is possible to make the process after the RRC connection identical to the method of notifying a UE in the RRC_Connected state. Alternatively, notification is not made after the RRC connection is established, but notification may be made using the RRC connection request message to be transmitted to a macro cell after the UE receives paging. The RRC connection request message includes the indication that the HII is notified or the HII information. This enables to make notification earlier compared with the notification after the RRC connection is established, which enables to reduce a control delay.

The methods disclosed in the first embodiment to the eighth modification of the first embodiment may be appropriately used in combination. This enables to limit HeNBs to be notified of the HII and also limit UEs that notify HeNBs of the HII, according to the circumstances. In a case where a large number of HeNBs will be deployed or in a case where a general user will deploy HeNBs, the interference between a macro cell and a HeNB can be reduced. Accordingly, it is possible to provide high-speed and high-capacity communication.

Second Embodiment

As described above, Non-Patent Document 9 proposes the use of the PRACH and UL-SCH as the channels for notification from a UE to a HeNB but does not describe anything else, and the mechanism in which a macro cell notifies a HeNB of the HII is unclear. For example, a UE being served by a macro cell normally does not know the RACH configuration of a HeNB. Therefore, a UE being served by a macro cell cannot transmit the PRACH to a HeNB.

In order to solve the above-mentioned problem, the present embodiment discloses a specific mechanism in which a macro cell notifies a HeNB of the HII via a UE. As a specific mechanism in which a macro cell notifies a HeNB of the HII via a UE, the present embodiment discloses the method of notifying, by a UE, a HeNB of the HII using the RACH configuration of the HeNB.

Figure 22:
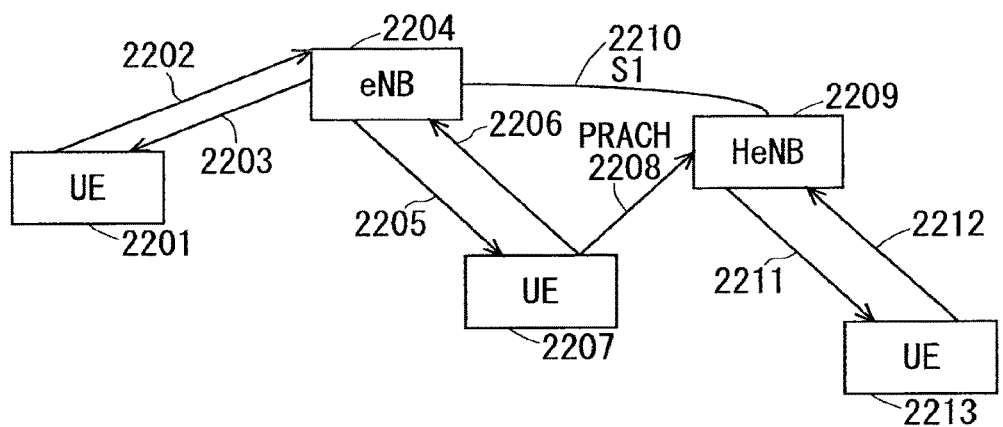
FIG. 22 is a conceptual diagram in a case where a UE notifies a HeNB of the HII with the RACH configuration of the HeNB.

FIG. 22 is a conceptual diagram in a case where a UE notifies a HeNB of the HII using the RACH configuration of the HeNB. In FIG. 22, reference numerals 2201, 2207 and 2213 denote UEs, a reference numeral 2204 denotes an eNB (macro cell), and a reference numeral 2209 denotes a HeNB. The UEs 2201, 2207 and 2213 correspond to the UEs 71 of FIG. 7 described above, the HeNB 2209 corresponds to the Home-eNB 72-2 of FIG. 7 that is a small-scale base station device, and the macro cell 2204 corresponds to the eNB 72-1 of FIG. 7 that is a large-scale base station device.

The UEs 2201 and 2207 are UEs being served by the macro cell 2204. The UE 2213 is a UE being served by the HeNB 2209. In FIG. 22, reference numerals 2203 and 2205 denote downlinks from the macro cell 2204 to the UEs 2201 and 2207, respectively, reference numerals 2202 and 2206 denote uplinks from the UEs 2201 and 2207 to the macro cell 2204, respectively, a reference numeral 2211 denotes a downlink from the HeNB 2209 to the UE 2213, and a reference numeral 2212 denotes an uplink from the UE 2213 to the HeNB 2209. In FIG. 22, a reference numeral 2210 denotes the interface between the macro cell 2204 and the HeNB 2209, and a reference numeral 2208 denotes the PRACH transmitted from the UE 2207 to the HeNB 2209.

In a case of notifying the HeNB 2209 of the HII, the macro cell 2204 notifies the HeNB 2209 of the HII via the UE 2207 being served by the own macro cell 2204. For example, by the methods disclosed in the first embodiment to the eighth modification of the first embodiment, the UE 2207 that has been notified of the indication that the HeNB 2209 is notified of the indication that the HII is notified or the HII from the macro cell 2204 transmits the HII to the HeNB 2209. As a result of the RACH configuration of the HeNB 2209, the UE 2207 performs uplink transmission to the HeNB 2209 using the PRACH 2208 and notifies the HII. This allows the macro cell 2204 to notify the HeNB 2209 of the HII via the UE 2207 being served thereby.

However, a UE being served by a macro cell normally does not recognize the RACH configuration of a HeNB, which leads to a problem that the UE being served by the macro cell cannot transmit the PRACH to the HeNB. Therefore, it is necessary for a UE to recognize the RACH configuration of a HeNB for implementing the method disclosed above. A specific example of the method of acquiring the RACH configuration parameter of a HeNB by a UE is disclosed below.

TS36.213 V9.0.1 (hereinafter, referred to as "Non-Patent Document 11") by 3GPP discloses that the RACH configuration is notified between eNBs by means of the X2 interface for a self organized network (SON). Meanwhile, the X2 interface is not supported in the HeNB. Accordingly, the RACH configuration cannot be notified by the HeNB using the method disclosed in Non-Patent Document 11. Therefore, a HeNB notifies a node nearby of the RACH configuration parameter of the own cell by means of the S1 interface. As a specific example, the S1 interface is used as the interface 2210 between the macro cell 2204 and the HeNB 2209 of FIG. 22.

Disclosed below is a specific example as to how to determine a node nearby to be notified of the RACH configuration parameter of the own cell by the HeNB. A node nearby to be notified of the RACH configuration parameter of the own cell by a HeNB is determined based on the measurement results of a surrounding radio environment of the HeNB. Specific examples of the surrounding radio environment include measurement results of a cell nearby. Specific examples of the measurement results of a cell nearby include the reception quality, received power and path loss.

A HeNB selects, as a node to be notified of the RACH configuration parameter of the own cell, a node whose reception quality or received power is equal to or larger than a threshold (or larger than a threshold) in the measurement results of a surrounding radio environment. Alternatively, if the path loss of a node is smaller than (or equal to or smaller than) a threshold in the measurement results of a surrounding radio environment, a HeNB selects that node as a node to be notified of the RACH configuration parameter of the own cell. The HeNB may notify one or a plurality of nodes of the RACH configuration parameter of the own cell. The HeNB selects a node to be notified of the RACH configuration parameter of the own cell by the method described above, whereby it is possible to select a node nearby. This eliminates the need to notify even an unnecessary node of the RACH configuration parameter of the own cell, and accordingly, the processing load of the HeNB can be alleviated.

For example, in the method disclosed in the first embodiment, a HeNB notifies the selected node of the PCI and received power information per node and the PCI of the own HeNB and, on this occasion, may notify the RACH configuration parameter of the own HeNB. In the example disclosed in FIG. 14, a HeNB obtains the information of a cell type and selects only a macro cell in Step ST1403. Accordingly, in Step ST1404, a HeNB notifies the PCI and received power information per macro cell and the PCI of the own HeNB in Step ST1404 and, on this occasion, may notify the RACH configuration parameter of the own HeNB.

In a case where it is required to notify the HeNB of the HII via a UE, the macro cell that has been notified of the RACH configuration parameter of the HeNB notifies a user equipment (UE) being served thereby of the information. Two specific examples of the notification method are disclosed below: (1) notification is made using the broadcast information; and (2) notification is made using a dedicated signal.

Disclosed here is a specific example in which a macro cell notifies a HeNB of the HII using the broadcast information in the LTE and LTE-A. The RACH configuration is used as the broadcast information. Two specific examples in the case of using the RACH are disclosed below: (1) a RACH configuration for a serving cell, that is, for a node that has been notified of the configuration parameter of uplink transmission of a HeNB and a RACH configuration for a HeNB are provided in the current RACH configuration; and (2) a RACH configuration is provided apart from the current RACH configuration.

In a case where the macro cell notifies UEs being served thereby of the HII dedicatedly using a dedicated signal, the RACH configuration may be notified together with the information indicating that the HII is notified or the HII. In addition, for recognizing a HeNB, to which the RACH configuration is provided, the cell identity of a corresponding HeNB is notified together with the RACH configuration. The cell identity may be the PCI or GCI. In the case of the GCI, it is possible to eliminate a problem that a HeNB is confused with another HeNB due to overlapping of PCIs.

In a case of notifying a UE being served thereby of the HII using the broadcast information, or in a case of dedicatedly notifying a UE of the HII using a dedicated signal, the macro cell 2204 that has received the notification of the RACH configuration parameter of the HeNB from the HeNB 2209 of FIG. 22 notifies the UEs 2201 and 2207 being served thereby of the HII via the downlinks 2203 and 2205, respectively. For example, in the case of dedicatedly notifying a specific UE of the HII, the macro cell 2204 notifies the UE 2207 being served thereby of the HII via the downlink 2205.

Two specific examples of the RACH configuration parameters are disclosed below.

(1) RACH configuration. Further, specific examples in the LTE and LTE-A include "RACH-ConfigCommon" and "PRACH-config" (see TS36.331 V9.0.0 (hereinafter, referred to as "Non-Patent Document 10") by 3GPP).

(2) Uplink frequency information. The uplink frequency information used between a HeNB and a user equipment being served thereby. Specific examples of the uplink frequency information include a carrier frequency, frequency band and component carrier. Specific examples in the LTE and LTE-A include "freqInfo", "ul-CarrierFreq" and "ul-Bandwidth" (see Non-Patent Document 10).

A component carrier is described below. As to the LTE-A system, it is considered to support transmission bandwidths larger than the transmission bandwidths of the LTE system (see Non-Patent Document 6 and Non-Patent Document 7). For this reason, it is considered that a user equipment supporting the LTE-A simultaneously receives one or a plurality of component carriers (CCs). It is considered that a user equipment supporting the LTE-A has the capability for carrier aggregation of the reception and transmission, only reception, or only transmission simultaneously on a plurality of component carriers.

The present embodiment has described the RACH configuration parameters, not limited to the RACH configuration parameters, which may be parameters used for a UE to perform uplink transmission to a HeNB that notifies the HII. This enables a macro cell to notify a UE of the parameters for performing uplink transmission to a HeNB. The UE can perform the same procedure as that in establishment of a normal uplink for the HeNB, and thus exceptional control is not required when an uplink is established for a HeNB, which makes the control of a UE simpler.

Further, a macro cell notifies a UE of the parameter for performing uplink transmission to a HeNB in advance before notifying the HeNB of the HII, whereby it is possible for a UE to immediately notify, in a case of receiving the indication that the HII is notified or the HII from a macro cell, a HeNB of the HII using the parameter for performing uplink transmission. Accordingly, it is possible to reduce a control delay when a macro cell notifies a HeNB of the HII. This enables the scheduling for avoiding interference in accordance with the dynamically changing situation of interface.

The UE that has received the indication that the HII is notified or the HII from a macro cell notifies a given HeNB of the HII. The method disclosed in the first embodiment may be used for determining a HeNB to be notified. Six specific examples of the notification method are disclosed below: (1) notification is made using the PRACH; (2) notification is made using the UL-SCH; (3) notification is made by being mapped on the RRC establishment request (or included therein, or together therewith); (4) notification is made by being mapped on the RRC message; (5) notification is made by being mapped on the NAS message; and (6) notification is made by MAC signaling.

Disclosed below is a specific example in the case where a given HeNB is notified of the HII using the PRACH. Non-Patent Document 9 describes the notification using the PRACH but does not describe how to use the PRACH. The PRACH is a signal transmitted by a UE in the start of uplink transmission. Therefore, in the case of receiving the PRACH, a HeNB cannot recognize whether the PRACH is the HII or the normal PRACH in the start of uplink transmission by the technique of Non-Patent Document 9. Although the information for specifying a desired physical resource is required as the HII, in the technique of Non-Patent Document 9, it is unclear how to map the information on a conventional PRACH. In order to solve the above-mentioned problem, the present embodiment discloses below how to notify the HII using the PRACH.

(1) At least any one of the preamble sequence of the PRACH and physical resources on a frequency-time axis used in the PRACH are caused to correspond to a desired physical resource.

(2) At least any one of the preamble sequence of the PRACH and physical resources on a frequency-time axis used in the PRACH are partitioned for HII notification and for normal PRACH in advance.

(3) At least one of a bit indicating a physical resource and a bit indicating a use is associated with the PRACH.

In a case where the preamble sequence of the PRACH is caused to correspond to a desired physical resource, it suffices that one preamble sequence is caused to correspond to one or a plurality of physical resource blocks (PRBs). This correspondence may be preliminarily determined in a static manner.

The UE that has received the indication that the HII is notified or the HII from a macro cell may select the contents of the HII, that is, the preamble sequence of the PRACH corresponding to a desired physical resource expected to avoid interference, and then notify a HeNB of the HII using the PRACH. The HeNB that has received the PRACH is capable of specifying a physical resource by the preamble sequence of the PRACH and preventing scheduling of the physical resource to a UE being served by the own HeNB.

As another method, a macro cell notifies a UE to be notified of the HII of the corresponding preamble sequence. The macro cell may notify the HII using the broadcast information or may dedicatedly notify the HII using a dedicated signal. The macro cell may notify a UE together with the indication that the HII is notified or the HII. The UE transmits the PRACH using the notified preamble sequence, which results in transmitting the HII. In this case, the correspondence information between the physical resource and the preamble sequence may be shared between the HeNB and the macro cell. The correspondence information may be notified in advance from the HeNB to the macro cell or from the macro cell to the HeNB. Alternatively, the correspondence information may be notified from the HeNB to the macro cell together with the RACH configuration. This enables the HeNB that has received the PRACH of the preamble sequence to specify a physical resource and prevent scheduling of the physical resource to a UE being served by the own HeNB.

The same holds true for the case in which the physical resource on a frequency-time axis used in the PRACH is caused to correspond to a desired physical resource. In this case, there may be used a PRACH configuration index for instructing a physical resource on a frequency-time axis to be used in the PRACH.

The correspondence may be preliminarily determined in a static manner also in a case where the physical resource may differ between one for HII and the other for PRACH. Further, the correspondence may be broadcast by a cell in advance. The SIB1 or SIB2 may be used. The use of the above-mentioned method enables to notify the HII without increasing the bit number of the PRACH. In a case where the PRACH is associated with a bit indicating the use, the bit number may be one bit for showing one for the HII and the other for a normal PRACH. This enables to distinguish one for the HII from the other for a normal PRACH. The above-mentioned methods may be used in combination.

In the case of notifying the HII using the PRACH, the UE is only required to perform uplink transmission to a HeNB and does not need to receive a downlink signal from the HeNB. Accordingly, the UE that is not being served by a HeNB does not have to perform complicated control such as changing a serving cell and can notify a HeNB of the HII with simple control. The UE that has transmitted the PRACH for HII may not be required to receive a random access response. In addition, the HeNB that has received the PRACH for HII notification may not transmit a random access response using the PDCCH. This allows the UE that has transmitted the PRACH for HII to avoid judging a reception failure even when it does not receive a random access response. Further, the HeNB that has received the PRACH for the HII can reduce the transmission of a random access response. This alleviates the load of the processes of the UE and HeNB and allows radio resources to be effectively used.

In a case where a UE notifies the HII by mapping it on (or including it in or together with) an RRC establishment request as the method of notifying a given HeNB of the HII, an RRC connection establishment request of the RACH procedure used in uplink initial transmission may be used. Transmission is enabled on the MSG3 of the RACH procedure. This enables to notify the HII before the RRC connection state is established between the HeNB and the UE. In the case where the UE that notifies the HII is in the RRC_Idle state, the state does not need to be changed, which makes the HII notification control simpler.

In a case where the HII is notified by mapping it on the RRC message or in a case where the HII is notified by mapping it on the NAS message, the UE that notifies the HII does not need to change the state when being in the RRC_connected state, which makes the HII notification control simpler.

In a case where the HII is notified using the UL-SCH, in a case where the HII is notified by mapping it on the RRC establishment request, in a case where the HII is notified by mapping it on the RRC message, in a case where the HII is notified by mapping it on the NAS message, and in the case where the HII is notified by MAC signaling, the information indicating that the signal is the HII may be mapped. This enables a HeNB to distinguish the signal from other signals, and thus can reduce a control delay, such as preferentially performing the process for avoiding interference by the HII.

First Modification of Second Embodiment

In the embodiment above, as a specific example of the method of finding the RACH configuration parameter of a HeNB by a UE, a HeNB notifies a macro cell nearby of the RACH configuration parameter of the own HeNB, and the macro cell notifies a UE being served by the macro cell of the RACH configuration parameter of the HeNB. The present modification discloses another method. A UE obtains the RACH configuration parameter from a HeNB present in its vicinity.

FIG. 23 is a conceptual diagram in a case where a UE obtains the RACH configuration parameter from a HeNB present in its vicinity. The portions of FIG. 23 corresponding to those of FIG. 22 are denoted by the same reference numerals, which are not described. The UE 2207 obtains the RACH configuration parameter from the HeNB 2209 present in its vicinity by means of an air-interface 2301. The method of obtaining the RACH configuration parameter by means of the air-interface 2301 is disclosed below.

The UE performs measurements of cells nearby and receives the broadcast information of the detected cells, to thereby obtain the RACH configuration parameters. The method disclosed in the first modification of the first embodiment may be applied to a series of method up to the reception of the broadcast information. The processes from Step ST1702 to Step ST1705 of FIG. 17 are applicable. In Step ST1704, a UE obtains the RACH configuration parameter being the broadcast information from a cell nearby. In the LTE standard, the RACH configuration parameter is included in the SIB2 of the broadcast information. Accordingly, it is possible to obtain the RACH configuration parameter of the cell by obtaining the SIB2 of the broadcast information. It suffices that the UE associates the RACH configuration parameter obtained from a cell present in its vicinity with the PCI of the cell obtained in Step ST1703 and store those.

It takes time for a UE to obtain the SIB2 of all of the cells detected in the measurements of cells nearby, and thus, the process of the UE increases enormously, leading to an increase of power consumption. In order to solve this problem, in Step ST1705 of FIG. 17, the UE may obtain the cell type information and obtain the SIB2 of only the HeNB, to thereby obtain the RACH configuration parameter. In a case where the PCI of the HeNB can distinguish a cell from a cell of another type, the UE may judge whether or not it is a HeNB from the PCI of the cell obtained in Step ST1703 and obtain the SIB2 of only the HeNB, to thereby obtain the RACH configuration parameter.

Alternatively, in a case of performing measurements upon instruction from a serving cell, in Step ST1702, the UE may obtain the SIB2 of the broadcast information together with the measurement instruction message from the serving cell in advance and specify the cell from which the UE obtains the RACH configuration parameter. The cell may be specified using the PCI or GCI. Alternatively, the measurement instruction message may include the information indicating whether or not it is required to obtain the RACH configuration parameter. Still alternatively, at first, the serving cell may be notified of the results obtained by measuring only the received power, and the serving cell may again notify a UE of the cell whose SIB2 should be obtained by the measurement instruction message, based on the report of the measurement results. The UE that has received the message receives the broadcast information of the cell again, and receives the RACH parameter. This enables to reduce the processes of a UE and reduce power consumption.

The RACH configuration parameter is configured to be included in the SIB2 in the description above, not limited thereto, and the RACH configuration parameter may be configured to be included in another SIB or MIB. Also in this case, similar effects to those in the case where the RACH configuration parameter is included in the SIB2 can be obtained.

The method disclosed in the present modification enables a UE to obtain the RACH configuration parameter from a HeNB present in its vicinity. A HeNB normally broadcasts the RACH configuration parameter for a UE being served by the own cell. With the use of the above, it is possible to eliminate exceptional signaling for HII notification, for example, signaling for notification of the RACH configuration parameter of a HeNB from a macro cell to a UE. This enables a UE to obtain the RACH configuration parameter of a HeNB without increasing a signaling load. In combination with the method of determining, by a UE, a HeNB to be notified, which has been disclosed in the second modification of the first embodiment, it is possible to reduce the processes via a macro cell. Accordingly, the signaling load as a system can be reduced and power consumption can be reduced.

Second Modification of Second Embodiment

In some cases, a cell that is expected to avoid a situation in which interference becomes problematic, that is, a cell that is notified of the HII is a CSG cell. At times, a UE present in the vicinity of the CSG cell does not belong to the CSG. In such a case, the UE cannot notify the HII even when a macro cell tries to notify the CSG cell of the HII via the UE. This is because the UE is not allowed to access the CSG cell in a case where the CSG whitelist does not include the CSG-ID of the CSG cell, as described in Non-Patent Document 3 above.

For example, in a case where the HeNB notified of the HII from a macro cell is a CSG cell and a UE nearby does not have the CSG-ID of the CSG cell in the CSG whitelist, the macro cell cannot notify the HeNB of the HII via the UE. Accordingly, the macro cell cannot notify the HeNB of a physical resource in which interference occurs, and cannot schedule the physical resource to a UE being served thereby. Alternatively, even in a case where scheduling is performed, the interference from the CSG cell degrades the communication quality. Such a situation reduces the communication rate and interrupts the communication at worst.

In order to solve the above-mentioned problem, a UE that does not have the CSG-ID of a CSG cell in a CSG whitelist may be allowed to access the CSG cell. As described above, however, the CSG cell is a cell used only by users belonging to a specific group. Therefore, a case where a UE is allowed to access the CSG cell in every situation is against the objective of the CSG. Therefore, it is limited to the case of notifying the HII. That is, in a case where a UE that does not have the CSG-ID of a CSG cell in the CSG whitelist notifies the HII, the UE is allowed to access the CSG cell. This enables to notify the CSG cell of the HII also in a case where there is only a UE that does not belong to the CSG-ID of the CSG cell.

In a case of receiving a signal from a UE that does not belong to the CSG-ID, the CSG cell needs to judge whether or not the signal is the HII. Accordingly, the CSG cell does not allow the access from the UE in a case where the signal is not the HII or allows the access from the UE in a case where the signal is the HII.

As the method of judging whether or not the signal from a UE is the HII by a CSG cell, the method disclosed in the second embodiment may be applied. In the case of the notification using the PRACH, there may be used a method of partitioning at least any one of the preamble sequence of the PRACH and physical resources on a frequency-time axis used in the PRACH for one for HII notification and the other for normal PRACH. Alternatively, in a case of the notification using the UL-SCH, in a case of the notification by being mapped on an RRC establishment request, in a case of the notification by being mapped on an RRC message, and in a case of the notification by being mapped on the NAS message, the method of mapping the information indicating that the signal is the HII may be used. This enables a CSG cell to judge whether or not the signal from a UE is the HII and, in a case where a UE that does not have the CSG-ID of the CSG cell in a CSG whitelist notifies the HII, it can access the CSG cell. Further, also in a case where a cell that is expected to avoid a situation in which interference becomes problematic, that is, a cell to be notified of the HII is a CSG cell, it is possible to notify the cell of the HII via a UE, which prevents a decrease in communication rate and interruption of communication.

Third Embodiment

Non-Patent Document 9 proposes the use of the PRACH and UL-SCH as the channels for notification from a UE to a HeNB as described above, but does not describe anything else and does not specifically disclose the state of a UE that notifies a HeNB of the HII. Whether the UE is in the RRC_connected state or RRC_Idle state and the mechanism to, for example, notify the HII in each state are unclear. For example, the PRACH is normally a channel used in a case when a UE in RRC_Idle starts uplink transmission, and thus a UE in the RRC_connected state that has established the RRC connection cannot use the PRACH. This causes a problem that the HeNB cannot be notified of the HII via a UE in the RRC_connected state. In order to solve the above-mentioned problem, the present embodiment discloses the method of notifying the HII in accordance with the state of a UE.

In the present embodiment, in a case where a UE in the RRC_connected state, that is, in the connected state notifies a HeNB of the HII, the UE changes to the RRC_Idle state, that is, the idle state. Then, the UE notifies the HeNB of the HII after changing to RRC_Idle.

FIG. 24 is a diagram showing a sequence example of a mobile communication system in a case where a UE changes to RRC_Idle and then notifies a HeNB of the HII. The serving cell is a macro cell. In Step ST2401, the UE is in the RRC_connected state.

In Step ST2403, the serving cell that has notified the HeNB of the HII via the UE in the RRC_connected state in Step ST2402 notifies the UE in the RRC_connected state (Step ST2401) of the broadcast information indicating that the HII is notified or the HII being the interference-related information. In Step ST2404, the serving cell that has notified the information indicating that the HII is notified or the HII in Step ST2403 notifies the UE of an RRC connection release message. In Step ST2405, the UE that has received the RRC connection release message releases the RRC connection and changes to the RRC_Idle state.

After changing to RRC_Idle, in Step ST2406, the UE notifies a HeNB to be notified of the HII of the HII. In Step ST2407, the UE that has notified the HII issues the RRC connection request to the serving cell.

In Step ST2408, the RRC connection process is performed between the serving cell that has received the RRC connection request and the UE, whereby the RRC connection is established.

The RRC connection release message of Step ST2404 may be included in Step ST2403. Alternatively, it may be preliminarily determined in a static manner that the RRC connection is released after the information indicating that the HII is notified or the HII is notified in Step ST2403. This enables to omit the RRC connection release message of Step ST2404.

The method disclosed in the second embodiment is applicable to the method of notifying the HII in Step ST2406. As to a HeNB to be notified of the HII or as to whether the own UE notifies a HeNB of the HII, the method disclosed in the first embodiment is applicable.

In Step ST2407, the UE that has notified the HII issues the RRC connection request to the serving cell. This enables the UE to perform communication again while, for example, communication with a serving cell is being performed.

As another method, the UE that has notified the HII in Step ST2406 may perform cell reselection. This enables to select the best cell having the highest received power at that time. In addition, the communication quality after the notification of the HII can be improved.

After the notification of the HII in Step ST2406, the serving cell may judge whether or not the UE issues the RRC connection request or performs cell reselection for returning to the serving cell, to thereby notify the UE of the judgment. The parameter indicating the above may be provided so as to be included in Step ST2403 or Step ST2404 to be notified. In a case of being included in the RRC connection release in Step ST2404, the parameter may be added to the cause information of the release.

In a case of notifying a UE during communication of the HII, the serving cell may take measures for preventing the data from being lost while the UE establishes the RRC connection with the serving cell again. For example, the serving cell includes the information indicating that the RRC connection request is issued for returning to the serving cell in Step ST2403 or Step ST2404 and then notifies that information after the UE notifies the HII, and after that, stores the data to be exchanged with the UE. After the RRC connection process with the UE is performed in Step ST2408, the serving cell communicates the stored data with the UE. Alternatively, the RRC connection request in Step ST2407 may include the information indicating the RRC connection request after the notification of the HII. This enables the serving cell to distinguish a normal RRC connection request from the RRC connection request after the notification of the HII.

The processes described above enable to prevent the data during the notification of the HII from being lost even if a UE during communication changes to RRC_Idle, whereby the serving cell is allowed to continuously provide service to the UE.

Accordingly, it is possible to notify a HeNB of the HII via a UE in the RRC_connected state. Further, in a case where a UE that notifies the HII is in the RRC_connected state, the UE is allowed to notify the HII using the PRACH.

If the RACH configuration parameter of the HeNB required in the case of notifying the HeNB of the HII in Step ST2406 is obtained in advance by the method disclosed in the second embodiment, the UE is allowed to notify the HeNB of the HII at an early stage.

As another method, the UE may perform cell reselection to the HeNB after changing to the RRC_Idle state in Step ST2405, and then may notify the HII. It suffices that the UE that has notified the HII after cell reselection to the HeNB performs cell reselection to an original serving cell after the notification of the HII and, in Step ST2407, notifies the RRC connection request.

The cell reselection to a HeNB enables to establish an uplink as well as a downlink for the HeNB. In this case, it is also possible to establish the RRC connection with the HeNB, which allows the notification of the HII by signaling after the RRC connection establishment.

A UE may obtain the RACH configuration parameter by performing cell reselection to the HeNB and receiving the broadcast information from the HeNB rather than obtaining the RACH configuration parameter in advance. This eliminates the need to obtain the RACH configuration parameter in advance though a control delay increases.

First Modification of Third Embodiment

In the embodiment described above, a UE is changed to RRC_Idle and then notifies the HII for notifying a HeNB of the HII via a UE in the RRC_connected state. In the present modification, a UE notifies a HeNB of the HII while being in the RRC_connected state, as another method. The serving cell stops scheduling (resource allocation) to the UE while the UE notifies a HeNB of the HII.

A trigger for stopping scheduling to the UE may be a case where a serving cell notifies the UE of the information indicating that the HII is notified or the HII or a case where a serving cell receives the information indicating that the HII is notified from a UE or a signal indicating that the HII has been received.

A trigger for allowing scheduling to the UE again may be a case where a scheduling restart request signal from the UE is received. A scheduling request signal may be used as the scheduling restart request signal. Alternatively, the information indicating a scheduling restart request after the completion of the HII notification to a HeNB may be included in a scheduling request signal and notified.

As another method regarding a trigger for allowing scheduling to the UE again, in a case where a HeNB receives the HII from a UE and then notifies the serving cell of the information indicating that the HII has been received, a trigger may be the reception of the notification. An S1 interface may be used in the notification from the HeNB to the serving cell.

As another method regarding a trigger for allowing scheduling to the UE again, in a case where a timer for a period in which scheduling to the UE is stopped is provided, a trigger may be the expiration of the timer. The timer may be started by the trigger for stopping scheduling to the UE.

FIG. 25 is a diagram showing a sequence example of a mobile communication system in a case where a UE notifies a HeNB of the HII while being in the RRC_connected state. The portions of FIG. 25 corresponding to those of FIG. 24 are denoted by the same step number, and the processes thereof are not described in detail.

In Step ST2501, the serving cell that has notified a UE of the information indicating that the HII is notified or the HII in Step ST2403 stops scheduling to the UE. In Step ST2502, the UE that has transmitted the HII to a HeNB transmits a scheduling request signal to the serving cell.

In Step ST2503, the serving cell that has received a scheduling request signal from the UE in Step ST2502 starts scheduling to the UE.

As described above, the scheduling request signal in Step ST2502 may include the information indicating the scheduling restart request after the HeNB has been notified of the HII. In a case where a UE does not transmit the scheduling restart request signal or in a case where a HeNB does not transmit the information that it has received the HII from a HeNB for a certain period, the serving cell may again notify the UE of the information indicating that the HII is notified or the HII. A timer may be set as a certain period. This enables a serving cell to notify a HeNB of the HII with reliability, which reliably avoids interference.

It has been described that the method disclosed in the second embodiment is applicable as the method of notifying the HII in Step ST2406. For example, it is the method of notifying the HII using the PRACH. As described in Non-Patent Document 1, however, a case where a UE in the RRC_connected state performs the RACH procedure (hereinafter, referred to as a RACH procedure allowed state) is limited. Therefore, in a case where a UE in the RRC_connected state notifies the HII, the UE has to wait for the RACH procedure allowed state. This latency is a delay time, and accordingly, scheduling in which the avoidance of interference is reflected immediately cannot be performed. Further, in a case where the RACH procedure allowed state is not obtained, it is impossible to notify the HII using the PRACH, and scheduling for avoiding interference cannot be performed per se.

In order to solve the above-mentioned problem, in a case where a UE in the RRC_connected state notifies the HII, it is allowed to perform the RACH procedure. Alternatively, in a case where a UE in the RRC_connected state notifies the HII, the transmission of the PRACH is allowed.

This allows a UE in the RRC_connected state that has received the HII or the information indicating that the HII is notified from a serving cell to notify a HeNB of the HII using the RACH procedure or PRACH. This enables a UE to notify a HeNB of the HII with a small delay time.

The method disclosed in the present modification enables to notify a HeNB of the HII via a UE in the RRC_connected state. Further, it is possible to prevent a UE from changing to the RRC_Idle state, whereby the UE can notify a HeNB of the HII immediately after receiving the HII or the information indicating that the HII is notified. Accordingly, the time period required for control to notify the HII can be reduced. This enables scheduling in which an interference situation at a certain time is immediately reflected with a small control delay.

Further, the RRC connection is established between a serving cell (macro cell) and a UE after the UE notifies the HII, whereby the UE is allowed to communicate with the serving cell again. It is not required to perform the RRC connection process on this occasion, which enables communication with fewer processes at an early stage. This leads to a reduction in control delay and lower power consumption of a UE.

While a serving cell stops scheduling to a UE in the method above, only uplink scheduling may be stopped. The UE requires uplink transmission for notifying a HeNB of the HII. It is possible to prevent this uplink transmission from being performed simultaneously with the uplink transmission scheduled from the serving cell.

Further, a serving cell may avoid using a subframe in which a physical resource for PRACH transmission of a HeNB is present in scheduling to a UE, rather than stop scheduling to a UE. That is, the serving cell avoids allocating the subframe in which the physical resource is present to a UE. Similarly, this enables to prevent the uplink transmission from being performed simultaneously.

There may be used a radio frame in which a physical resource for PRACH transmission of a HeNB is present, not a subframe. Similar effects can be achieved also in this case.

The serving cell recognizes the physical resource for PRACH transmission of a HeNB in advance. The method disclosed in the second embodiment may be used as this method. This allows the serving cell to perform scheduling to a UE while avoiding the subframe in which a physical resource is present or a radio frame.

Similarly, in the scheduling to a UE, the serving cell may avoid the use of a subframe in which a physical resource for UL-SCH that is allocated to a UE by a HeNB or a radio frame. Likewise, a UE can avoid uplink transmission simultaneously. It suffices that a HeNB notifies the physical resource information to which UL-SCH is allocated as in the method of notifying a cell nearby of the RACH configuration disclosed in the second embodiment.

In performing semi-persistent scheduling, the serving cell may avoid the use of a subframe in which a physical resource for PRACH transmission of a HeNB is present. Alternatively, the serving cell may avoid the use of a subframe in which a physical resource for UL-SCH that is allocated to a UE by a HeNB is present. There may used a radio frame, not a subframe. It suffices that a HeNB notifies the physical resource information allocated in semi-persistent scheduling as in the method of notifying a cell nearby of the RACH configuration disclosed in the second embodiment. Similarly, a UE can avoid performing uplink transmission simultaneously.

In a case where a UE is in the state in which a bearer for a dedicated control channel is disconnected between a serving cell and the UE or the radio link failure state when the UE notifies a HeNB of the HII, in Step ST2502, the UE may use an RRC reconnection request message, not a scheduling request. After performing the RRC reconnection process between a UE and a serving cell, the serving cell may perform scheduling to a UE as required.

The serving cell stops scheduling to a UE in the method described above, but in a case where the scheduling is not stopped and the subframe for transmission of the HII to a HeNB overlaps the subframe for uplink transmission to a macro cell at the UE, the UE may preferentially perform any one of them. For example, a UE gives priority to uplink transmission to a serving cell and does not transmit the HII to a HeNB. This enables a UE to avoid simultaneous transmission as well as an interruption of the communication with a serving cell.

On the contrary, for example, a UE may give priority to transmission of the HII to a HeNB and avoid uplink transmission to a serving cell. This enables the UE to avoid simultaneous transmission as well as interference owing to the transmission of the HII. Further, though the serving cell cannot receive uplink transmission from a UE, it may cause the UE to perform uplink transmission again through retransmission control of HARQ and ARQ. This causes a delay but does not interrupt the communication.

The serving cell may select a UE to which uplink scheduling is not performed and notify a HeNB of the HII via the UE without stopping scheduling to a UE. For example, it suffices that in a case of listing UEs to be notified of the HII in the HII notified HeNB list by associating those with a HeNB, a macro cell may list a plurality of such UEs. For example, the macro cell may number UEs in decreasing order of received power and list a plurality of UEs. In a case where a serving cell has performed uplink scheduling to a UE with the highest received power from the HeNB, in notifying a HeNB of the HII, the serving cell may notify a HeNB of the HII via a UE in the second order. This method enables a UE to avoid uplink transmission simultaneously.

Second Modification of Third Embodiment

In the present modification, as another method of notifying a HeNB of the HII via a UE in the RRC_connected state, a serving cell causes the UE to notify the HII using handover (HO) to the HeNB.

A serving cell takes a HeNB to be notified of the HII as a target cell, and activates a HO procedure for a UE that should notify the HeNB of the HII. On this occasion, the HO procedure may be activated by a plurality of UEs, and preferably, by one. This is because a signaling load for HO to a HeNB increases considerably if a plurality of UEs activate the HO procedure. The method disclosed in the first modification of the first embodiment is applicable as the method of limiting the number of UEs that activate the HO procedure to one.

A UE performs RRC establishment for a HeNB instructed by a network (serving cell), using the procedure of normal HO. The UE notifies the HII in performing RRC establishment. As described above, the UE may use the PRACH or RRC establishment request message. Alternatively, the UE may notify the HII after the RRC establishment with a HeNB in accordance with the HO procedure. This enables the notification by the MAC message, RRC message or NAS message.

In a case where the HII is notified in performing RRC establishment, the HeNB that has received the HII causes a UE to change back to an original serving cell, that is, returns a UE under control of the original serving cell. As the method for this, it suffices that the HeNB that has received the HII does not end the RACH procedure or notifies a UE of the reject message for the RRC establishment request message. As a result, a UE performs the process considering that it has failed in HO, and thus performs the process of changing back to an original serving cell. In changeback, the UE may perform RRC establishment again for an original serving cell using the RRC reconnection request message.

In a case where a UE does not perform RRC connection with a HeNB and performs the process of changing back to an original serving cell, a serving cell may avoid a HO request or the notification of data and the information related to the data such as a data number (data forwarding, SN status transfer). This enables to reduce a signaling amount between a serving cell and a HeNB. Alternatively, a serving cell may hold the information related to the data and, after the RRC reconnection establishment with the UE, may communicate the data with the UE. This enables to continue communication between a serving cell and a UE.

In a case where the HII is notified after the RRC establishment with a HeNB, the HeNB causes the UE to perform HO to an original serving cell as a target cell. This enables a UE to perform communication again after performing HO to an original cell.

The method disclosed in the present modification enables to notify a HeNB of the HII via the UE in the RRC_connected state. The serving cell may notify a UE of the RACH configuration parameter of a HeNB as a normal HO procedure, and is not required to make notification in advance. This enables to reduce a signaling load.

Third Modification of Third Embodiment

The third embodiment to the second modification of the third embodiment have disclosed the method of notifying a HeNB of the HII via a UE in the RRC_connected state. The present modification discloses an example of the method of notifying a HeNB of the HII via a UE in the RRC_Idle state.

Normally, a serving cell does not instruct measurements to a UE in the RRC_Idle state. Accordingly, a UE in the RRC_Idle state may use the method of regularly measuring a surrounding radio wave environment, which has been disclosed in the first modification of the first embodiment.

It suffices that the serving cell notifies a UE being served thereby of the information indicating whether or not a HeNB is deployed in the coverage of the own serving cell. As a result, in a case of a serving cell that has no HeNB deployed in the coverage thereof, a UE does not need to perform measurement regularly in the RRC_Idle state, leading to lower power consumption.

The notification of the information indicating whether or not a HeNB is deployed in the coverage may be broadcast as the broadcast information and, for example, may be included in the SIB1. The transmission timing of the SIB1 is determined in advance, which allows a UE to receive the SIB1 at an early stage.

The UE that has received the information indicating whether or not a HeNB is deployed in the coverage measures a surrounding radio wave environment, irrespective of the received power of a serving cell. The surrounding radio wave environment is measured in cycles. The cycle may be preliminarily determined in a static manner or may be mapped on the broadcast information to be broadcast from the serving cell.

Alternatively, a serving cell may notify a UE being served thereby of a path loss (or range of a path loss) to the HeNB deployed in the coverage of the own serving cell. It suffices that the path loss to each HeNB is broadcast as the broadcast information, which may be included in, for example, the SIB4. The neighbor cell information is mapped on the SIB4, and thus, the path loss may be associated with the neighbor cell information to be notified.

The UE that takes a cell to which the path loss is broadcast as a serving cell may derive a path loss from a serving cell and perform measurements while that path loss is identical to the path loss to the HeNB (or in a specific range).

The method disclosed in the eighth modification of the first embodiment may be used as the method of notifying, by a serving cell, a UE in the RRC_Idle state of the indication that the HII or the HII is notified.

The method involving the use of the PRACH or the method involving the use of the RRC connection request disclosed in the second embodiment may be used as the method of notifying a HeNB of the HII by a UE in the RRC_Idle state. The use of the above-mentioned method enables to notify a HeNB of the HII via a UE in the RRC_Idle state. This enables to notify a HeNB of the HII without a UE during communication (during RRC connection establishment) in some cases. Therefore, it is possible to prevent a delay in data transmission for the UE during communication.

Fourth Embodiment

The HeNB that has received the HII performs scheduling for avoiding interference with a macro cell in accordance with the contents of the HII, such as avoiding allocation to a physical resource or reducing the power of the physical resource. However, the macro cell may have already been in a situation in which the physical resource is not used at times and, if the scheduling for avoiding interference continues, the use efficiency of a physical resource decreases. Non-Patent Document 9 does not disclose this problem as described above. Accordingly, in the present embodiment, the HeNB that has received the HII releases the scheduling for avoiding interference at a predetermined time for solving this problem.

As the method for releasing the scheduling for avoiding interference by the HeNB that has received the HII, the scheduling period for avoiding interference is set. Specifically, a timer for the period is provided, and the scheduling for avoiding interference is released upon expiration of the timer.

FIG. 26 is a diagram showing a sequence example of a mobile communication system in a case where a timer is provided for releasing the scheduling for avoiding interference by a HeNB. The portions of FIG. 26 corresponding to those of FIG. 24 are denoted by the same step numbers, and the processes thereof are not described in detail. The method disclosed in the third embodiment is used as the method of notifying the HII in the present embodiment, which may be another method.

In Step ST2701, the HeNB that has received the HII from the UE in Step ST2406 starts scheduling for avoiding interference to a UE being served by the own cell (HeNB) in accordance with the HII. In this case, a timer for setting a period until the scheduling for avoiding interference is released is provided, and the timer is started. The timer starts at the time at which, for example, the HII is notified, and clocks a lapse of the period predetermined as a period from the notification of the HII to the release of scheduling for avoiding interference.

In Step ST2702, the HeNB judges whether or not the timer has expired and, in the case where the timer has not expired, continues scheduling for avoiding interference and checks whether or not the timer has expired. In the case where the timer has expired, the HeNB moves to Step ST2703.

In Step ST2703, the HeNB releases the scheduling for avoiding interference to the UE being served thereby. In this case, the timer is reset. This enables the HeNB to perform normal scheduling to a UE being served thereby. As a result, the HeNB does not continue the scheduling for avoiding interference indefinitely, which prevents a decrease in use efficiency of a radio resource.

First Modification of Fourth Embodiment

As another method for releasing the scheduling for avoiding interference by the HeNB that has received the HII, an HII release signal is notified to the HeNB. The HeNB releases the scheduling for avoiding interference when receiving the HII release signal.

FIG. 27 is a diagram showing a sequence example of a mobile communication system in a case where the HeNB releases the scheduling for avoiding interference in a case of receiving the HII release signal. The portions of FIG. 27 corresponding to those of FIG. 24 are denoted by the same step numbers, and processes thereof are not described in detail. The method disclosed in the third embodiment is used as the method of notifying the HII in the present modification, which may be another method.

In Step ST2801, the HeNB that has received the HII from a UE in Step ST2406 starts the scheduling for avoiding interference for a UE being served by the own cell (HeNB) in accordance with the HII.

In a case where the serving cell is in a situation in which the scheduling for avoiding interference may be released for the HeNB, for example, in a situation in which the scheduling to the physical resource notified by the HII is not required for the UE being served thereby, in Step ST2802, the serving cell activates the procedure for releasing the HII.

In Step ST2803, the serving cell notifies the UE of the information indicating that the HII is released. In Step ST2804, the serving cell notifies the UE of an RRC connection release message.

In Step ST2805, the UE that has received the information indicating that the HII is released in Step ST2803 and received an RRC connection release message in Step ST2804 changes to RRC_Idle.

In Step ST2806, the UE notifies a HeNB to be notified of the information of the information indicating that the HII is released. In Step ST2809, the HeNB that has received the information indicating that the HII is released releases the scheduling for avoiding interference for a UE being served thereby. In Step ST2807, the UE that has notified the HeNB of the information indicating that the HII is released in Step ST2806 transmits an RRC connection request signal to the serving cell and, in Step ST2808, performs the RRC connection process between the serving cell and the UE. It suffices that the method of notifying the information indicating that the HII is released is similar to that in the case where the HII is notified. On this occasion, the UE that notifies the HII may be different from the UE that notifies the information indicating that the HII is released.

As described above, the HeNB is notified of the information indicating that the HII is released, and thus the HeNB does not continue the scheduling for avoiding interference indefinitely, which prevents a decrease in use efficiency of a radio resource. In addition, whether the serving cell releases the HII can be judged in this method, which enables a serving cell to flexibly perform appropriate scheduling to a UE being served thereby.

Fifth Embodiment

The second embodiment and fourth embodiment have disclosed the method of notifying a HeNB of the HII by a UE using the RACH configuration of the HeNB. The present embodiment discloses the method of notifying a HeNB of the HII by a UE using the RACH configuration of the serving cell, as a specific mechanism in which a macro cell notifies a HeNB of the HII via a UE.

Figure 28:
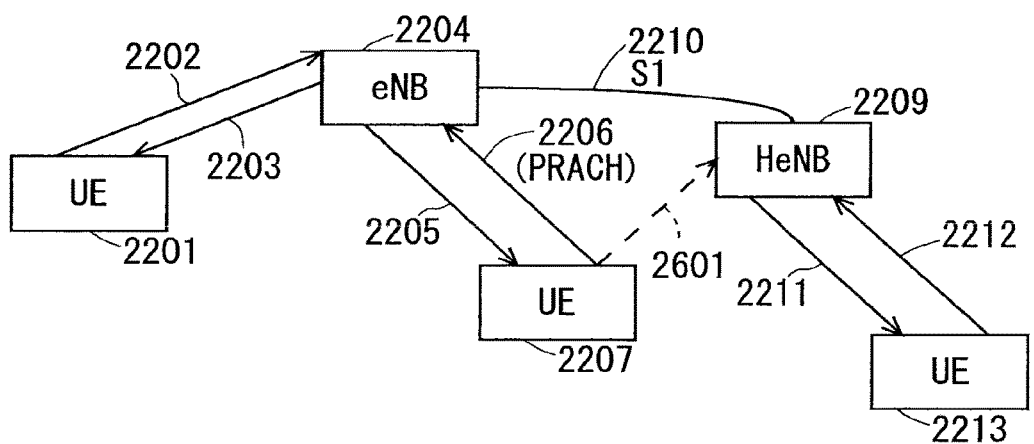
FIG. 28 is a conceptual diagram in a case where a UE notifies a HeNB of the HII with a RACH configuration of a serving cell.

FIG. 28 is a conceptual diagram in a case where a UE notifies a HeNB of the HII using the RACH configuration of the serving cell. The portions of FIG. 28 corresponding to those of FIG. 22 are denoted by the same reference numerals, which are not described. In FIG. 28, an arrow 2601 shows that the HeNB 2209 receives the PRACH 2206 transmitted from the UE 2207 to the eNB 2204 being a macro cell.

In the case of notifying the HeNB 2209 of the HII, the macro cell 2204 notifies the HeNB 2209 of the HII via the UE 2207 being served by the own macro cell 2204. For example, the UE 2207 that has been notified of the indication that the HII is notified from the macro cell 2204 to the HeNB 2209 or the HII by the methods disclosed in the first embodiment to the eighth modification of the first embodiment transmits the HII to the HeNB 2209.

The UE 2207 notifies the HII using the PRACH 2206 by the RACH configuration of the macro cell 2204. The HeNB 2209 receives the PRACH 2206, to thereby receive the HII. This enables the macro cell 2204 to notify the HeNB 2209 of the HII via the UE 2207 being served thereby.

Normally, a UE being served by a macro cell recognizes the RACH configuration of the macro cell for starting communication with the macro cell. The UE receives the broadcast information broadcast from the macro cell, to thereby obtain the RACH configuration parameter. Accordingly, the UE being served by the macro cell can transmit the PRACH to the macro cell using the RACH configuration of the macro cell. However, the HeNB normally cannot receive the PRACH transmitted from the UE to the macro cell. This is because the HeNB does not recognize the RACH configuration parameter of the macro cell being a serving cell. The present embodiment discloses below a specific example of the method of recognizing the RACH configuration parameter of the macro cell by a HeNB.

The macro cell notifies a HeNB of the RACH configuration parameter of the own cell. An S1 interface may be used in the notification. As a specific example, the macro cell 2204 notifies the HeNB 2209 of the RACH configuration parameter of the macro cell using the interface 2210 of FIG. 28. An S1 interface is used as the interface 2210. The macro cell 2204 may notify the PCI of the own cell together with the RACH configuration parameter. It suffices that the HeNB 2209 that has received the RACH configuration parameter associates the PCI of the macro cell 2204 with the RACH configuration parameter and stores those, and may store those in the EPC communication unit 901, protocol processing unit 903 or control unit 911 shown in FIG. 9.

As an example, the method of notifying, by a macro cell, a HeNB deployed in the coverage of the own cell of the RACH configuration parameter is disclosed. The method disclosed in the first embodiment may be used as the method of recognizing, by a macro cell, a HeNB deployed in the coverage of the own cell. For example, the operation of Step ST1401 to Step ST1408 of FIG. 14 may be used.

The macro cell recognizes a HeNB deployed in the coverage of the own cell, and then notifies the HeNB of the RACH configuration parameter of the own cell. For example, after the processes of the Step ST1407 and Step ST1408 of FIG. 14 are performed, the macro cell notifies the HeNB in the HII notified HeNB list of the RACH configuration parameter. The macro cell may notify an added HeNB of the RACH configuration parameter. The macro cell may instruct a deleted HeNB to delete the RACH configuration parameter that has been notified or notify the deleted HeNB of the information indicating allowance. This enables a macro cell to notify a HeNB deployed in the coverage of the own cell of the RACH configuration parameter of the own cell.

As an example, the method of notifying, by a macro cell, a HeNB deployed in the coverage of the own cell of the RACH configuration parameter is disclosed, not limited thereto, and an own macro cell (eNB) may notify a HeNB deployed in a certain range of the RACH configuration parameter. As the method for this, the modification of the first embodiment may be used. Alternatively, a macro cell may notify a HeNB to be notified of the HII of the RACH configuration parameter. As a result of limiting to a certain range or a HeNB to be notified of the HII, it is possible to reduce the signaling load between the macro cell and the HeNB.

The UE that has received the indication that the HII is notified or the HII from the serving cell being a macro cell notifies the HII using the RACH configuration parameter of the serving cell that has been obtained by receiving the broadcast information of the serving cell. In this case, the UE notifies the serving cell of the HII. The method disclosed in the second embodiment may be used as the method of notifying the HII from a UE. The HeNB that has received the RACH configuration parameter from the macro cell receives the PRACH from the UE in accordance with the RACH configuration. The HeNB may receive the PRACH in accordance with only the configuration used in the HII of the RACH configuration of the macro cell. Alternatively, it may be set such the macro cell notifies the HeNB of only the RACH configuration used in the HII and that the HeNB receives the PRACH in accordance with only the RACH configuration used in the notified HII. Accordingly, in a case where a UE transmits the HII using the PRACH of the RACH configuration of a serving cell being the macro cell, a HeNB is allowed to receive the HII from the UE.

The method as disclosed in the present embodiment enables a macro cell to notify a HeNB of the HII via a UE. The UE notifies the HII using the RACH configuration parameter of the serving cell, and accordingly is not required to recognize a HeNB to be notified of the HII. Therefore, the serving cell does not need to notify a UE of the information on a HeNB to be notified of the HII. Alternatively, in a case where a UE selects a HeNB to be notified of the HII, the UE does not need to perform the selection process. This reduces a signaling load and reduces power consumption of a UE.

A macro cell can determine the RACH configuration used in the notification of the HII, which makes scheduling of a UE for notifying the HII easier. For example, in a case where the HII is notified while a UE is in the RRC_connected state, which has been disclosed in the first modification of the third embodiment, a serving cell can control the scheduling to a UE being served thereby as well as the RACH configuration for notifying the HII. Accordingly, the serving cell can be controlled easily so as not to simultaneously perform scheduling to a UE to be notified of the HII.

Typically, a user equipment receives downlink transmission of a base station and, based on this, synchronizes to the frequency of the base station. This function is referred to as automatic frequency control (AFC). In the present embodiment, a UE transmits the PRACH for HII notification to a serving cell, and accordingly synchronizes to the frequency of the serving cell. In some cases, the frequency to be used slightly varies between the serving cell and the HeNB. In such a case, it is difficult for a HeNB to receive the uplink transmission from the UE synchronized to the frequency of the serving cell.

In order to solve this problem, in the present embodiment, a UE uses the uplink carrier frequency of the HeNB for the uplink transmission for notifying the HII. In order to perform the AFC for the downlink transmission from a HeNB, a UE measures cells nearby, receives the downlink transmission from the HeNB to be notified of the HII, and performs the AFC. The measurements of cells nearby may be performed regularly or performed in a case where the indication that the HII is notified or the information of the HII is received from the serving cell. In this case, it suffices that the serving cell notifies a UE of the HeNB information that the UE is notified of the HII.

In a case where a UE selects a HeNB to be notified of the HII, the serving cell does not need to notify the HeNB information that the UE is notified of the HII. As a result, even in a case where the carrier frequency to be used slightly varies between a serving cell and a HeNB, if a UE notifies the HII using the uplink transmission of a serving cell, the HeNB can receive the HII.

First Modification of Fifth Embodiment

The present modification discloses another specific example for recognizing the RACH configuration parameter of a macro cell by a HeNB. The HeNB receives the broadcast information of a macro cell nearby through measurements and obtains the RACH configuration parameter. As the method for this, the method disclosed in the first embodiment may be used. The first embodiment has disclosed that in power-on or initialization, or while the transmission is stopped, a HeNB measures a surrounding radio wave environment, measures the received power of a cell present in its vicinity, and obtains the cell identity (PCI) of the cell, to thereby detect a cell. In addition, the first embodiment has disclosed that a HeNB receives the broadcast information of the detected cell. On this occasion, the HeNB may obtain the RACH configuration parameter of the cell included in the broadcast information of the cell. The RACH configuration parameter is normally included in the SIB2. It suffices that the HeNB receives the SIB2 to obtain the RACH configuration parameter.

The configuration as described above enables a HeNB to obtain the RACH configuration parameter of a cell present in its vicinity or a macro cell. This method eliminates the need to notify, by a macro cell, a HeNB of the RACH configuration parameter by means of the S1 interface. This enables to reduce the signaling load of the S1 interface. As a result of the HeNB having the function of measuring a surrounding radio wave environment, function of detecting a cell, function of receiving the broadcast information of the cell, and function of obtaining the broadcast information, the HeNB can obtain the RACH configuration parameter from a macro cell as well.

Second Modification of Fifth Embodiment

In the fifth embodiment described above, in a case where the carrier frequency to be used slightly varies between a serving cell and a HeNB, a UE uses the uplink carrier frequency of the HeNB in the uplink transmission for notifying the HII. In the present modification, as another method, a UE uses the uplink carrier frequency of the serving cell in the uplink transmission for notifying the HII.

The HeNB has to receive the HII with the uplink frequency from a macro cell being the serving cell. In order to achieve this, the HeNB performs the AFC for the downlink transmission of the macro cell and receives the HII with the uplink frequency of the macro cell. The HeNB may take the macro cell notified of the RACH configuration parameter as the macro cell for which the AFC is performed.

The HeNB performs measurements of cells nearby based on the PCI of the macro cell for which the AFC is performed, and receives the downlink transmission of the macro cell having the PCI. The measurements of cells nearby may be performed regularly or performed in a case where the RACH configuration parameter is received from a cell nearby. As a result, in a case where a UE notifies the HII using the uplink transmission of the serving cell, a HeNB can receive the uplink transmission for HII notification even when the carrier frequency to be used slightly varies between the serving cell and the HeNB.

The RACH configuration parameter has been described in the fifth embodiment and the modification thereof, not limited to the RACH configuration parameter, which may be a parameter for performing uplink transmission for a serving cell by a UE as in the second embodiment.

Sixth Embodiment

The present embodiment discloses the method of determining the initial transmission power of the PRACH in a case where the PRACH is used for notifying a HeNB of the HII.

Non-Patent Document 11 defines the initial transmission power of the PRACH as expressed by Equation (1) below.

$$PPRACH = \min\{P\text{cmax}, \text{PREAMBLE\_RECEIVED\_TARGET\_POWER} + PL\} \, [\text{dBm}] \quad (1)$$

In Equation (1), "PL" represents a path loss. "Pcmax" of Equation (1) is determined by Equation (2) below, and "PREAMBLE_RECEIVED_TARGET_POWER" of Equation (1) is defined as expressed in Equation (3) below (see Chapter 5.1.3 of TS36.321 V.9.1.0 (hereinafter, referred to as "Non-Patent Document 12" by 3GPP).

$$P\text{cmax} = \min\{P\text{emax}, P\text{umax}\} \quad (2)$$

In Equation (2), "Pemax" is a value that is set per cell and broadcast to a user equipment being served thereby, and "Pumax" is determined from the capability of a user equipment.

$$\text{PREAMBLE\_RECEIVED\_TARGET\_POWER} = \text{preambleInitialReceivedTargetPower} + \text{DELTA\_PREAMBLE} + (\text{PREAMBLE\_TRANSMISSION\_COUNTER} - 1) * \text{powerRampingStep} \quad (3)$$

In Equation (3), "preambleInitialReceivedTargetPower" is a part of the RACH configuration, and "DELTA_PREAMBLE" is determined based on the preamble format (sequence) (see Chapter 7.6 of Non-Patent Document 12). The preamble format (sequence) is a part of the RACH configuration. "PREAMBLE_TRANSMISSION_COUNTER" represents how many times the preamble transmission has been performed. "powerRampingStep" is a part of the RACH configuration, and "*" represents multiplication "×" (see Non-Patent Document 10).

Non-Patent Document 9 discloses the following. It is disclosed that based on the measurement value of the downlink received quality of a HeNB by a UE, a serving cell notifies the user equipment of the uplink transmission power required for notification of the HII by the UE, or the UE deduces the required uplink transmission power.

However, in a case where the equations disclosed in Non-Patent Document 11 are used for the method of determining the initial transmission power of the PRACH for HII notification, in a case where the serving cell derives the initial transmission power of the PRACH using those equations, and in a case where a UE derives the initial transmission power of the PRACH using those equations, "PL" of Equation (1) and "Pemax" of Equation (2) become indeterminate, leading to a problem that the initial transmission power of the PRACH cannot be determined.

The present embodiment discloses the method for solving this problem. First, the solution for "Pemax" of Equation (2) is disclosed. A HeNB notifies a node nearby of "Pemax" of the own cell by means of the S1 interface, similarly to the RACH configuration parameter disclosed in the second embodiment. This enables a serving cell to recognize "Pemax" of the HeNB to be notified of the HII.

In a case where a UE derives the initial transmission power of the PRACH, the serving cell notifies a UE being served thereby of the parameter by a method similar to that of the RACH configuration parameter disclosed in the second embodiment. This allows a user equipment that transmits the PRACH for HII to find "Pemax" of the HeNB to be notified of the HII. The user equipment determines the initial transmission power of the PRACH for HII of the HeNB to be notified of the HII, using the "Pemax".

The method involving the use of "Pemax" of the HeNB to be notified of the HII for deriving the initial transmission power of the PRACH for HII has been disclosed above. However, "Pemax" is used for causing a UE being served by a cell that sets "Pemax" to derive the initial transmission power of the PRACH. That is, "Pemax" is set for a UE present in the coverage of the cell.

The present invention has disclosed the method of notifying a HeNB of the HII via a UE being served by a macro cell. In this method, a UE is served by a macro cell and is not served by a HeNB. Therefore, the UE that notifies the HII is not present in the coverage of a HeNB in some cases. In a case where such a UE uses the initial transmission power of the PRACH derived using "Pemax", there arises a problem that sufficient transmission power is not achieved and the PRACH cannot be received at the HeNB.

Accordingly, not "Pemax" but a value (for example, Pemax_a) larger than "Pemax" may be set, to thereby derive the initial transmission power of the PRACH. The Pemax_a may be preliminarily determined in a static manner or may be broadcast from a serving cell as the broadcast information. The serving cell or UE may substitute the Pemax_a for "Pemax" of Equation (2) above.

A new parameter PHIIoffset may be provided for setting an appropriate value larger than "Pemax". Pemax (per HeNB)+PHIIoffset may be substituted for "Pemax" of Equation (2) above. The PHIIoffset may be preliminarily determined in a static manner, may be determined by a serving cell, or may be determined by a UE. In a case where it is determined by a serving cell, the serving cell may broadcast the parameter to a UE being served thereby by the broadcast information or may notify the parameter individually. A UE may be notified in a similar method to that for the indication that the HII is notified or the HII, which has been disclosed in the first embodiment. Accordingly, it is possible to take "Pemax" per HeNB into account, which enables to deal with the case where the coverage varies from HeNB to HeNB.

Further, it is possible to set PHIIoffset suitable for a HeNB to be notified of the HII and a UE to be notified of the HII. For example, in a case where the UE having the highest received power from the HeNB to be notified of the HII is notified of the HII, it suffices that a value as small as possible is set in the PHIIoffset. The setting of PHIIoffset in this manner prevents an increase of uplink transmission power even when there are a large number of UEs to be notified of the HII, which enables to reduce the uplink interference.

In a case of the method of notifying the HII via a UE present in a specific received power range from a HeNB, which has been disclosed in the sixth modification of the first embodiment, the PHIIoffset may be derived with the HeNB range threshold. A correspondence may be determined in advance by a predetermined function or in a table. PHIIoffset may be derived by a serving cell that is a macro cell or, in the case where a UE recognizes the HeNB range threshold, may be derived by a UE. In this case, the HeNB range threshold may be used directly without using the PHIIoffset parameter, to thereby calculate a value substituted for "Pemax" of Equation (2) above. This enables to prevent the transmission of the HII with unnecessary transmission power by a UE in a case where the HII is notified via a UE present in a specific received power range from HeNB.

The PHIIoffset may be zero or a negative value, not only a positive value. For example, in a case where a HeNB is a CSG cell, a UE that does not belong to the CSG-ID of the CSG cell cannot take the CSG cell as a serving cell and takes a macro cell as a serving cell even when being within the coverage of the CSG cell. Therefore, it is possible to cause a CSG cell to notify the HII via a UE present in the coverage of the CSG cell, with the PHIIoffset set to zero or a negative value. This enables to keep the transmission power for HII notification low, achieving a reduction in interference and a reduction in power consumption of a UE.

Next, a solution for "PL" of Equation (1) above is disclosed. A user equipment uses the path loss of a serving cell. This allows a user equipment that transmits the PRACH to confirm "PL". The user equipment derives the initial transmission power of the PRACH for HII using this "PL". A UE is allowed to derive the initial transmission power of the PRACH for HII by a typical PL deriving method. However, in a case where a user equipment uses the path loss of a serving cell in a case of determining the initial transmission power of the PRACH for HII, the initial transmission power of the PRACH increases unnecessarily depending on the location of the user equipment, leading to a problem that unnecessary uplink interference occurs or the power consumption of a UE increases. Therefore, three specific examples of the method of determining the value of "PL" used in a case of determining the initial transmission power of the PRACH for HII are disclosed below.

(1) A static value is determined in advance. As a specific example, it is determined in accordance with the standards.

(2) A value is set as a fixed value per HeNB. Each HeNB notifies a macro cell nearby of the fixed value as the RACH configuration parameter. Each macro cell notifies a user equipment being served thereby. Two specific examples of the method of notifying a user equipment are disclosed below:

(2-1) notification is made using the broadcast information.
(2-2) notification is made using the dedicated information.

(3) A UE derives the path loss per HeNB in measurements. For example, as disclosed in the first modification or fourth modification of the first embodiment, it may be derived through the processes from Step ST1703 to Step ST1705 of FIG. 17. This prevents the initial transmission power of the PRACH for HII from increasing more than necessary. As a result, it is possible to prevent the occurrence of uplink interference or an increase in power consumption of a UE.

A UE derives the initial transmission power of the normal PRACH using Equation (1) to Equation (3) above disclosed in Non-Patent Document 11, and derives the initial transmission power of the PRACH for HII using the method disclosed in the present embodiment. This allows a macro cell to properly keep the initial transmission power of the PRACH used in the case of notifying a HeNB of the HII via a UE being served thereby. Accordingly, the HII reception error can be reduced, which enables to prevent the occurrence of uplink interference or an increase in the power consumption of a UE.

The methods disclosed in the first embodiment to the sixth embodiment may be appropriately used in combination. This enables the method of notifying a HeNB of the HII via a UE in accordance with the situation. Also in the case where a large number of HeNBs will be deployed or in the case where those are deployed by a general user, the interference between a macro cell and a HeNB can be reduced, which enables to provide high-speed and high-capacity communication.

The first embodiment to the sixth embodiment have described the HII, but not limited to the HII, which may be the interference-related information that is the information related to the interference to a physical resource used in a macro cell, specifically, a signal for avoiding interference. For example, it may be the OI. The use of the methods disclosed in the first embodiment to the sixth embodiment enables to avoid the interference between a macro cell and a HeNB.

While the first embodiment to the sixth embodiment have disclosed that an S1 interface is used for transmission of the information between a macro cell and a HeNB, an X2 interface may be used in a case where the X2 interface is provided.

The first embodiment to the sixth embodiment have described the RACH configuration parameter, not limited thereto, which may be a parameter for performing uplink transmission.

While it has been disclosed that the PRACH is used for HII notification, an uplink channel dedicated to HII notification may be newly provided, so that the HII information and HII release information may be notified using the HII notification dedicated uplink channel.

Three specific examples of the HII notification dedicated channel are disclosed below.

(1) The resource in which uplink transmission of the channel is allowed is discrete from a user equipment in time. Accordingly, a HeNB receives the channel, where successive reception is not required and discontinuous reception is only required. The HeNB receives the HII, and thus an increase of power consumption is prevented, which is effective.

(2) The resource in which the transmission of the channel is allowed has a cycle in time. This eliminates the need to notify a resource in which the frequent transmission to a user equipment is allowed. Accordingly, an effect that radio resources can be effectively used is obtained.

(3) The frequency allocation of a resource in which the transmission of the channel is allowed is determined. This alleviates the load of the processes of a user equipment and a HeNB.

The HII notification dedicated channel and configuration thereof may be preliminarily determined in a static manner. In a case where a UE notifies a HeNB to be notified of the HII of the HII, the UE notifies every HeNB of the HII using the HII notification dedicated channel. This enables to simplify the control of a UE. Further, signaling of the configuration of the HII notification dedicated channel is not required, which enables to construct a mechanism for notifying the HII without increasing a signaling load.

The first embodiment to the sixth embodiment have disclosed the method of notifying the interference-related information that is the information related to the interference to a physical resource such as the HII or OI, specifically, a signal for avoiding interference. The physical resource may be a component carrier, not a physical resource block. For example, in a case where a macro cell performs carrier aggregation, the macro cell provides a signal for avoiding interference that includes the information indicating one or a plurality of component carriers that are susceptible to interference or are desirably not influenced by the interference, and then notifies a HeNB in which interference becomes problematic of the signal. The HeNB that has received the signal tries not to interfere by, for example, avoiding scheduling the component carriers to UEs being served thereby, reducing the power of the component carriers, or avoiding carrier aggregation of the component carriers. This allows a macro cell to schedule the component carriers to UEs being served thereby, increase the power of the component carriers, or perform carrier aggregation of the component carriers. The methods disclosed in the first embodiment to the sixth embodiment may be used for the method of notifying a signal for avoiding interference and the method of determining the transmission power.

In carrier aggregation, one or a plurality of component carriers that are allowed scheduling, or one or a plurality of component carriers for which scheduling is activated are deployed as one set in some cases. In such a case, it is possible to avoid interference on a component carrier basis by adding, deleting or exchanging component carriers in the set based on the signal for avoiding interference.

In a case where interference is avoided on a component carrier basis, control may be made such that a macro cell notifies a HeNB of the signal for avoiding interference in a semi-static manner. While the first embodiment to the sixth embodiment have disclosed the method of notifying a signal for avoiding interference via a UE, notification may be performed via an S1 interface, not via a UE. The macro cell may include the signal for avoiding interference on a component carrier basis in the broadcast information and broadcast the broadcast information, so that a HeNB receives the broadcast information from the macro cell that is detected in the measurements of a surrounding radio wave environment to obtain the signal for avoiding interference on a component carrier basis. The method of obtaining the RACH configuration parameter from a macro cell by a HeNB, which has been disclosed in the first modification of the fifth embodiment, may be used as the method for this. A HeNB may perform measurements when the power of a HeNB is turned on, when it is initialized, or when it stops transmission. Alternatively, a HeNB may perform measurements in cycles or regularly. In the case of performing measurements in cycles or regularly, it suffices that a HeNB avoids scheduling to a UE being served thereby to prevent self-interference.

As a result of avoiding interference on a component carrier basis as described above, it is possible to reduce interference between a macro cell and a HeNB also in a case of a system that supports a larger frequency bandwidth, such as LTE-A, whereby a high-speed and high-capacity communication can be provided.

The first embodiment to the sixth embodiment have disclosed the method of notifying a HeNB of the HII by a macro cell as the method of reducing interference between a macro cell and a HeNB. However, the macro cell and HeNB can perform scheduling per cell, and accordingly at times, the interference from a macro cell or the interference from a UE being served by the macro cell is desired to be avoided also in scheduling of a HeNB.

In such a case, however, a problem that only a HeNB causes a reduction in communication rate or a reduction in communication capacity occurs if the macro cell merely instructs a HeNB to perform scheduling for avoiding interference.

In order to solve this problem, a HeNB notifies a macro cell of the interference-related information that is the information related to the interference to a physical resource such as the HII or OI, specifically, a signal for avoiding interference.

Normally, a macro cell (eNB) is less likely to be deployed in the coverage of a HeNB. In many cases, a macro cell (eNB) is deployed outside the coverage of a HeNB. That is, a HeNB is required to notify a macro cell (eNB) deployed outside the coverage of the own cell of the signal for avoiding interference via a UE being served by the own cell. However, also in such a case, the appropriate use of the methods disclosed in the first embodiment to the sixth embodiment enables a HeNB to notify a macro cell of the signal for avoiding interference via a UE.

For example, in such a case, measurements of a macro cell cannot be used as the method of limiting a macro cell to be notified of the HII by the HeNB. This is because in a case where a macro cell (eNB) is deployed outside the coverage of a HeNB, the output power of the HeNB is normally smaller than the output power of a macro cell, and thus the HeNB cannot be detected at times even if the macro cell (eNB) measures a surrounding radio wave environment.

However, in order to solve this problem, the method of judging whether or not a HeNB is deployed in the coverage of a macro cell, which has been disclosed in the first embodiment, may be used as the method of limiting a macro cell to be notified of the HII. As a result of the measurements of cells nearby, the HeNB is allowed to judge a macro cell, in the coverage of which, the own cell is deployed.

Similarly to the HII notified HeNB list disclosed in the first embodiment, the list of macro cells to be notified of the HII may be provided such that a HeNB manages the macro cells to be notified of the HII using the list. It suffices that a HeNB judges a macro cell, in the coverage of which, the own cell is deployed, and adds or deletes the macro cell to or from the HII notified macro cell list depending on the results.

As to a UE, via which the HII is notified, it may be a UE being served by a HeNB through application of, for example, the method disclosed in the first embodiment. Alternatively, it may be a UE with the highest received power from a macro cell through application of the method disclosed in the first modification of the first embodiment. Not limited to this, the methods disclosed in the first embodiment to the eighth modification of the first embodiment are applicable.

Similarly, as a result of the appropriate use of the methods disclosed in the second embodiment to the sixth embodiment in combination, a HeNB can notify a cell deployed outside the coverage of the own cell of the interference-related information that is the information related to the interference to a physical resource such as the HII or OI, specifically, a signal for avoiding interference via a UE being served by the own cell. This enables to solve a problem that only a HeNB causes a reduction in communication rate and a reduction in communication capacity, leading to an increase of the communication capacity as a system.

A HeNB can notify a cell deployed outside the coverage of the own cell of the interference-related information that is the information related to the interference to a physical resource such as the HII or OI, specifically, a signal for avoiding interference via a UE being served by the own cell, which also enables to notify a signal for avoiding interference between macro cells and between HeNBs via a UE. As a result, the interference or communication quality can be kept properly also in a situation in which a large number of macro cells or local nodes will be deployed in a complicated manner.

The methods disclosed in the present invention are applicable not only to HeNBs, but also to normal eNB (macro cell) and so-called local nodes such as pico eNB (pico cell), node for hotzone cells, relay node, and remote radio head (RRH). For example, also in a case where a pico cell is deployed in the coverage of a macro cell, it is possible to perform scheduling in which interference between the macro cell and the pico cell is avoided by performing the methods disclosed in the present invention. Those local nodes correspond to small-scale base station devices.

Also in the case where various types of cells are deployed in a macro cell, the methods disclosed in the present invention are applicable. For example, as disclosed in the first embodiment, the measurement results of all of the detected cells may be reported without judging the type of a cell that is detected by a macro cell. Not only HeNBs but also other types of cells are included, and thus a macro cell notifies those cells of the HII. This enables to avoid interference with the other types of cells. In addition, it is not required to receive the cell type in measurements, which simplifies the control of a UE and reduces power consumption. Further, the methods are applicable as the method of avoiding interference between macro cells or between local nodes.

The use of the methods disclosed in the present invention enables to avoid interference as a system and prevent a reduction in communication rate and interruption of communication. As a result, it is possible to avoid interference and keep the communication quality properly also in a situation in which an enormous number of macro cells or local nodes will be deployed in a complicated manner.

While the LTE system (E-UTRAN) has been mainly described in the present invention, the present invention is applicable to the W-CDMA system (UTRAN, UMTS) and LTE-Advanced. Further, the present invention is applicable to a communication system in which one or a plurality of types of nodes are used.

While the invention has been shown and described in detail, the foregoing description is in all aspects illustrative and not restrictive. It is therefore understood that numerous modifications and variations can be devised without departing from the scope of the invention.

DESCRIPTION OF REFERENCE SYMBOLS

1301 to 1313, 2201, 2207, 2213 UE, 1314 to 1321, 1324 to 1326, 2209 HeNB, 1322, 2204 macro cell (eNB), 1323 coverage of macro cell 1322.

The invention claimed is:

1. A mobile communication system comprising:
a plurality of base station devices and at least one user equipment device configured to perform radio communication with each of said base station devices, wherein:
said plurality of base station devices include a large-scale base station device having a large-scale coverage that is large and at least one small-scale base station device having a small-scale coverage that is small relative to the large-scale coverage, as a coverage in a range in which communication with said at least one user equipment device is made; and
in a case where said large-scale coverage includes said at least one user equipment device and said at least one small-scale base station device, said large-scale base station device notifies, via one of said at least one user equipment device included in said large-scale coverage, said at least one small-scale base station device included in said large-scale coverage of interference-related information related to interference to a physical resource to be used when notifying, through a media access control (MAC) message via said at least one user equipment device, said at least one small-scale base station device of said interference-related information,
wherein the at least one user equipment device transmits the MAC message via a random access channel (RACH) of the small-scale base station using a configuration notified by the small-scale base station to the large-scale base station via a separate communication channel.

2. The mobile communication system according to claim 1, wherein
said at least one small-scale base station device that is notified of said interference-related information via said one of at least one user equipment device is limited to one.

3. The mobile communication system according to claim 2, wherein
said large-scale base station device selects a user equipment device having highest received power from among said at least one user equipment device, for each of said at least one small-scale base station device,
when said large-scale base station device selects a same user equipment device for a plurality of small-scale base station devices, said large-scale base station device;
allocates said selected same user equipment device to, among the plurality of small-scale base station devices, a small-scale base station device that provides highest received power for said selected same user equipment device; and
selects, for each of the plurality of small-scale base station devices except for said small-scale base station device, a user equipment device having n-th highest received power, and
when a user equipment device selected for said plurality of small-scale base station devices except for said small-scale base station device has been selected as said user equipment device having said n-th highest received power, said large-scale base station device selects a user equipment device having (n+1)th highest received power for each of said plurality of small-scale base station devices except for said small-scale base station device for which said user equipment device having said n-th highest received power has been selected.

4. A mobile communication system comprising:
a plurality of base station devices and at least one user equipment device configured to perform radio communication with each of said base station devices, wherein:
said plurality of base station devices include a large-scale base station device having a large-scale coverage that is large and at least one small-scale base station device having a small-scale coverage that is small relative to the large-scale coverage, as a coverage in a range in which communication with said at least one user equipment device is made; and in a case where said large-scale coverage includes said at least one user equipment device and said at least one small-scale base station device, said large-scale base station device notifies, via one of said at least one user equipment device included in said large-scale coverage, said at least one small-scale base station device included in said large-scale coverage of interference-related information related to interference to a physical resource to be used when notifying, via said at least one user equipment device, said at least one small-scale base station device of said interference-related information, wherein said at least one small-scale base station device that is notified of said interference-related information via said one of at least one user equipment device is limited to one, and wherein said large-scale base station device selects a user equipment device having highest received power from among said at least one user equipment device, for each of said at least one small-scale base station device, when said large-scale base station device selects a same user equipment device for a plurality of small-scale base station devices, said large-scale base station device;

allocates said selected same user equipment device to, among the plurality of small-scale base station devices, a small-scale base station device that provides highest received power for said selected same user equipment device; and selects, for each of the plurality of small-scale base station devices except for said small-scale base station device, a user equipment device having n-th highest received power, and when a user equipment device selected for said plurality of small-scale base station devices except for said small-scale base station device has been selected as said user equipment device having said n-th highest received power, said large-scale base station device selects a user equipment device having (n+1)th highest received power for each of said plurality of small-scale base station devices except for said small-scale base station device for which said user equipment device having said n-th highest received power has been selected.

* * * * *